US010336006B1

(12) United States Patent
Cohen

(10) Patent No.: US 10,336,006 B1
(45) Date of Patent: Jul. 2, 2019

(54) METHODS AND APPARATUS FOR ADDITIVE MANUFACTURING

(71) Applicant: Southern Methodist University, Dallas, TX (US)

(72) Inventor: Adam Cohen, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 0 days.

(21) Appl. No.: 15/157,404

(22) Filed: May 18, 2016

Related U.S. Application Data

(60) Provisional application No. 62/163,382, filed on May 19, 2015.

(51) Int. Cl.
*B29C 67/00* (2017.01)
*B33Y 10/00* (2015.01)
*B29L 31/00* (2006.01)

(52) U.S. Cl.
CPC ........... *B29C 67/00* (2013.01); *B29L 2031/00* (2013.01); *B33Y 10/00* (2014.12)

(58) Field of Classification Search
CPC ...... B29C 67/00; B29L 2031/00; B33Y 10/00
See application file for complete search history.

(56) References Cited

U.S. PATENT DOCUMENTS

| | | | | |
|---|---|---|---|---|
| 2,429,235 A * | 10/1947 | Miskelly | ................. | E04C 2/243 428/106 |
| 2,762,739 A * | 9/1956 | Weiss | ................. | B29C 44/1233 156/292 |
| 3,955,602 A * | 5/1976 | King | ................. | D03D 41/00 139/11 |
| 4,168,337 A * | 9/1979 | Maistre | ................. | B29C 70/24 428/105 |
| 4,209,560 A * | 6/1980 | Vasilos | ................. | C04B 33/32 428/109 |
| 4,216,856 A * | 8/1980 | Moring | ................. | B29C 70/202 156/181 |
| 4,268,560 A * | 5/1981 | Maistre | ................. | B29C 70/24 428/105 |
| 4,390,583 A * | 6/1983 | Brazel | ................. | C04B 35/803 156/89.11 |
| 4,614,678 A * | 9/1986 | Ganga | ................. | B05D 7/20 156/244.12 |

(Continued)

OTHER PUBLICATIONS

Ober et al. "*Active Mixing of complex Fluids at the Microscale*"; School of Engineering and Applied Science, Wyss Institute for Biologically Inspired Engineering, Harvard University, Cambridge, MA, Aug. 25, 2015; 6 pages.

*Primary Examiner* — Kevin R Kruer
(74) *Attorney, Agent, or Firm* — Fish & Richardson P.C.

(57) ABSTRACT

Additive manufacturing methods and apparatus are described for the direct, automated, tooling-less fabrication of composite parts with complex shapes such as fiber-reinforced composite parts with isotropic properties. In some embodiments, fibers parallel to one axis (e.g. Z) are provided initially (e.g., as a preform) and layers are fabricated by selectively curing a resin around these fibers while adding other fibers with other orientations. In some embodiments, fibers are rendered substantially transparent by immersing them in a refractive index matching liquid, thus allowing selective curing of a resin in the presence of the fibers.

16 Claims, 43 Drawing Sheets

(56) References Cited

U.S. PATENT DOCUMENTS

| | | | | |
|---|---|---|---|---|
| 4,715,560 A * | 12/1987 | Loyek | B29C 70/24 | |
| | | | 244/117 R | |
| 4,892,764 A * | 1/1990 | Drain | B29C 35/02 | |
| | | | 156/161 | |
| 5,039,566 A * | 8/1991 | Skubic | B29C 70/20 | |
| | | | 428/113 | |
| 5,110,651 A * | 5/1992 | Massard | H01Q 15/24 | |
| | | | 174/394 | |
| 5,178,705 A * | 1/1993 | Kimbara | B29C 70/24 | |
| | | | 139/11 | |
| 5,198,159 A * | 3/1993 | Nakamura | B29C 64/135 | |
| | | | 156/273.5 | |
| 5,503,793 A * | 4/1996 | Uchinono | B29C 41/12 | |
| | | | 156/273.3 | |
| 5,573,722 A * | 11/1996 | Hull | G03F 7/0037 | |
| | | | 118/423 | |
| 5,677,046 A * | 10/1997 | Fawley | B29C 53/32 | |
| | | | 156/169 | |
| 5,814,265 A * | 9/1998 | Hull | G03F 7/0037 | |
| | | | 118/423 | |
| 5,841,932 A * | 11/1998 | Page | G01C 19/722 | |
| | | | 385/134 | |
| 5,858,890 A * | 1/1999 | Sheehan | B29C 70/24 | |
| | | | 428/408 | |
| 5,916,509 A * | 6/1999 | Durhman | B29C 35/10 | |
| | | | 264/137 | |
| 5,936,861 A * | 8/1999 | Jang | B29C 70/384 | |
| | | | 700/98 | |
| 6,001,297 A * | 12/1999 | Partanen | B29C 64/40 | |
| | | | 264/308 | |
| 6,117,534 A * | 9/2000 | Yamamura | C04B 35/80 | |
| | | | 428/105 | |
| 6,471,800 B2 * | 10/2002 | Jang | B29C 64/165 | |
| | | | 156/155 | |
| 6,926,853 B2 * | 8/2005 | Hinc | B29C 70/521 | |
| | | | 264/102 | |
| 7,484,949 B2 * | 2/2009 | Hinc | B29C 70/521 | |
| | | | 425/114 | |
| 7,502,393 B2 * | 3/2009 | Hori | G02F 1/3534 | |
| | | | 372/21 | |
| 7,968,026 B1 * | 6/2011 | Teoh | A61L 27/18 | |
| | | | 264/113 | |
| 8,194,407 B2 * | 6/2012 | Yamaguchi | H01L 23/373 | |
| | | | 361/708 | |
| 8,444,900 B2 * | 5/2013 | Wilson | B29C 33/42 | |
| | | | 264/258 | |
| 8,655,475 B2 * | 2/2014 | Shan | D04H 3/05 | |
| | | | 139/11 | |
| 9,771,264 B2 * | 9/2017 | Garcia | B82Y 30/00 | |
| 9,797,076 B2 * | 10/2017 | Khokar | D04H 3/05 | |
| 2003/0173706 A1 * | 9/2003 | Rabie | B01D 63/021 | |
| | | | 264/261 | |
| 2004/0194873 A1 * | 10/2004 | Branca | B29C 70/52 | |
| | | | 156/180 | |
| 2007/0036844 A1 * | 2/2007 | Ma | A61L 27/56 | |
| | | | 424/443 | |
| 2007/0241478 A1 * | 10/2007 | Buckley | B29B 11/16 | |
| | | | 264/257 | |
| 2008/0110012 A1 * | 5/2008 | Bingham | B29C 70/24 | |
| | | | 29/592 | |
| 2011/0200785 A1 * | 8/2011 | Neitzke | B29C 70/224 | |
| | | | 428/116 | |
| 2013/0012086 A1 * | 1/2013 | Jones | B29C 73/10 | |
| | | | 442/66 | |
| 2013/0174287 A1 * | 7/2013 | Higuera | B01L 3/5085 | |
| | | | 800/8 | |
| 2013/0280478 A1 * | 10/2013 | Lee | B32B 5/12 | |
| | | | 428/113 | |
| 2014/0207248 A1 * | 7/2014 | Wang | D01D 5/0007 | |
| | | | 623/23.72 | |
| 2014/0268607 A1 * | 9/2014 | Wicker | H05K 1/0284 | |
| | | | 361/761 | |
| 2014/0327179 A1 * | 11/2014 | Szabo | B01D 63/022 | |
| | | | 264/261 | |
| 2014/0328963 A1 * | 11/2014 | Mark | B29C 64/386 | |
| | | | 425/143 | |
| 2015/0118197 A1 * | 4/2015 | Claeyssens | A61L 27/26 | |
| | | | 424/93.7 | |
| 2015/0210018 A1 * | 7/2015 | Lang | B29C 70/205 | |
| | | | 264/257 | |
| 2015/0231825 A1 | 8/2015 | Swartz et al. | | |
| 2015/0367592 A1 * | 12/2015 | Martinez, III | B32B 1/08 | |
| | | | 428/34.1 | |
| 2015/0375340 A1 * | 12/2015 | Cui | B23K 26/00 | |
| | | | 428/188 | |
| 2016/0082657 A1 | 3/2016 | Swartz et al. | | |
| 2016/0082658 A1 | 3/2016 | Swartz et al. | | |
| 2016/0082695 A1 | 3/2016 | Swartz et al. | | |
| 2016/0346997 A1 * | 12/2016 | Lewis | B29C 67/0055 | |
| 2017/0239388 A1 * | 8/2017 | Khandaker | B33Y 10/00 | |
| 2017/0350115 A1 * | 12/2017 | Rocher | E04B 1/3505 | |
| 2017/0361497 A1 * | 12/2017 | Crescenti Savall | B29C 70/48 | |
| 2017/0368743 A1 * | 12/2017 | Kang | B29C 64/112 | |
| 2018/0015669 A1 * | 1/2018 | Moore | B29C 64/264 | |
| 2018/0022023 A1 * | 1/2018 | Therriault | B29C 64/153 | |
| | | | 264/460 | |
| 2018/0043638 A1 * | 2/2018 | Temple | B29C 70/745 | |
| 2018/0110901 A1 * | 4/2018 | Lewis | A61L 27/18 | |
| 2018/0141284 A1 * | 5/2018 | Wilenski | B33Y 10/00 | |
| 2018/0142054 A1 * | 5/2018 | Langhorst | C08F 283/006 | |
| 2018/0215094 A1 * | 8/2018 | Birnbaum | B29C 64/295 | |

* cited by examiner

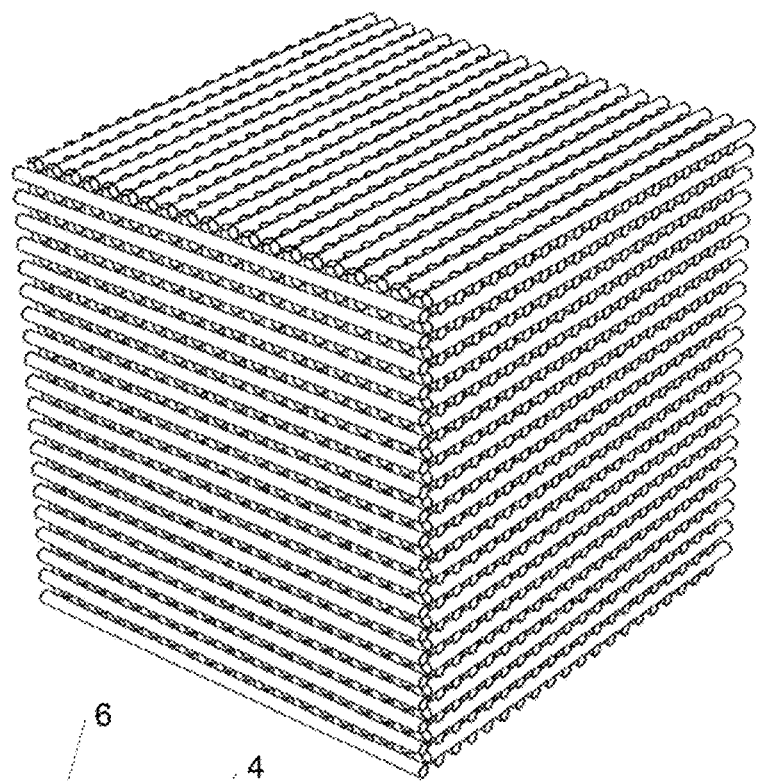
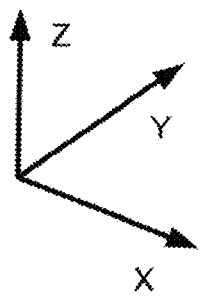
FIG. 1(a)
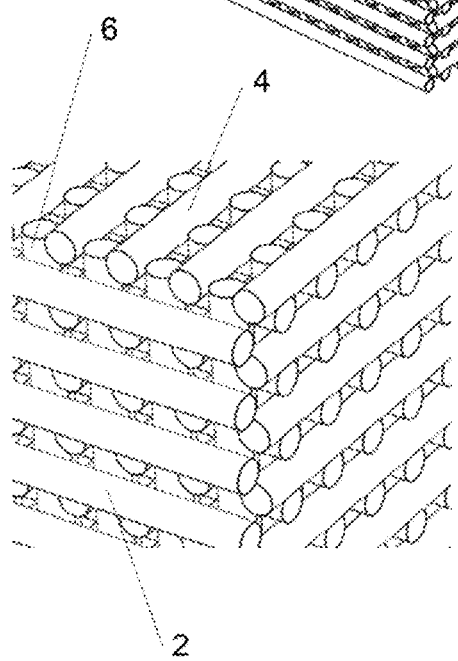
FIG. 1(b)
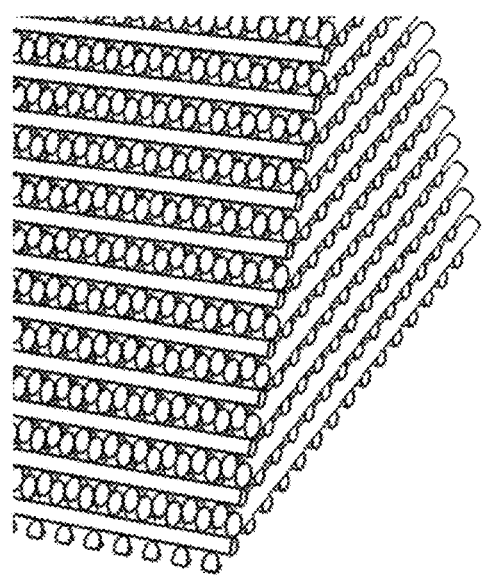
FIG. 1(c)

FIG. 2(a)
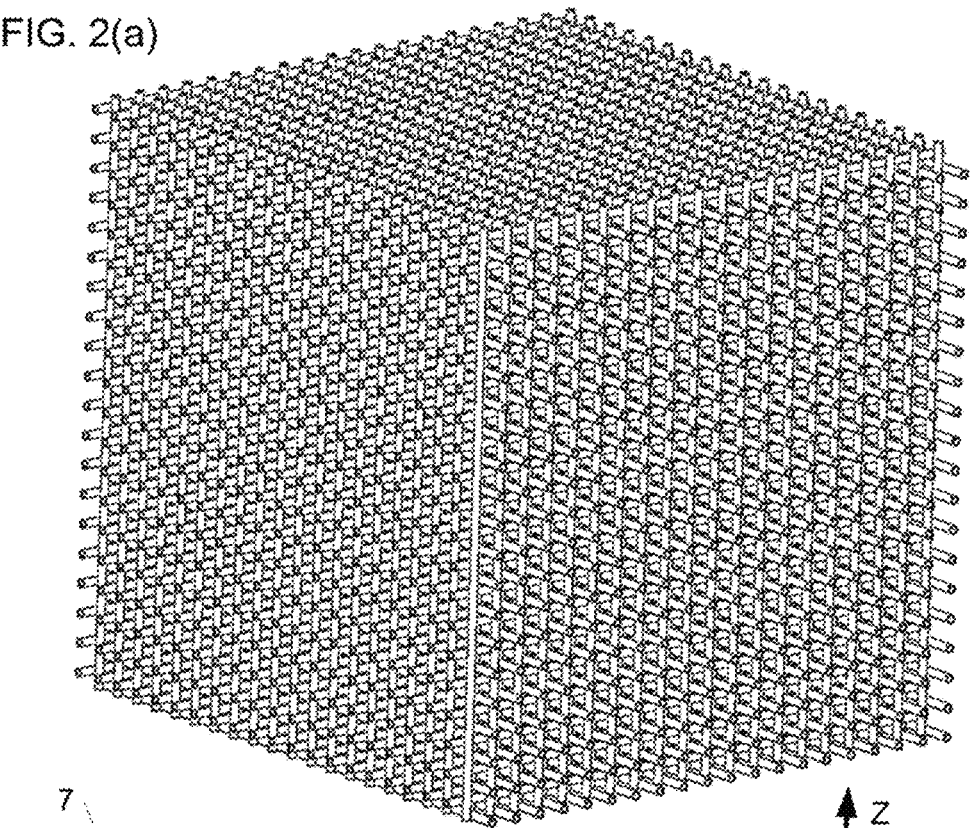
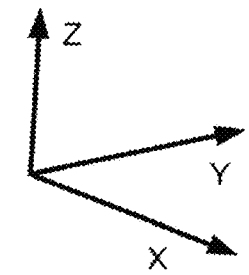
FIG. 2(b)
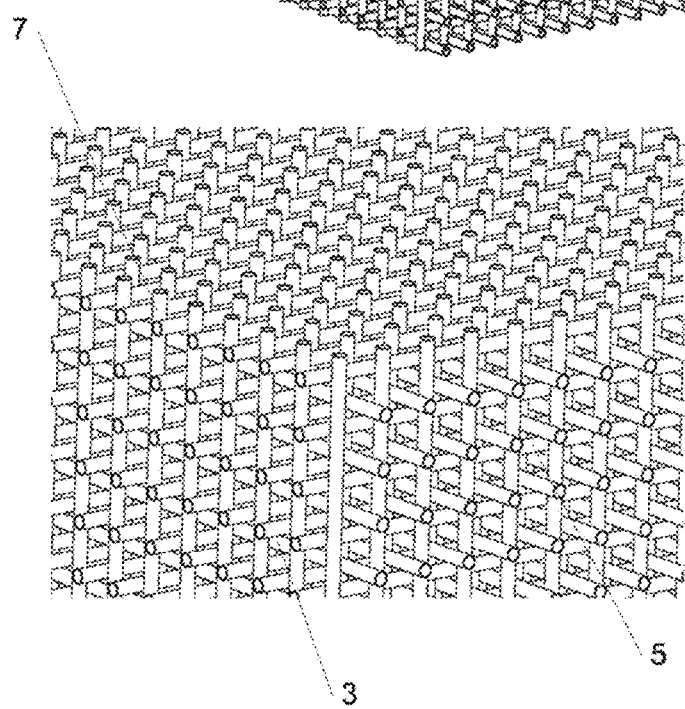

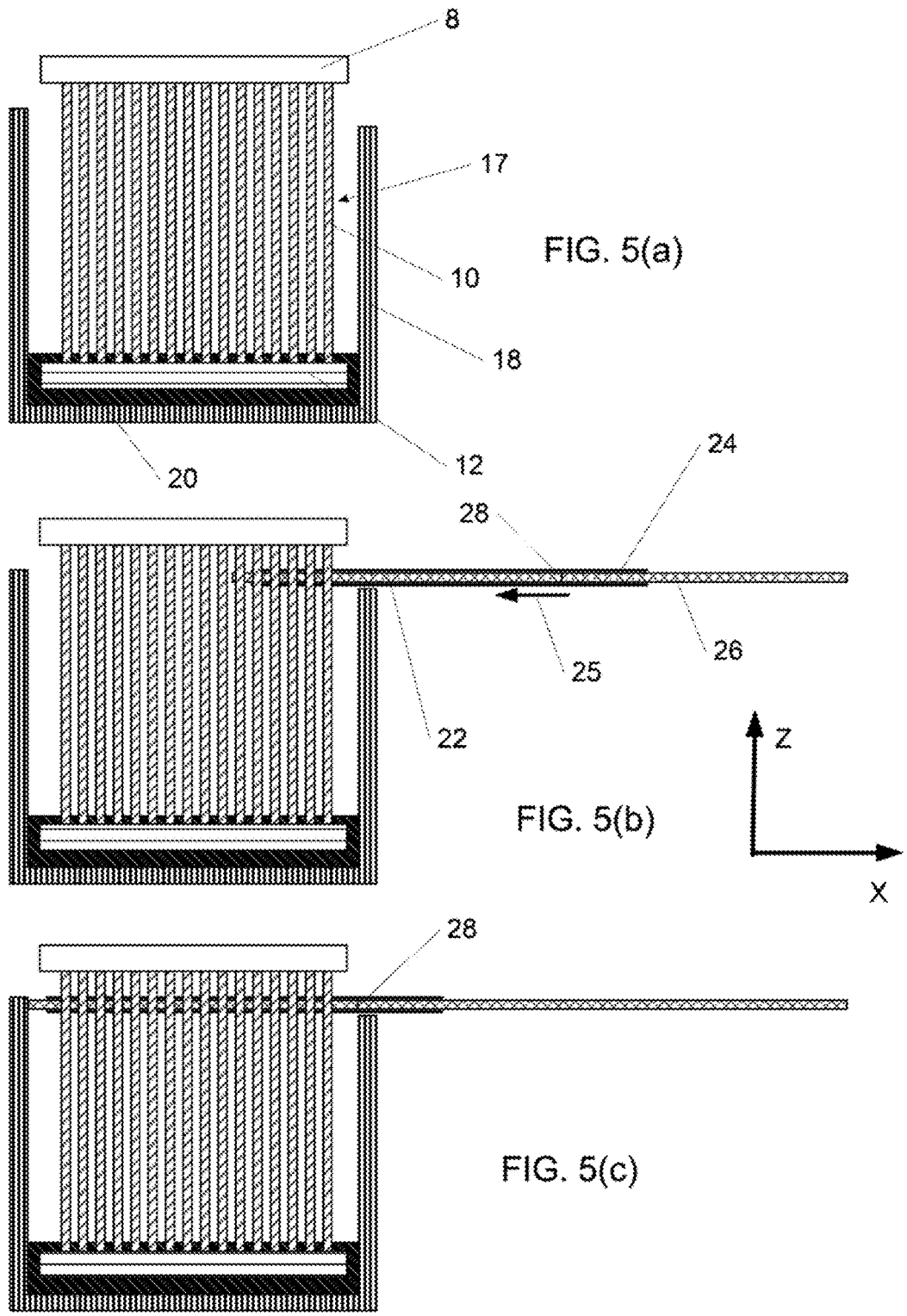

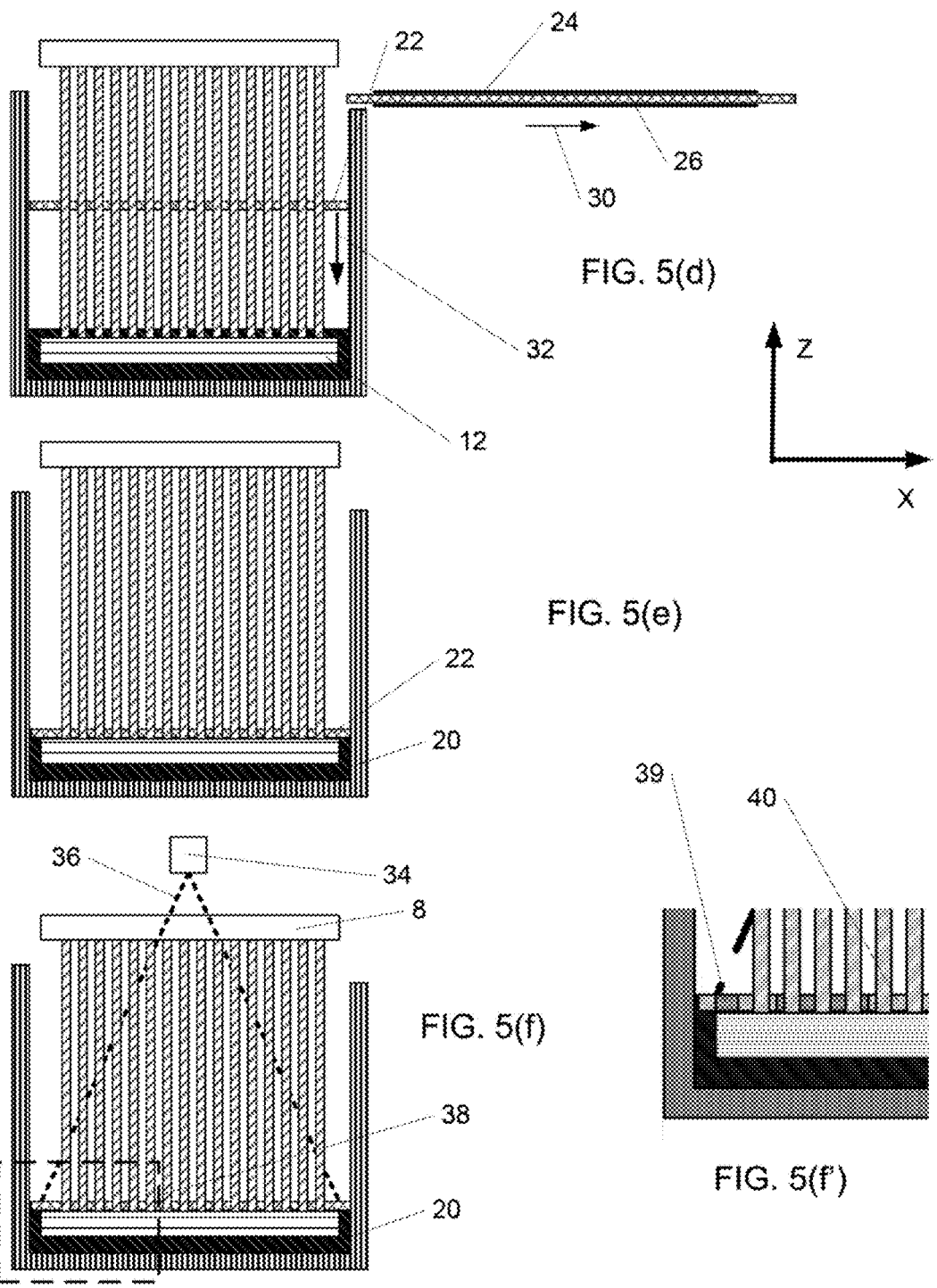

56

56

56

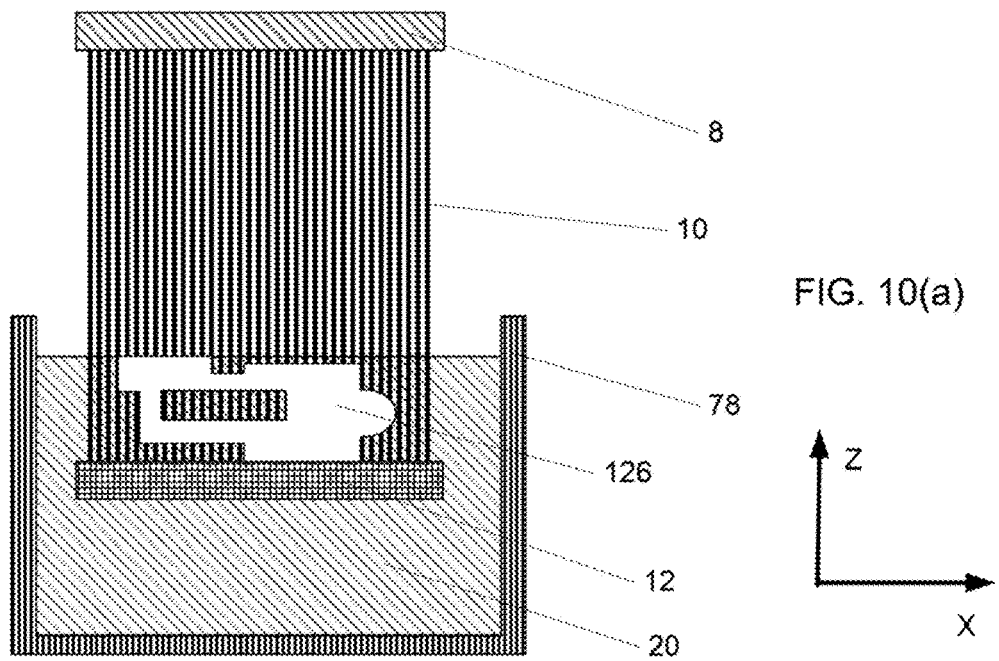
FIG. 10(a)
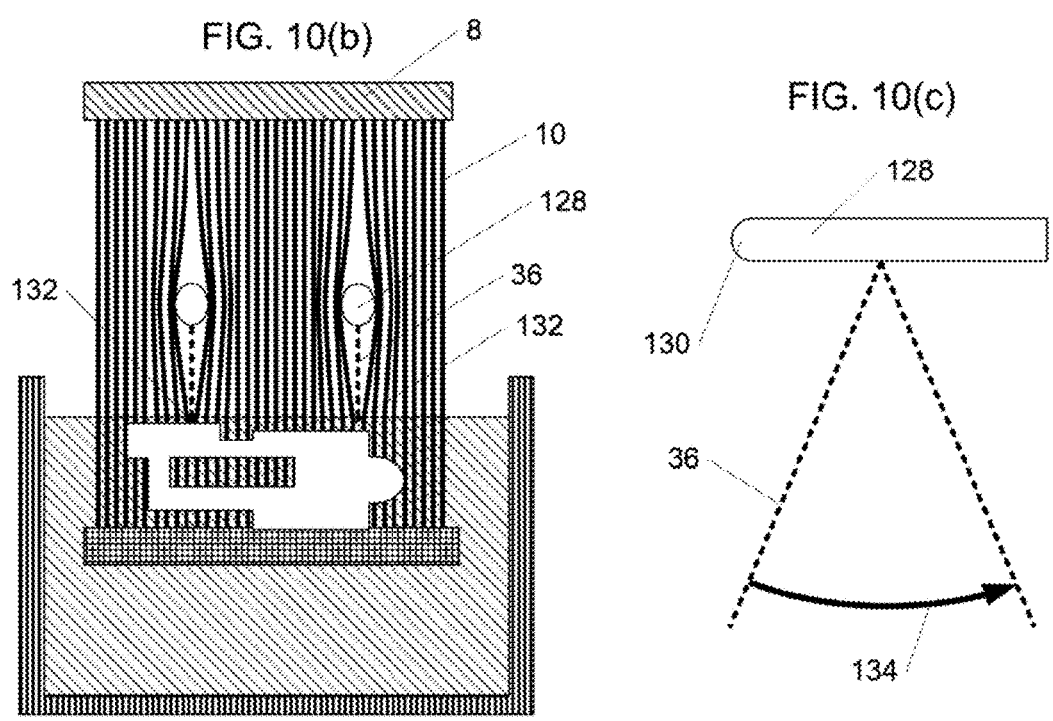
FIG. 10(b)
FIG. 10(c)

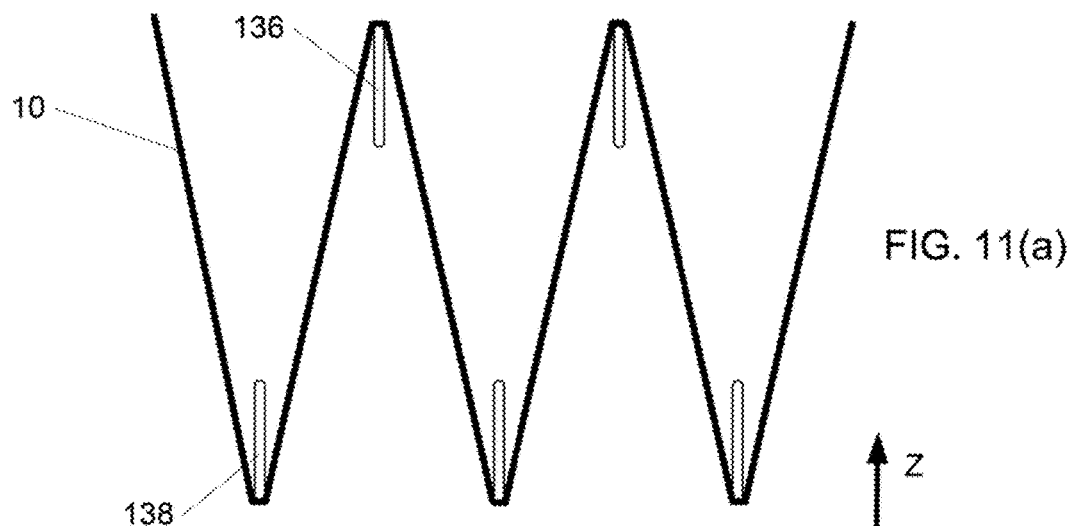
FIG. 11(a)
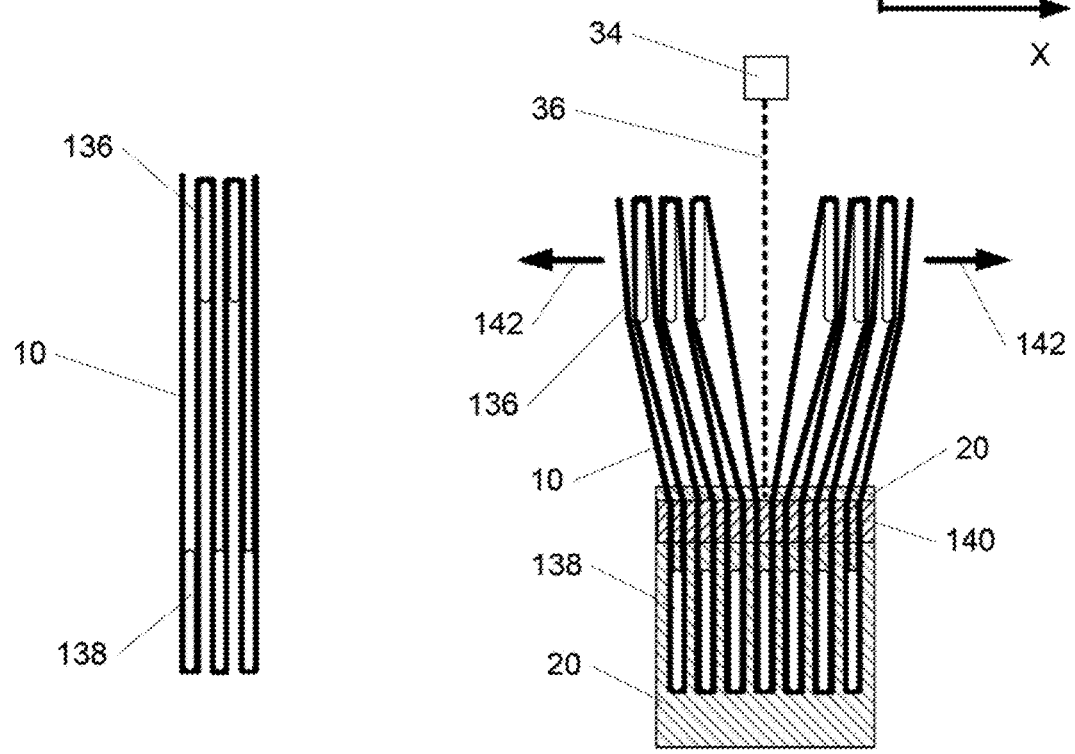
FIG. 11(b)
FIG. 11(c)

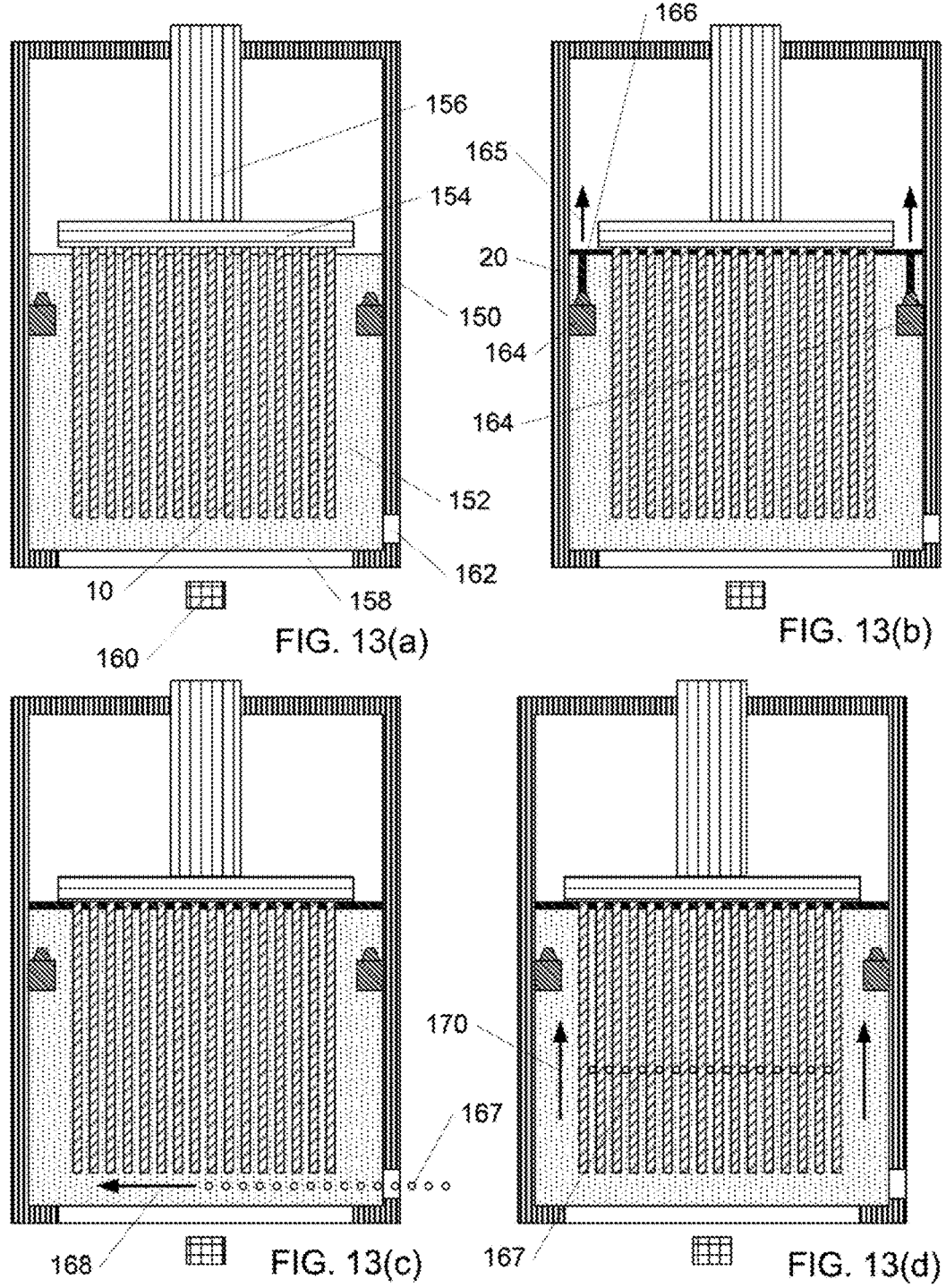

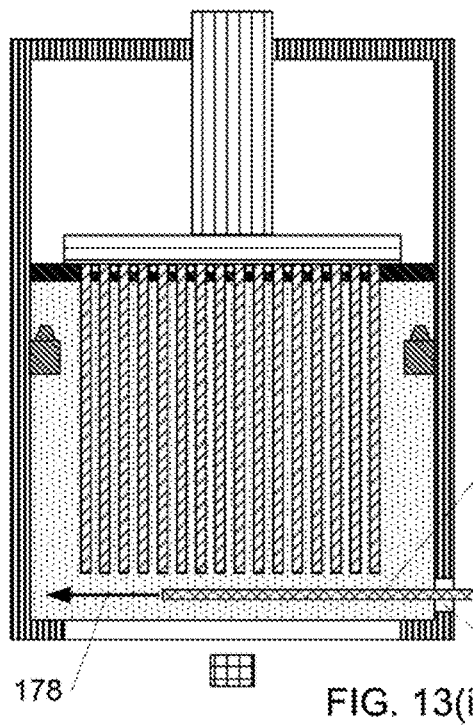
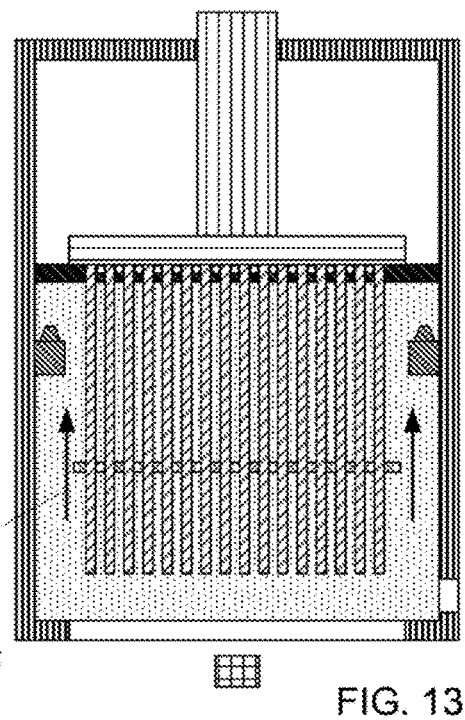
FIG. 13(i)
FIG. 13(j)
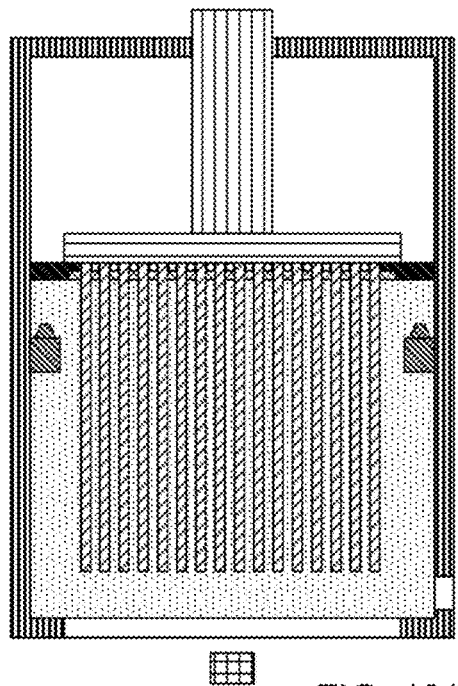
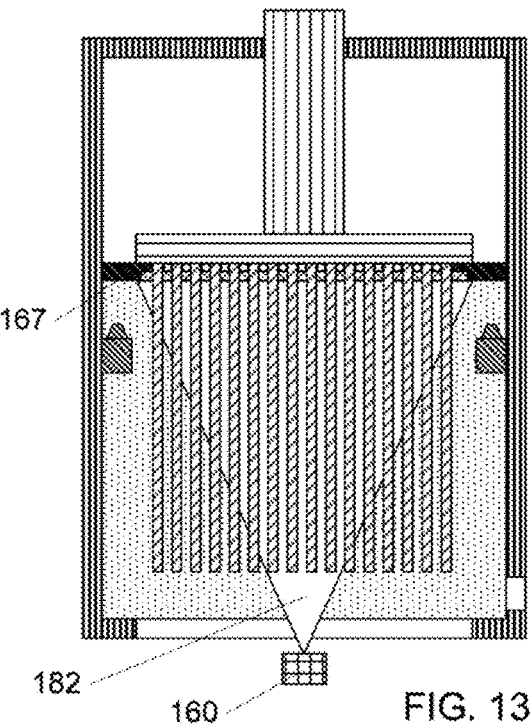
FIG. 13(k)
FIG. 13(l)

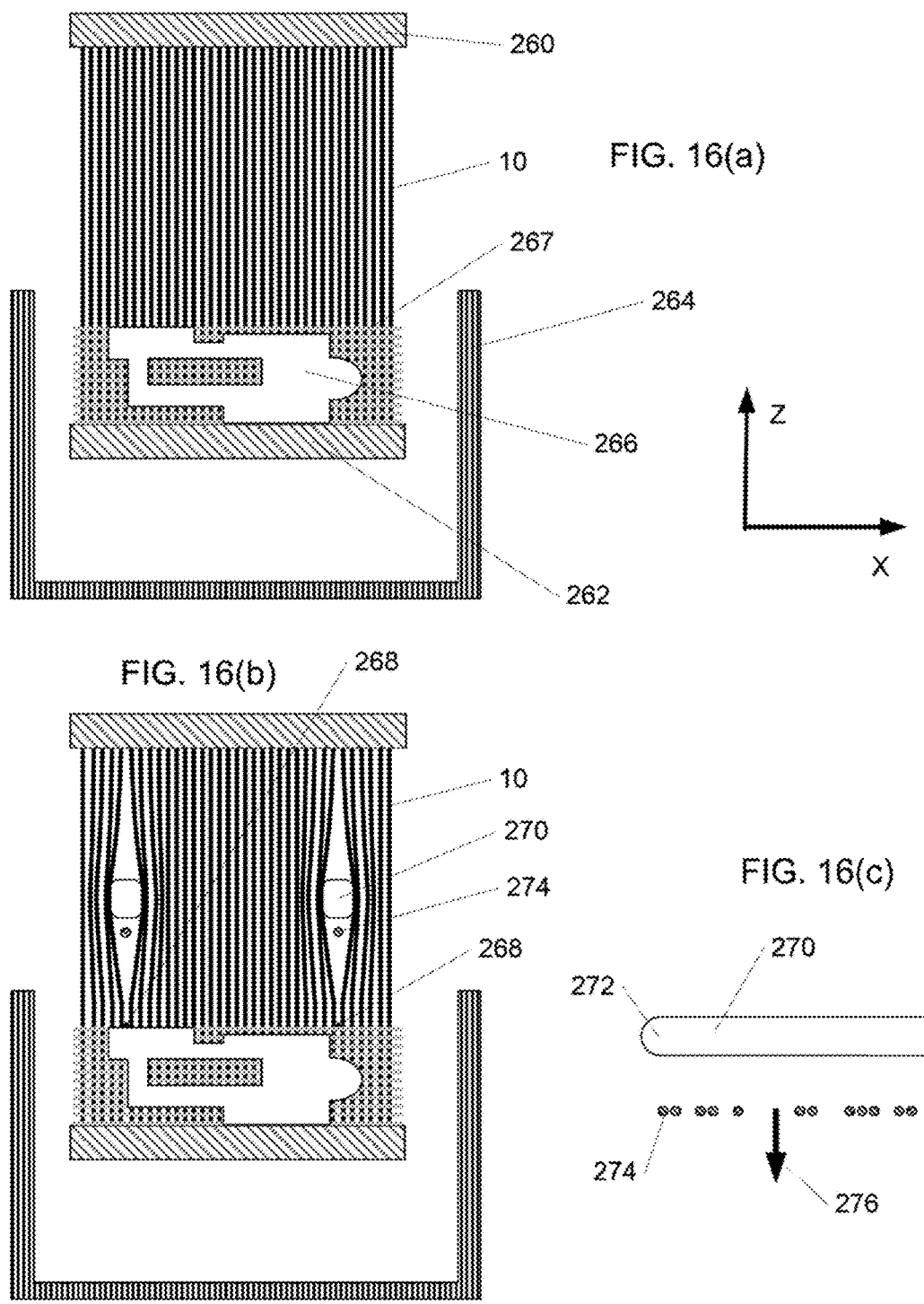

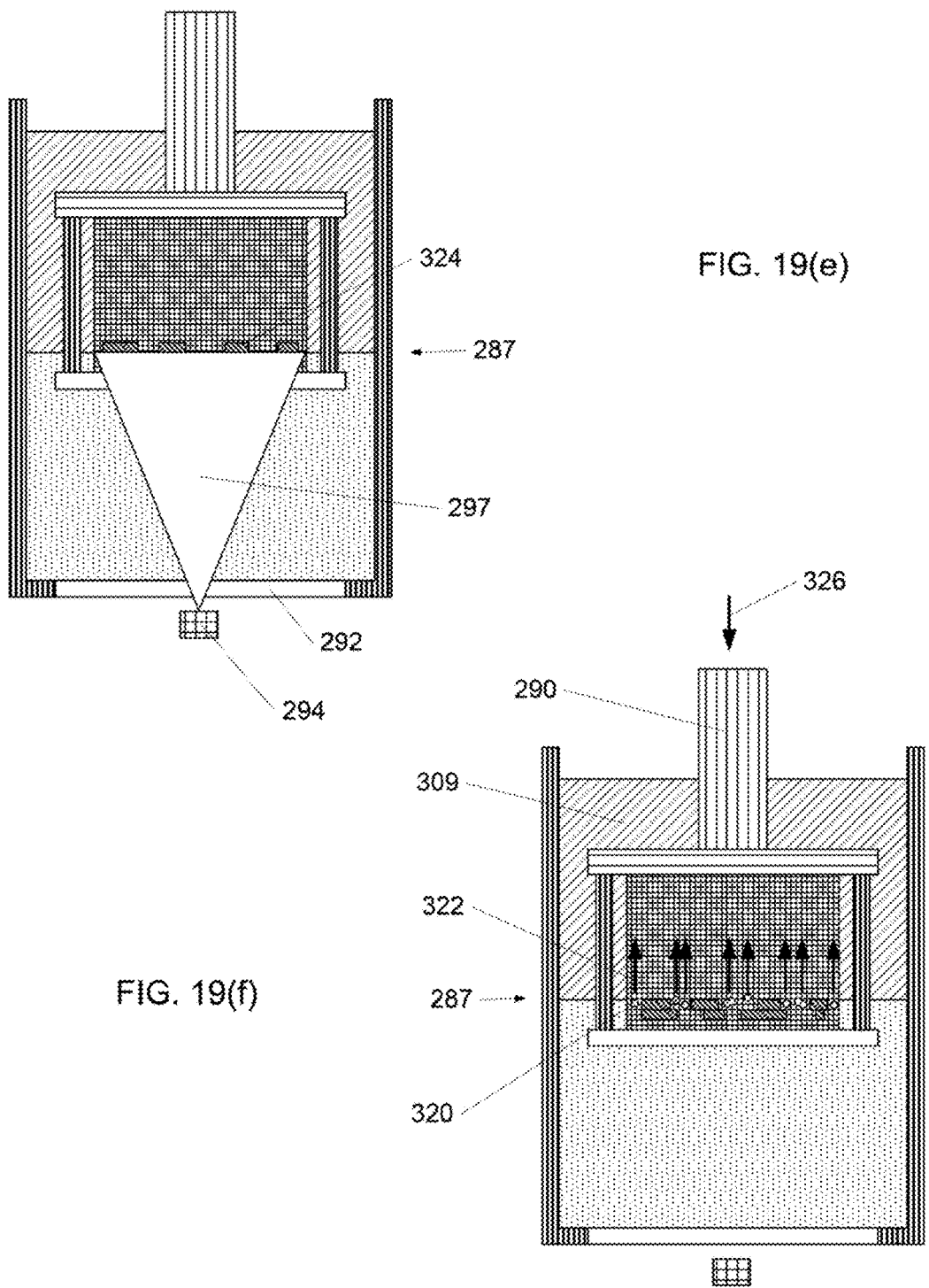

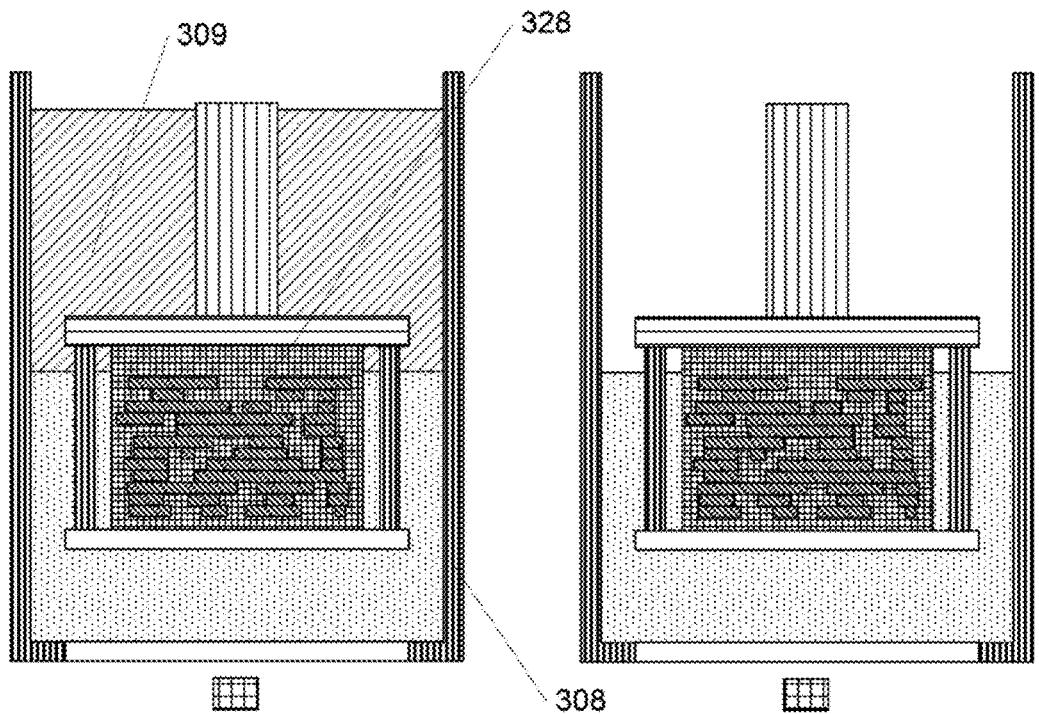
FIG. 19(g)  FIG. 19(h)
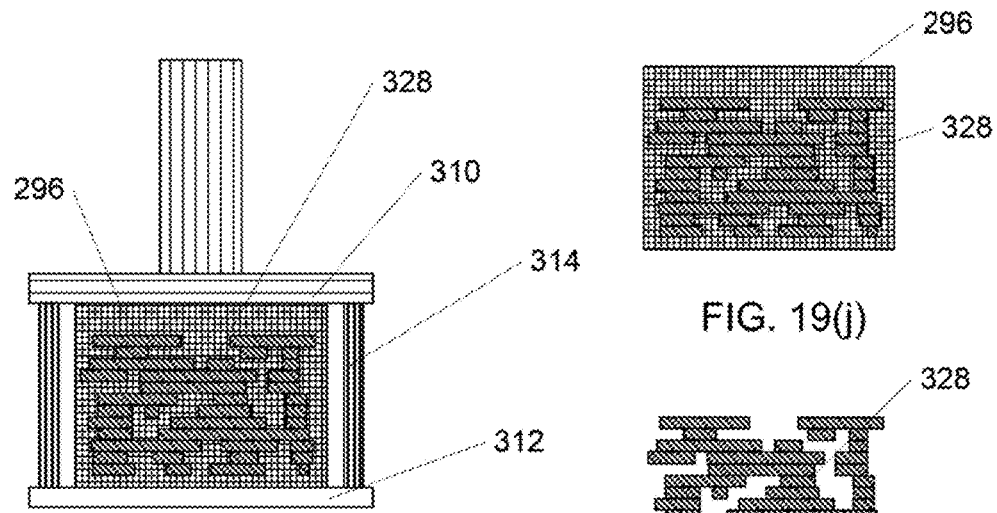
FIG. 19(i)
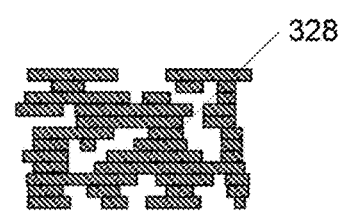
FIG. 19(j)
FIG. 19(k)

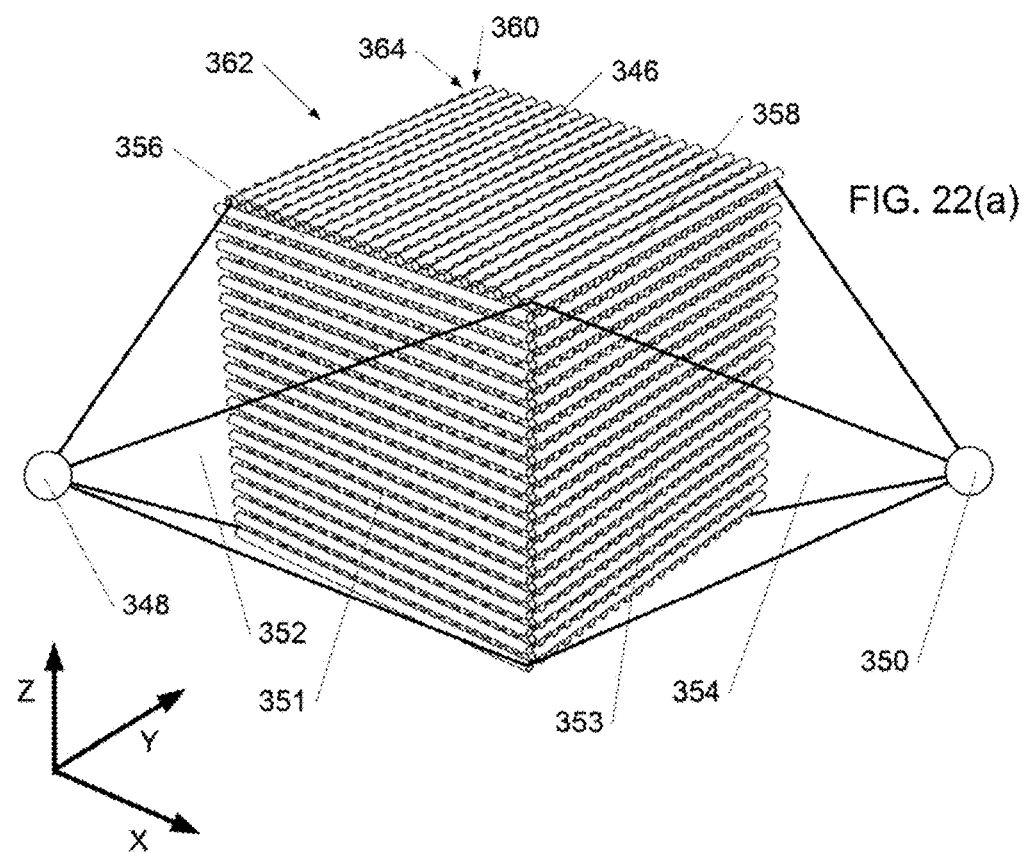
FIG. 22(a)
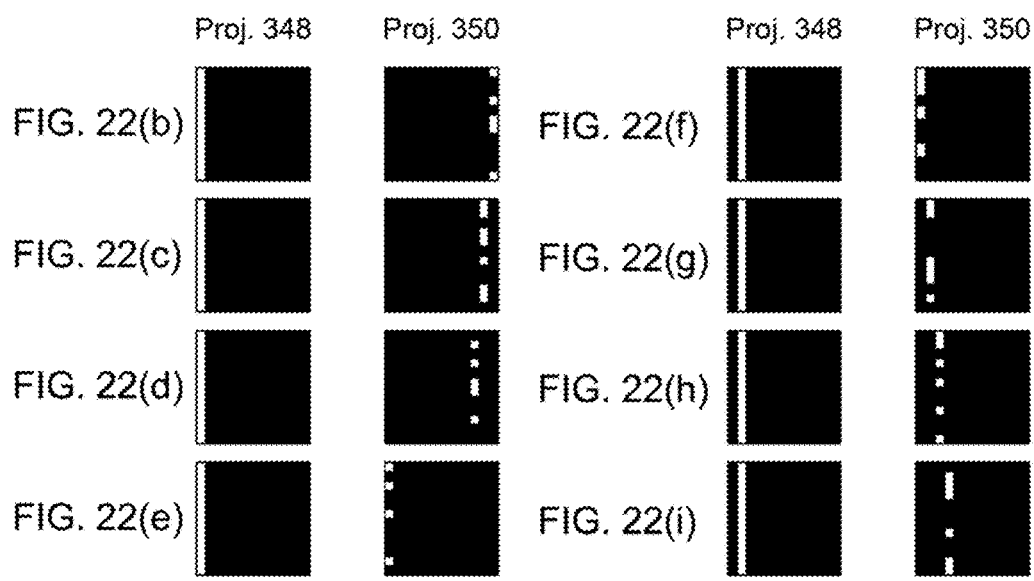
FIG. 22(b) FIG. 22(f)
FIG. 22(c) FIG. 22(g)
FIG. 22(d) FIG. 22(h)
FIG. 22(e) FIG. 22(i)

METHODS AND APPARATUS FOR ADDITIVE MANUFACTURING

CROSS-REFERENCE TO RELATED APPLICATIONS

This Application claims the benefit of priority of U.S. Application Ser. No. 62/163,382 (filed on May 19, 2015), which is incorporated by reference herein in its entirety.

FIELD OF THE INVENTION

The present invention relates generally to the fields of additive manufacturing, fiber-reinforced composite manufacturing, and textile manufacturing.

STATEMENT OF FEDERALLY FUNDED RESEARCH

None.

BACKGROUND OF THE INVENTION

Without limiting the scope of the disclosure, its background is described in connection with 3-D printing/additive manufacturing and with fiber-reinforced composites.

Additive manufacturing (AM, a.k.a. 3-D printing) has demonstrated itself to be highly capable of fabricating models, prototypes, tooling, and end-use parts. AM technologies such as stereolithography [Hull, 1986], selective laser sintering (SLS), and the POLYJET™ process of Stratasys typically build objects one layer at a time using a variety of processes and materials, including polymers. AM offers high geometric complexity, rapid time-to-market, the elimination of tooling and most programming, multi-material parts, and other benefits. However, the strength and stiffness of polymer AM parts is not high, and the opportunity exists to increase both strength and stiffness of AM parts if reinforcing fibers could be integrated into the printed structure. Other work [Mark, 2014 #1 and 2014 #2] has described methods for incorporating reinforcing fibers into or between layers of a part produced using AM, specifically using a modified fused deposition modeling (FDM) process. While the strength and stiffness of parts may be increased with such methods, this is true primarily within the plane of the layers, and not along the axis perpendicular to them; i.e., the resulting parts are highly anisotropic in mechanical properties. Moreover, with many AM processes such as stereolithography, supports made from the same material as the part are needed during the building process, which can be time-consuming and difficult to remove.

In the field of fiber-reinforced composites, it is difficult to obtain isotropic properties: typically, parts are weaker in the direction across the fiber laminations, for example, and stiffness also varies anisotropically. Composites remain fairly costly, in part due to their fabrication being labor-intensive or requiring complex, costly robotic machinery and often custom tooling. Also, the geometrical complexity available to composite parts is limited: certainly greatly so when compared to parts typically made with AM. It is also difficult to produce parts graded in properties.

SUMMARY OF THE INVENTION

The method and apparatus of the invention include a novel, additive manufacturing-based technology for fabricating fiber-reinforced composites wherein continuous fibers (individual fibers or groups of fibers such as yarns and tows) made of materials such as glass, carbon, KEVLAR (aramid), ultra-high molecular weight polyethylene (UHM-WPE), and nylon may be incorporated both parallel to the layers of an AM process, and also perpendicular to those layers, yielding a part that is far more isotropic in mechanical properties.

It is an object of some embodiments of the invention to provide a method and apparatus for fabricating fiber-reinforced polymer parts through an AM process similar in some aspects to stereolithography but fabricating parts having fibers incorporated isotropically within.

It is an object of some embodiments of the invention to provide a method and apparatus for fabricating fiber-reinforced polymer parts through an AM process similar in some aspects to selective laser sintering but fabricating parts having fibers incorporated isotropically within.

It is an object of some embodiments of the invention to provide a method and apparatus for fabricating fiber-reinforced polymer parts through an AM process similar in some aspects to POLYJET but fabricating parts having fibers incorporated isotropically within.

It is an object of some embodiments of the invention to provide a preform of fibers arranged substantially parallel to the layering (Z) axis, and to add fibers substantially perpendicular to these fibers as layers are added.

It is an object some embodiments of the invention to fabricate composite objects in which fibers are rendered substantially invisible so as to allow selective exposure of a solidifiable material in the presence of those fibers, by using an index-matching liquid.

Other objects and advantages of various embodiments of the invention will be apparent to those of skill in the art upon review of the teachings herein. The various embodiments of the invention, set forth explicitly herein or otherwise ascertained from the teachings herein, may address one or more of the above objects alone or in combination, or alternatively may address some other object ascertained from the teachings herein. It is not necessarily intended that all objects be addressed by any single aspect of the invention even though that may be the case with regard to some aspects. Other aspects of the invention may involve combinations of the above noted aspects of the invention. These other aspects of the invention may provide various combinations of the aspects presented above as well as provide other configurations, structures, functional relationships, and processes that have not been specifically set forth herein.

BRIEF DESCRIPTION OF THE DRAWINGS

FIGS. 1(a)-2(b) depict interleaved fibers parallel to X, Y, and Z axes.

FIGS. 5(a)-(m) show an apparatus and steps in a method for producing a fiber composite using inserted fibers used in some embodiments.

FIGS. 10(a)-(c) depict an apparatus and method for exposing resin in the presence of fibers used in some embodiments.

FIGS. 11(a)-(c) show a preform and its use in some embodiments.

FIGS. 16(a)-(c) show an apparatus and method for depositing resin in the presence of fibers used in some embodiments.

FIGS. 19(a)-(k) depict an alternative apparatus and steps in a method for producing a composite part using an index-matching liquid used in some embodiments.

FIGS. 22(a)-(i) depict apparatus and a method for producing a composite part using fibers which transmit light.

DETAILED DESCRIPTION OF THE INVENTION

According to some embodiments, fiber-reinforced parts may be produced by additive manufacturing using methods and apparatus which modify and extend stereolithography and use photocured (e.g., UV or visible light) or thermally-cured liquid resins such as epoxies or acrylates known to the art of AM and composite manufacturing. The objective of such embodiments is to fabricate a part that is substantially isotropic by incorporating fibers in a multi-axial, interpenetrating mesh which will become integrated within a matrix of resin to form the final part. Unlike many conventionally-manufactured composite parts, which involve laying up fibers onto the surface of a core or mandrel, in some embodiments the fibers may fill the entire volume of the part as shown. The perspective view of FIG. 1(a) depicts such a mesh, in which fibers are disposed substantially parallel to the X, Y, and Z axes (hereinafter, "X fibers", "Y fibers", and "Z fibers"), respectively 2, 4, and 6 in the figure. The mesh is shown in a close-up view in FIG. 1(b), and in a close-up sectional view in FIG. 1(c). In the figure, the fibers are spaced at a pitch equal to twice their diameter, thus making the mesh densely packed (a composite made with such fibers would be about 60% fiber by volume). However, given the circular cross section of the fibers, the voids between the fibers are interconnected, allowing liquid to flow between and around the fibers (in some embodiments, other fiber cross-sectional shapes such as hexagonal and rectangular may be used). The perspective views of FIGS. 2(a) and (b) show an overview and close-up view, respectively, of a mesh that is less densely packed, in which the fiber diameter of X fibers 3, Y fibers 5, and Z fibers 7 is half of what it is in the mesh of FIG. 1. The relative sizing of fiber cross section and fiber pitch may be adjusted globally or locally according to the strength and stiffness requirements, the properties of the resin (e.g., viscosity), the exact process and parameters used for fabrication, etc.

Figure 3:
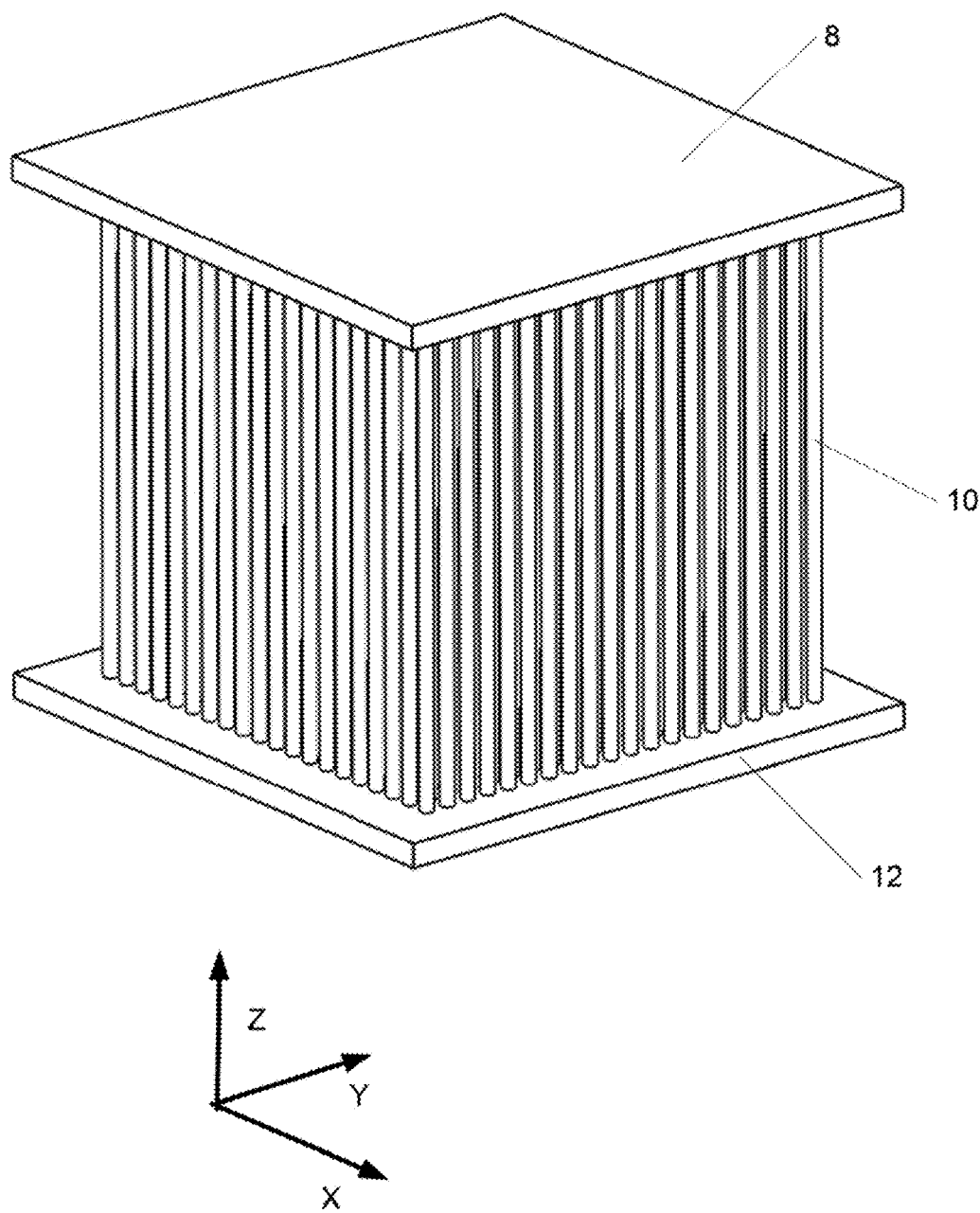
FIG. 3 shows a preform used in some embodiments.

The process begins with a preform such as that shown in the perspective view of FIG. 3. The preform comprises in some embodiments a top 8 which in some embodiment variations is substantially transparent to the radiation used to cure the resin, a set of Z fibers 10, and in some embodiments a bottom platform 12, which in some embodiment variations serves in part to keep Z fibers 10 straight and under tension. Z fibers 10 are in some embodiments spaced apart at a constant pitch along the X and Y axes. In some embodiments, the top is perforated rather than made of a material that is itself substantially transparent. In some embodiments, the preform is made from a stack of sheets stacked along the X or Y directions, with each sheet including a row of fibers, a plate or other shape forming a portion of the preform top, and a plate forming a portion of the platform. The height of Z fibers 10 must be at least as great as the height of the composite part to be made.

Figure 4A:
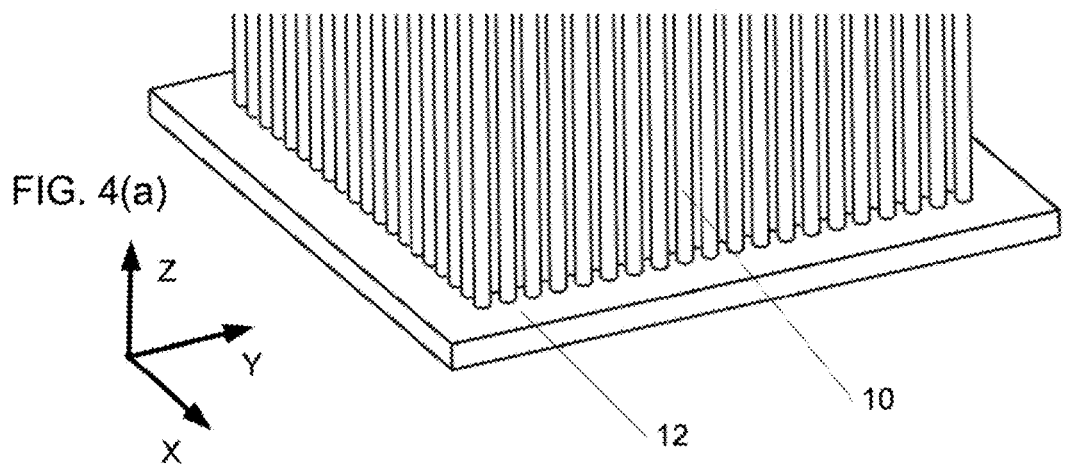
FIGS. 4(a)-(c) depict the addition of X and Y fibers to a preform as used in some embodiments.
Figure 4B:
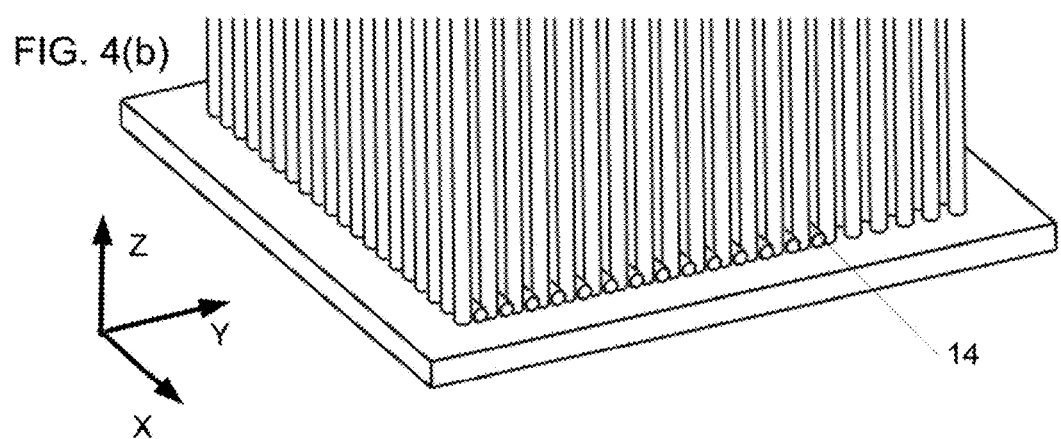
Figure 4C:
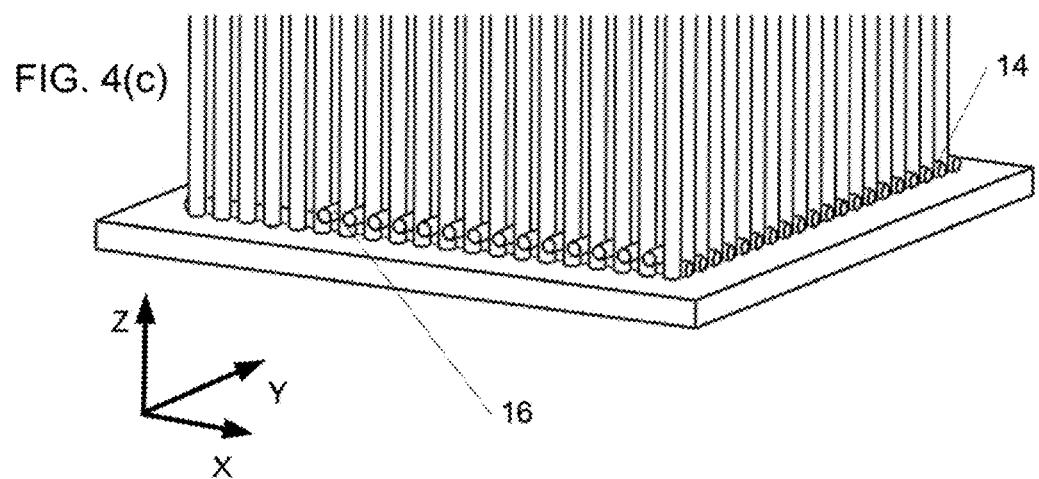

The perspective view of FIG. 4(a) shows the lower portion of the preform of FIG. 3. In some embodiments, the process comprises inserting X fibers 14 between Z fibers 10 as shown in FIG. 4(b) and alternating this with inserting Y fibers 16 between Z fibers 10 as shown in FIG. 4(c) in a repeating, layer-by-layer manner. For each layer of fiber, resin is introduced or its level adjusted such that the resin substantially envelopes the fibers. The resin is selectively cured to form cross-sections of the composite part comprising fibers and a cured resin matrix. In some embodiments, X (or Y) fibers are inserted one at a time for a given layer (e.g., FIG. 4(b) in which X fibers 14 are inserted from left to right, toward positive Y, or FIG. 4(c) in which Y fibers 16 are inserted one at a time from right to left, toward negative X). In other embodiments, fibers are inserted in groups; indeed, all X fibers 14 or all Y fibers 16 for a given layer may be inserted simultaneously using multiple delivery tubes.

FIG. 5(a) is a cross sectional elevation view of an apparatus for fabricating a composite part, while FIGS. 5(b-m) are a set of cross sectional elevation views depicting a sequence for fabricating a composite part according to some embodiments.

In FIG. 5(a), the preform 17 of FIG. 3, comprising top 8, Z fibers 10, and platform 12, is shown immersed in vat 18 whose primary function is to contain liquid resin. In some embodiments, top 8 is supported and platform 12 is not, and a force may also be applied to platform 12, such that Z fibers 10 are in tension by virtue of the weight of platform 12 pulling on them. Not shown for clarity in most of the sub-figures of FIG. 5 is an imaging system located above the top of the preform. The level of the resin 20 inside vat 18 may be gradually increased by introducing it through the top or another opening, ensuring that there is adequate resin 20 to immerse and surround each layer of fibers. As the resin level rises, the imaging system may rise relative to the top surface of the resin, or the resin surface may be maintained at the same position, and the preform lowered gradually into the resin within the vat (see the description associated with FIG. 8). In such embodiments, the X and Y fibers need fall only a short distance if at all when inserted as is described below, and in some embodiment variations, the preform may be lifted partway out of the vat so that fibers can be inserted. Before X fibers are inserted, the resin level may be adjusted to be suitable for the entire layer after all X fibers have been added (i.e., making allowance for their displaced volume), or the level may be adjusted during or after fiber insertion.

In the example shown in FIG. 5, X and Y fibers alternate from layer to layer, with X fibers forming a portion of odd layers and Y fibers forming a portion of even layers. In FIG. 5(b), an X fiber 22 supported within delivery tube 24 has begun to be inserted along the X axis between a pair of Z fibers 10, with both tube 24 and X fiber 22 moving as shown by arrow 25 toward negative X. Tube 24 is preferably metallic and grounded to minimize the risk of triboelectric charging. Insertion of a single fiber at a time is assumed hereinafter for clarity and as an example, but in some embodiments multiple fibers may be inserted simultaneously, or in a time-staggered manner. Delivery tube 24 advances as far as needed, based on the fiber stiffness and strength, to provide support for fiber 22. Meanwhile, in some embodiments, X fiber 22 advances within tube 24, pushed along in some embodiment variations by a second X fiber 26 behind it. Soon the right end 28 of fiber 22 arrives at the proper position within Z fibers 10 and inside vat 18 and stops moving (FIG. 5(c)). As shown in FIG. 5(d), delivery tube 24 is then withdrawn as shown by arrow 30, allowing X fiber 22 to fall as shown by arrow 32 onto platform 12 (or previous layer of fibers), as shown in FIG. 5(e). As fiber 22 makes contact with resin 20 and is at least partially submerged, the level of resin 20 naturally rises slightly. In some embodiment variations, Z fibers 10 and/or entire preform may be vibrating to facilitate descent of inserted fibers such as fiber 22. While tube 24 is withdrawing, fiber 22 may be prevented from withdrawing along with it (e.g., due to friction) by the second fiber 26, located in the tube just behind it. In some embodiment variations, fibers may be delivered across the preform without the assistant of tubes or other supports, but may be stiff enough to be cantilevered, supported at only their ends. In some embodiment variations, fibers is placed vertically (parallel to Z) or at an angle and simply allowed to fall between the rows of Z fibers 10. In some embodiment variations, fibers are "shot" between rows of Z fibers by having them carried along on a jet of air or liquid as with air-jet and water-jet looms, launched as projectiles from a fiber shooting device as with projectile looms, pulled across by hooks as with rapier looms, transported by a shuttle containing one or more fibers as with shuttle looms, transported magnetically, etc. In some embodiments in which fibers do not descend completely and float on the resin, they can be clamped at their ends or elsewhere, or weighted.

In FIG. 5(f), imaging system 34 (now visible), which may comprise a laser (e.g., ultraviolet, visible, or infrared) and scanner (e.g., rotating polygon or galvanometer mirror), exposes resin 20 through transparent top 8 as indicated by beam 36 so as to cure it at least partially in the vicinity of Z fibers 10 and X fiber 22. Refractive distortion of the image due to top 8 may be compensated for in some embodiments. In some embodiments in which X fibers for a given layer are inserted individually or in groups (as opposed to embodiments in which all fibers are inserted simultaneously), resin 20 is exposed to radiation in the region of the inserted X fiber(s), then the fiber delivery apparatus comprising tube(s) 24 indexes along the Y axis, and the process shown in FIGS. 5(b)-(e) repeats for the next X fiber or fiber group. In some embodiments, indexing may be avoided by projecting a linear image (e.g., collimated) onto a scanner (e.g., polygonal mirror) which spans the entire width of the part to be produced. Imaging system 34 may move along the Y axis along with the fiber delivery apparatus, exposing resin 20 after each fiber or fiber group is inserted. In other embodiments, all the X fibers needed for a given layer are first inserted, after which resin 20 is exposed over the entire layer; this approach may provide a more uniform and accurate level of resin 20.

Because of Z fibers 10, and especially when the level of resin 20 and the layer being fabricated are far below the top of the preform, exposure must be performed in a manner that minimizes or avoids shadowing, refractive, or diffractive optical distortion by Z fibers 10. An imaging system similar to those used in stereolithography or SLS—in which laser light from a scanner that is centered over the resin tank or powder bed exits in a cone-like pattern to illuminate the resin or bed—cannot without special provisions work in this context, as there would be a very significant interaction between the light cone and Z fibers 10. Thus, in some embodiments, light rays exposing resin 20 are arranged to be substantially parallel to Z fibers 10 along at least the X or Y axis. For example, in FIG. 5(f), the aperture of imaging system 34 is in some embodiments centered above the "corridor" between two adjacent rows of Z fibers 10 (e.g., in FIG. 5(f) these corridors run parallel to the X axis). In this case, beam 36 can be scanned in a 1-D (or narrow 2-D) flat, fan-like pattern as shown in FIG. 5(f) to expose resin 20 within that corridor, or alternatively, the beam can be parallel to the Z axis and mechanically scanned along the X axis within the corridor. The imaging system can then be indexed (e.g., mechanically) over to another (e.g., the adjacent) corridor and the process repeated. This effectively creates a raster scan of parallel lines; however, the beam may in some embodiments scan over an narrow area in which some beam movements are not parallel to the primary (e.g., X) raster line axis. Alternatively, imaging system 34 may produce a projected image (e.g., using a Texas Instruments (Dallas, Tex.) Digital Light Processing (DLP) device) with optics that are telecentric, such that all rays are parallel to the Z fibers. With such collimated radiation, an entire layer of resin 20 can be exposed while minimizing interaction with the fibers 10. In some embodiments, in order to cure resin between Z fibers forming the walls of a corridor (e.g., between two adjacent Z fibers 10 forming a portion of the X-axis corridor of FIG. 5(f)), imaging system 34 may be rotated by 90 degrees so the it can also scan along corridors parallel to the Y axis. This may be performed in addition to, or instead of, scanning along the X axis as shown in FIG. 5(f).

As shown in FIG. 5(f), which is a magnified view of the area enclosed by dashed rectangle 38 in FIG. 5(f), selected regions 39 of the resin are exposed to light, curing them, while other regions 40 are left uncured and remain in liquid form. Exposing the resin in some embodiments completes the formation of layer 1 of the part.

Figure 5G:
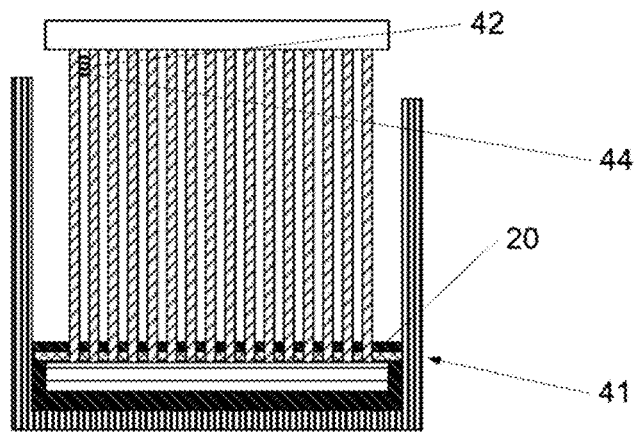
Figure 5H:
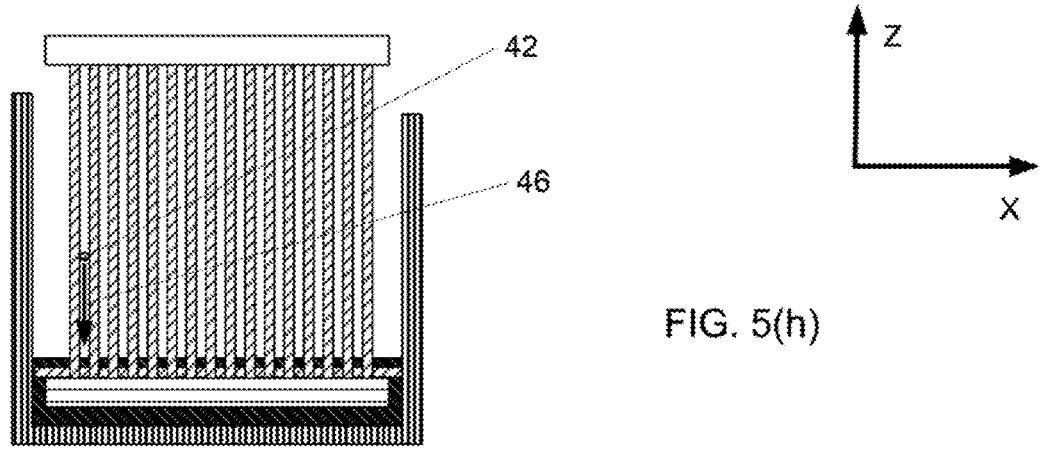
Figure 5I:
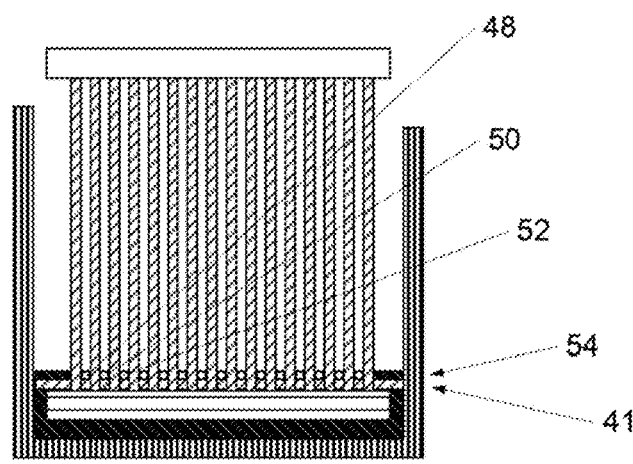
Figure 5J:
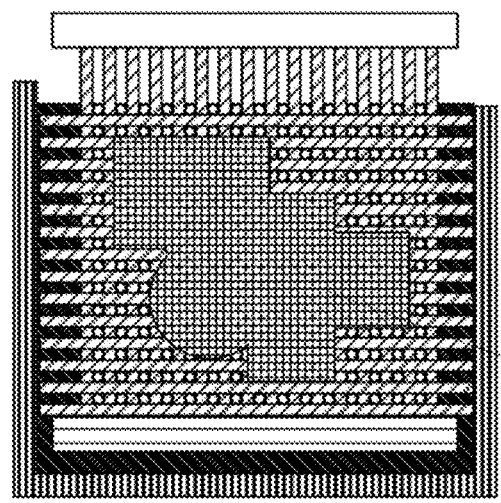
Figure 5K:
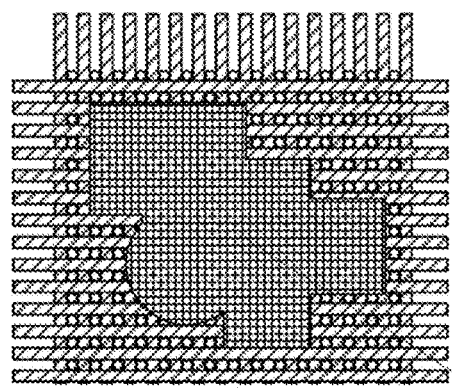
Figure 5L:
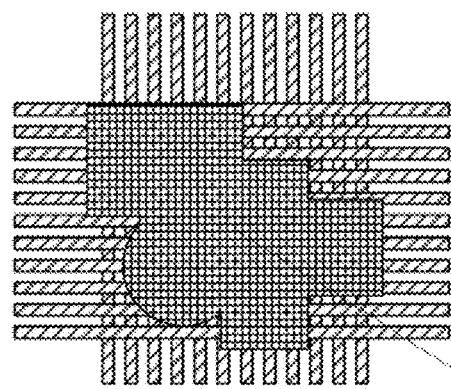
Figure 5M:
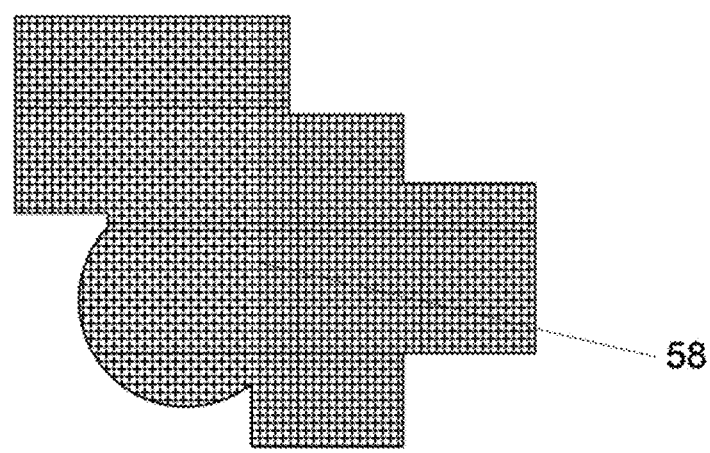

In FIG. 5(g), layer 1 (reference number 41) has been completed. FIGS. 5(g)-(h) depict the process, similar to that described for inserting the X fibers, for inserting the Y fibers that form a portion of layer 2. Thus, FIG. 5(g) is equivalent to FIG. 5(b) or FIG. 5(c), while FIG. 5(h) is equivalent to FIG. 5(d). In FIG. 5(g), Y fiber 42 is shown in delivery tube 44. In FIG. 5(h), Y fiber 42 descends as shown by arrow 46. In some embodiments, vat 18 may be rotated 90 degrees around the Z axis relative to imaging system 34 and fiber delivery apparatus to allow insertion and curing of both X and Y fibers, while in other embodiments, one or both of imaging system 34 and fiber delivery apparatus may be duplicated so both X and Y fiber insertion and curing is possible without rotation of vat 18.

As already described, in the current example it is assumed that X and Y fibers alternate on every layer. However, other patterns are possible, depending on the requirements for strength, stiffness, or other properties. For example, there may be two adjacent layers having X fibers which alternate with one layer having a Y fiber, this can be useful if more strength or stiffness is required along the X axis than the Y axis.

In FIG. 5(*i*), in which several of the Y fibers 48, 50, and 52 are identified, layer 2 (reference numeral 54) has been completed, with all fibers inserted and the resin cured, much as with layer 1. While the current example assumes that in a single layer all fibers have only one orientation (i.e., they are X fibers or Y fibers, but not both), in some embodiments a single layer (i.e., representing the geometry of a single part cross section) may include fibers with two or more orientations.

FIG. 5(*j*) shows part 56 after all of its layers have been formed through a process of inserting fibers and selectively curing the resin. As the level of resin 20 rises within vat 18, imaging system 334 also may rise and/or refocus on the surface of resin 20. For clarity, fibers within the part are not shown. Part 56 is still attached, primarily through fibers 10 to top 8 and platform 12. It is then extracted from vat 18 and excess resin 20 is drained, vacuumed, or otherwise removed, as in FIG. 5(*k*). The part may also be washed (e.g., with isopropyl alcohol). In FIG. 5(*l*), fibers which are not embedded at least partially in part 56 have been removed. If desired, part 56 may be further cured (e.g., with ultraviolet light or thermal processing). Finally, in FIG. 5(*m*), the unembedded portions of fibers are removed, leaving finished composite part 58. The removal of unembedded fibers may be accomplished by chemical dissolution of the exposed, unembedded fiber, waterjet, sand or bead blasting, tumbling, manual or automated bending and fracturing of the fibers, embedding in a material that is solidified and then removed (similar to plucking a chicken or waxing unwanted hair). Some of these methods rely on the brittleness of unembedded fibers, in comparison with fibers which are surrounded by the cured resin matrix. In some embodiments, part 58 may be further processed (e.g., machined, polished). Some methods may work better for fibers within recessed and/or internal areas, and in some embodiments holes may be provided to facilitate removal of such fibers.

Figure 6:
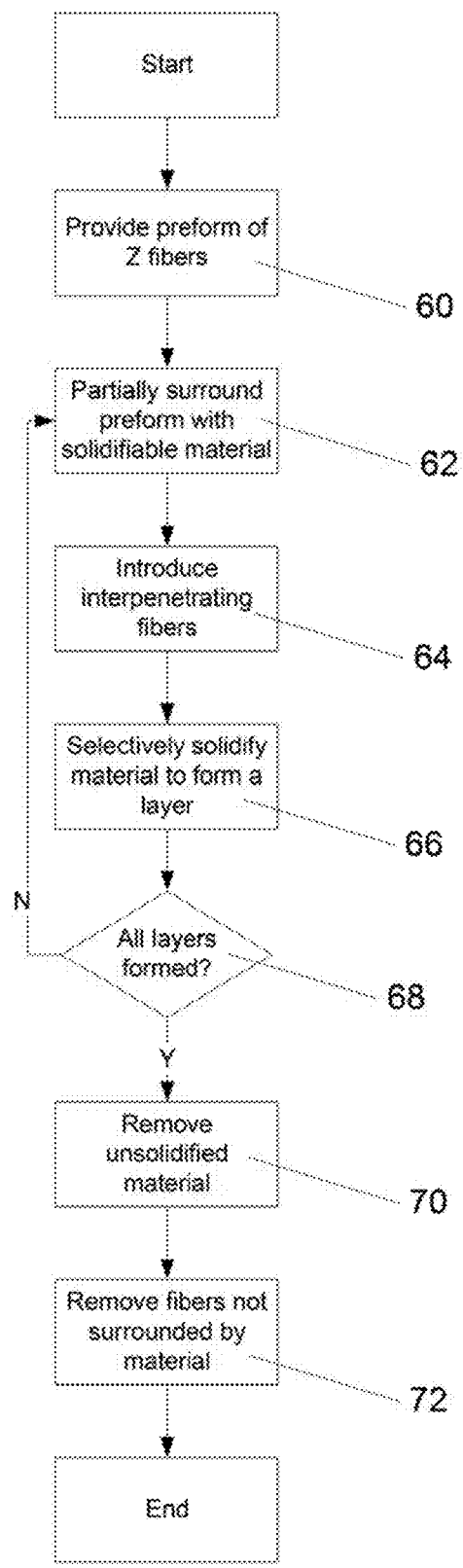
FIG. 6 depicts a flowchart describing a method for fabricating composite parts used in some embodiments.

The overall flow of the process according to some embodiments such as that shown in FIG. 5 is shown in FIG. 6. Box 60 describing a step comprising providing a preform of Z fibers. This is followed by box 62 describing a step comprising partially surrounding the preform with solidifiable material (e.g., a photocurable resin in the embodiment of FIG. 5). Subsequently, as indicated by box 64, a step comprising introducing fibers such as X fibers, Y fibers, or both, or fibers at other angles, such that the introduced fibers interpenetrate the Z fibers, is performed. Then, a step as described by box 66 occurs, comprising selectively solidifying the solidifiable material in the pattern of a part cross section to form a layer. In some embodiments, the order of steps indicated by boxes 62-66 may be varied from that shown.

With a layer now completed, box 68 represents a decision as to whether all required layers have been formed. If not, then the process returns to the step of box 60. However, if all layers are completed, then as shown by box 70 unsolidified material is removed, and unused and totally unembedded fibers are also optionally removed. Lastly, as depicted by box 72, protruding portions of fibers which are partially embedded in solidified material are removed.

Figure 7A:
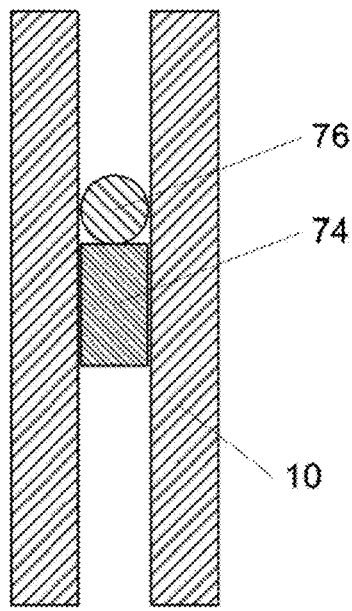
FIGS. 7(a)-(c) show fibers supported between other fibers according to some embodiments.
Figure 7B:
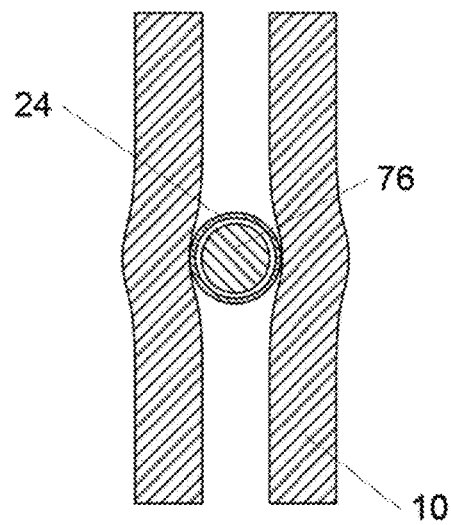
Figure 7C:
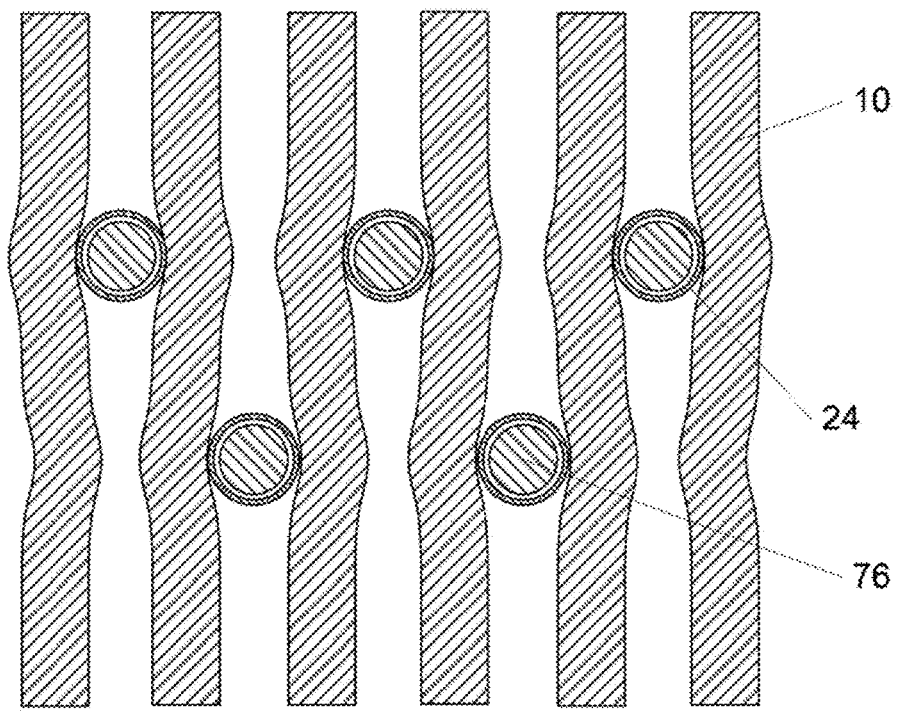

In some embodiments delivery tube 24 (FIG. 5), or at least the portion of it that extends between Z fibers 10, may not be a tube, but rather a narrow support 74 extending only or primarily beneath X or Y fiber 76 as in the elevation view of FIG. 7(*a*), since the X or Y fiber is prevented from falling off the support by the surrounding Z fibers 10, and need not rely on the walls of the tube for this. This approach can minimize deformation of the Z fibers when the ratio of fiber or tube diameter to fiber pitch is large. As shown in the elevation view of FIG. 7(*b*), Z fibers 10 may deform slightly to allow insertion of X or Y fibers and/or tube 24, which may be significantly larger than the gap between Z fibers 10. To accommodate this distortion with minimal risk of damage to Z fibers 10, the location at which fibers are inserted may in some embodiments be as far as possible from top 8 or platform 12 (see FIG. 3), and the length of Z fibers 10 may be increased to provide greater flexibility. If multiple X or Y fibers 76 are inserted simultaneously as in the elevation view of FIG. 7(*c*), then especially if tubes 24 with diameters larger than the gap between Z fibers 10 are used, the fibers can be inserted in a staggered, multi-row fashion as shown, rather than all at the same height; this allows Z fibers 10 to bend around tubes 24.

In some embodiments, by arranging for the fiber diameter to be at least slightly smaller than one half the pitch, the X and Y fibers can easily fall between the Z fibers, with minimal friction, even if unweighted. Such fibers and also the delivery tube, if used, should have a smaller outside diameter, minimizing potential deformation of the Z fibers.

FIG. 8(*a*) is a cross sectional elevation view of an apparatus for fabricating a composite part, while FIGS. 8(*b-l*) are a set of cross sectional elevation views depicting a partial sequence for fabricating a composite part according to some embodiments. In FIG. 8(*a*), the preform 17 of FIG. 3, comprising top 8, Z fibers 10, and platform 12, is shown partially immersed in resin 20 contained within vat 78. Outside vat 78 are moving fiber delivery tubes 80 (one shown) through which continuous X fibers 82 (one shown) are passed, supplied by spools 84 (in some embodiment variations one spool. e.g., with dividers, may be used). Fibers and tubes may be staggered as in FIG. 7(*c*) and fiber insertion through preform 17 can be simultaneous or temporally-staggered. Provided along the path of X fibers 82 is movable cutter 86 and anvil 88 on the near side of vat 78, while on the far side of vat 78 is located movable clamp 90 above upper surface 92 (which may be raised as shown) of vat 78. A similar arrangement (tubes, fibers, spools, clamp, upper surface, cutter, and anvil) is provided at 90 degrees, for Y fibers, but not shown in the figure. Fibers 82 protrude from the end of tubes 80 as shown. Imaging system 34 is located above vat 78.

In FIG. 8(*b*), tubes 80 and fibers 82 are moving along the X axis in the direction shown by arrow 94, such that tubes and fibers pass between columns of Z fibers 10. In some embodiment variations, fibers 82 may be temporarily coupled to tubes 80 (e.g., by pinching tubes 80) so that the motion of tubes 80 pulls fibers 82 along, while in other embodiment variations, fibers 82 may be advanced on their own, e.g., at the same speed as tubes 80. As fibers 82 advance, spools 84 rotate as shown by arrow 96. In FIG. 8(*c*), tubes 80 and fibers 82 have reached a position in which the free ends of fibers 82 are between clamp 90 and surface 92, and clamp 90 has moved as shown by arrow 94 to clamp fibers 82 against surface 92. In FIG. 8(*d*), tubes 80 have returned to their initial position (after disabling any temporary coupling to fiber 82, if used) as shown by arrow 96 and subsequently, cutter 86 has moved as shown by arrow 98 against anvil 88, cutting each of fibers 82 in two and yielding cut X fibers 100.

Figure 8A:
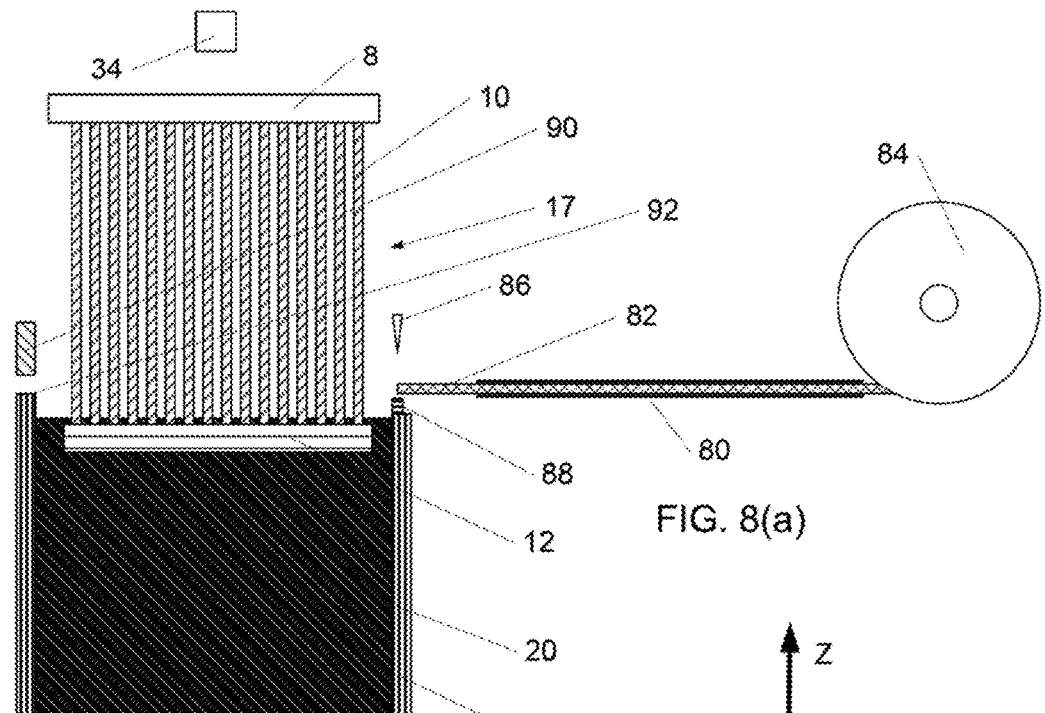
FIGS. 8(a)-(l) show an alternative apparatus and steps in a method for producing a composite part using inserted fibers used in some embodiments.
Figure 8B:
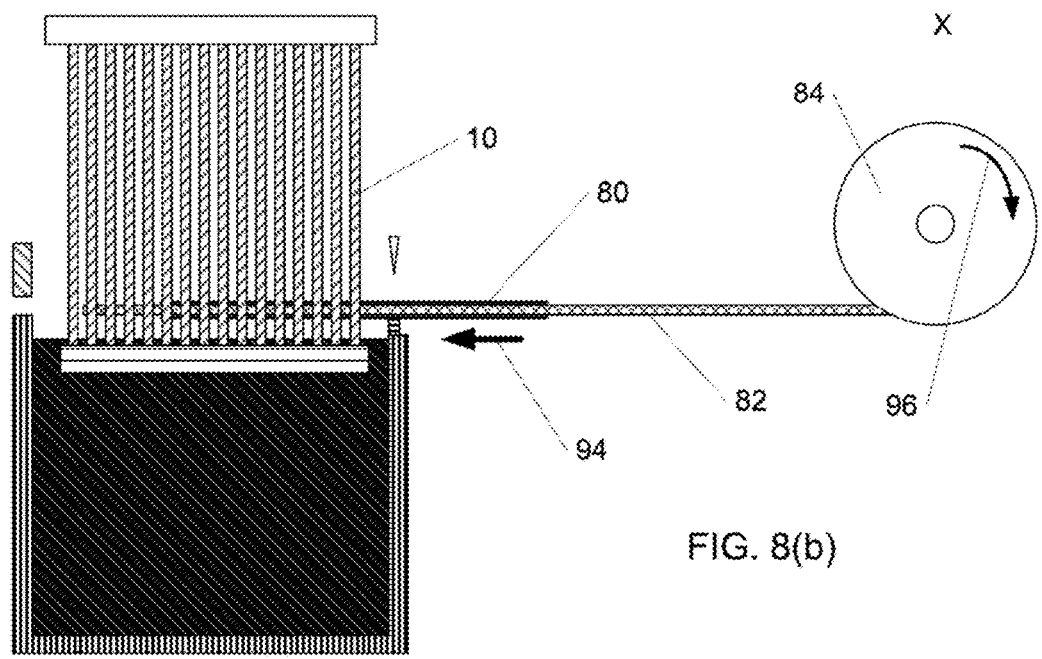
Figure 8C:
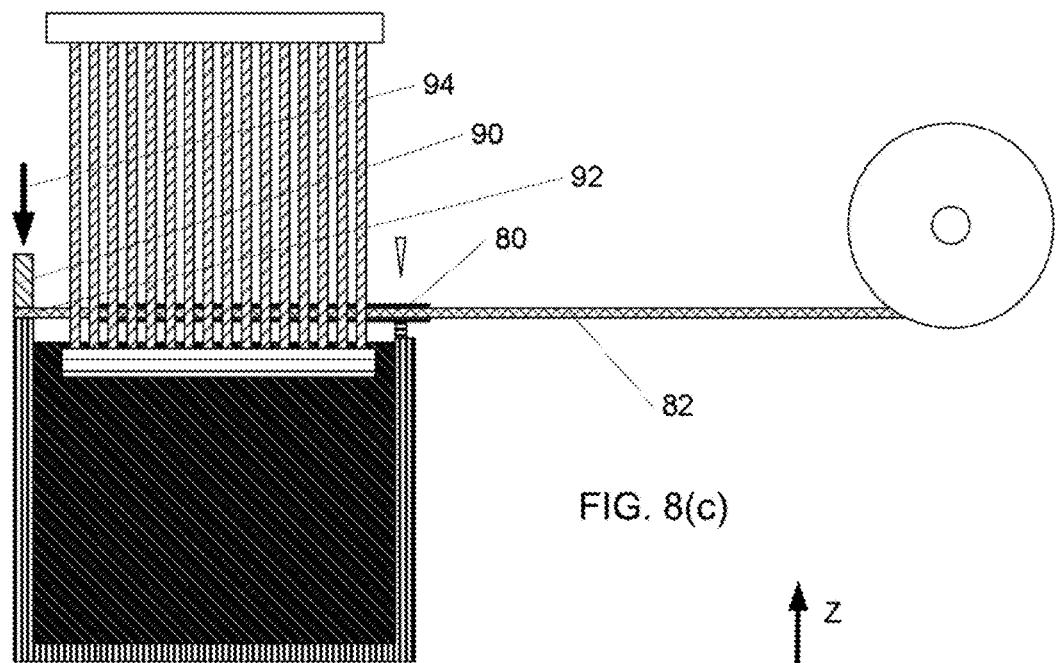
Figure 8D:
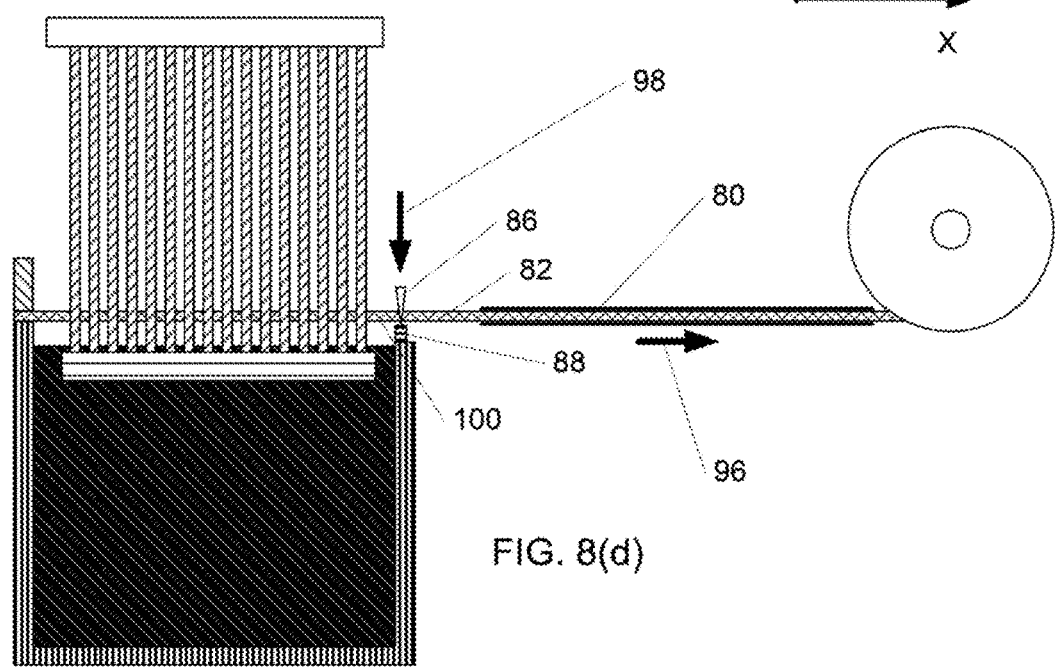
Figure 8E:
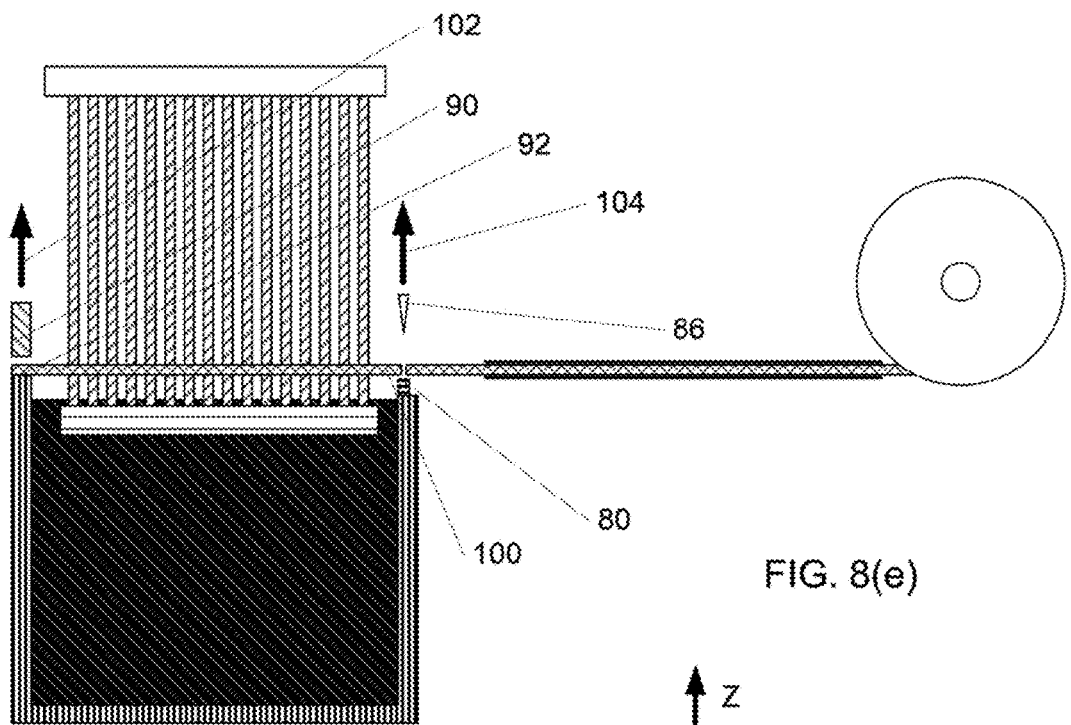
Figure 8F:
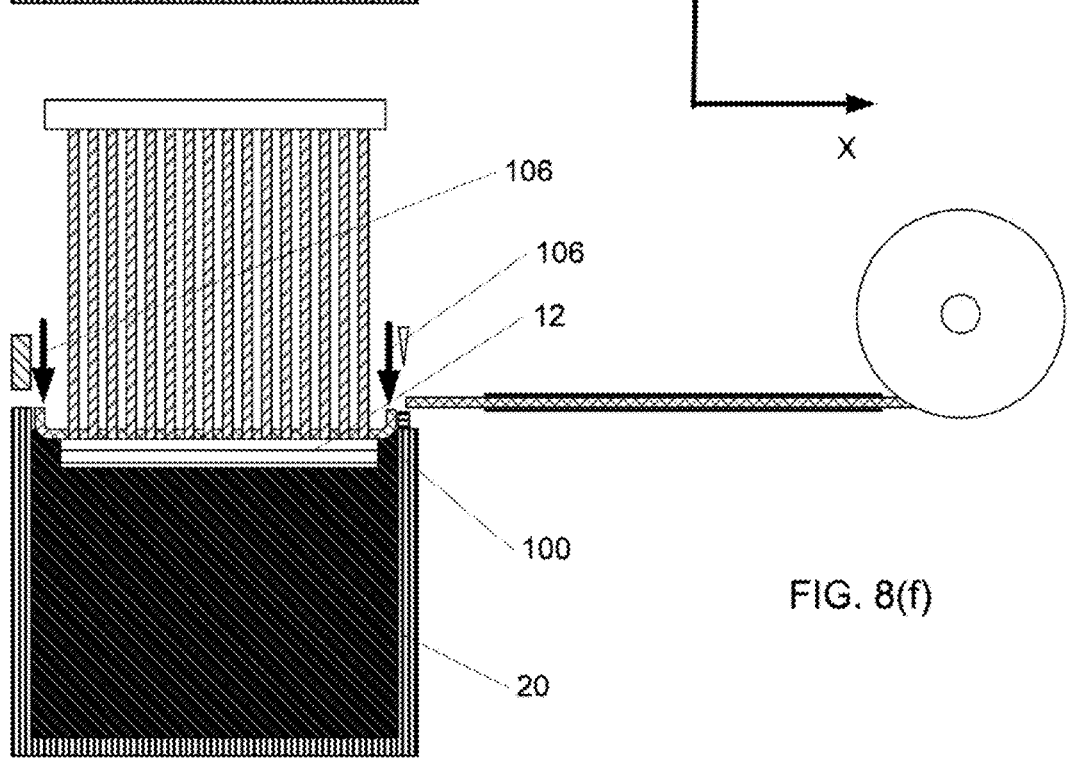
Figure 8G:
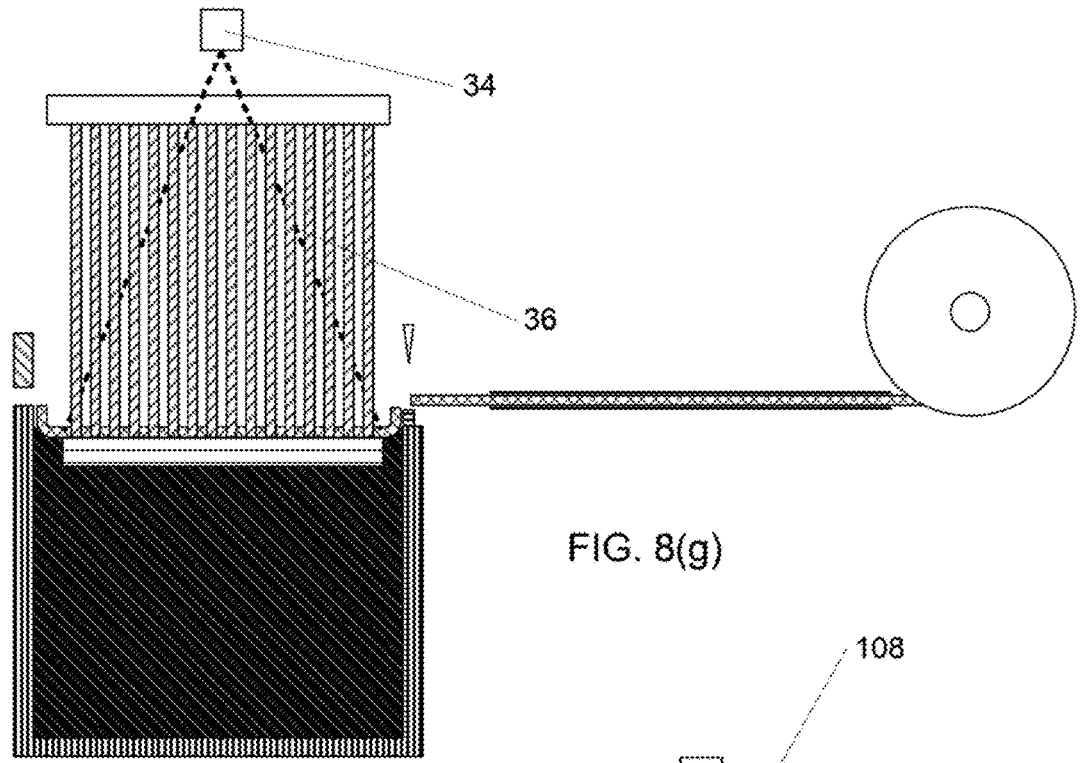
Figure 8H:
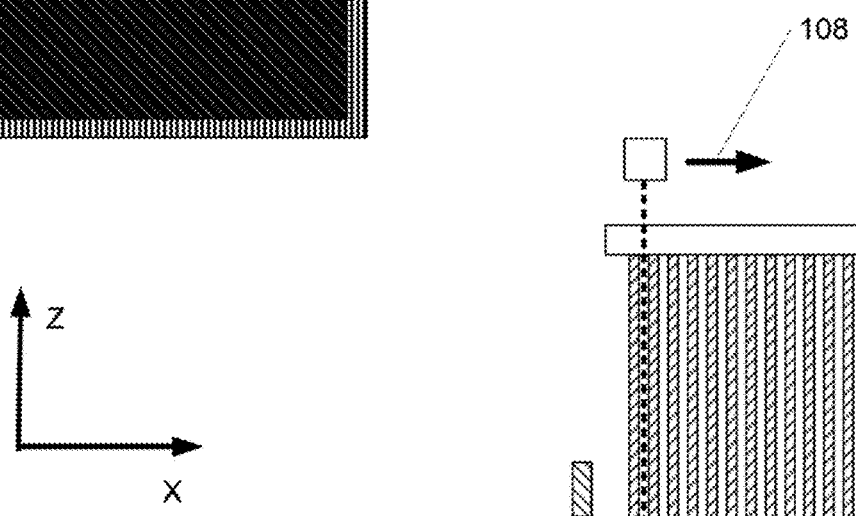

In FIGS. 8(e)-(f), clamp 90 has moved away from surface 92 as shown by arrow 102, releasing X fibers 100, while cutter 86 has moved away from anvil 80 as shown by arrow 104. As fibers 100 are released (shown in FIG. 8(f) as if occurring after FIG. 8(e), though in fact both are nearly simultaneous), they descend towards platform 12 as shown by arrows 106. In the process, the ends of X fibers 100 beyond platform 12 may bend upwards as shown. In some embodiment variations, X fibers 100 may not descend but remain in place well above platform 12. This can be achieved, for example, by overfeeding fibers 82 so they dip into resin 20 before being cut, and are then pulled taut and cured in place adjacent to Z fibers 10. As X fibers 100 make contact with resin 20 and are at least partially submerged, the level of resin 20 rises. In FIG. 8(g), imaging system 34 (not shown in many sub-figures of FIG. 8, for clarity) selectively exposes resin 20 through transparent top 8 parallel to the X axis as indicated by beam 36 so as to cure it at least partially in the vicinity of Z fibers 10 and X fibers 100. Imaging system 34 also indexes along the Y axis (not shown). If additional curing is needed (e.g., due to shadowing by Z fibers 10), imaging system 34 can also scan parallel to the Y axis as shown in FIG. 8(h) and imaging system 34 can also index along the X axis as shown by arrow 108, to selectively expose the layer.

Figure 8I:
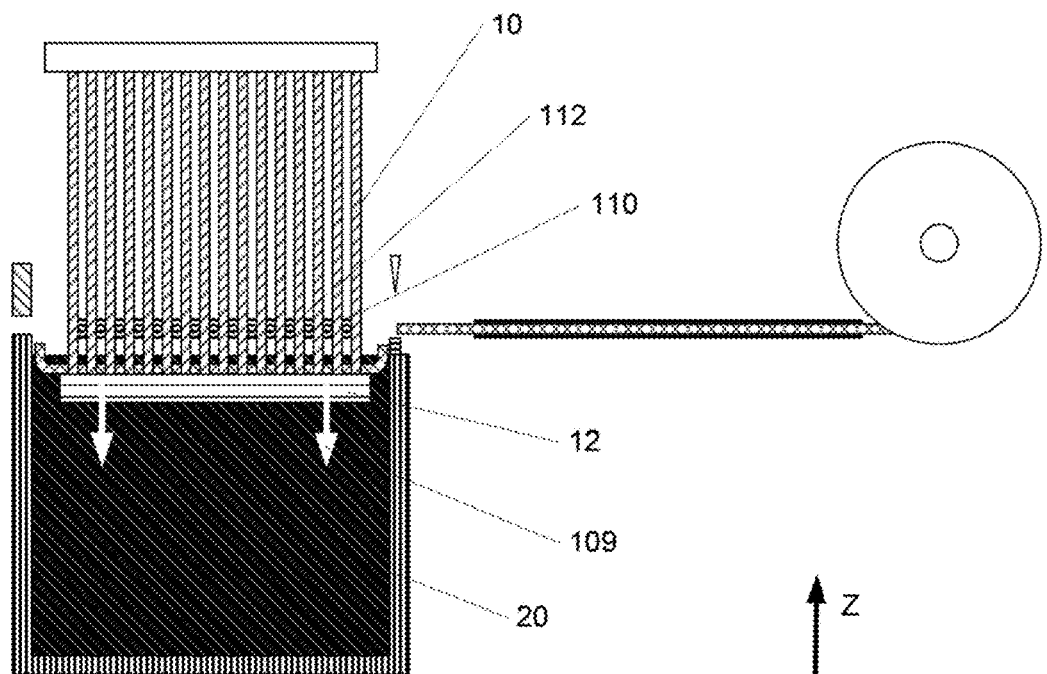
Figure 8J:
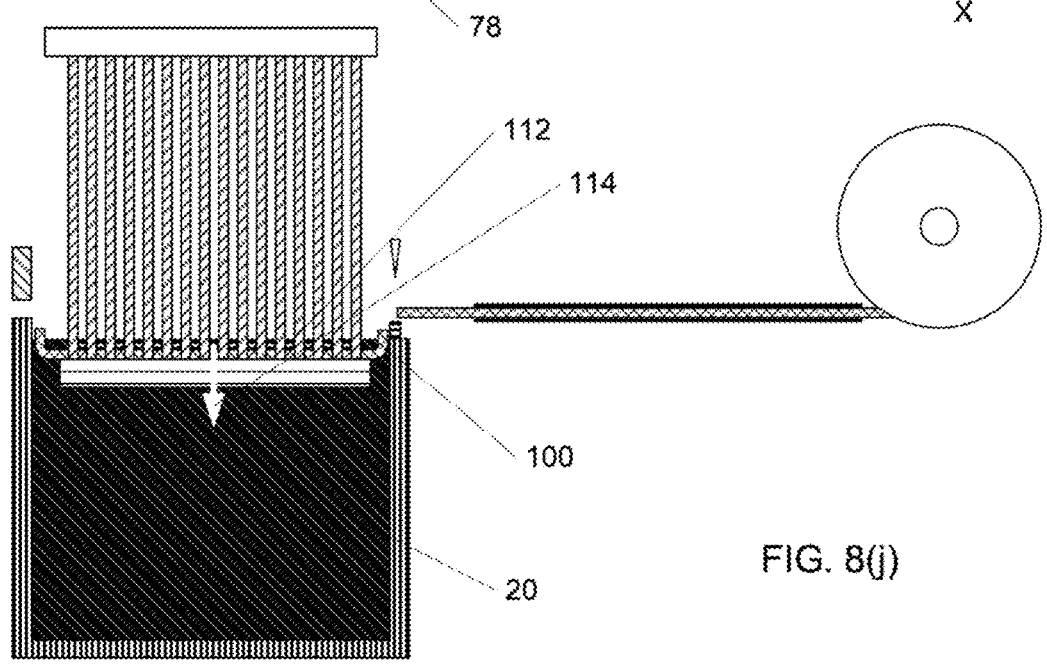
Figures 8K, 8L:
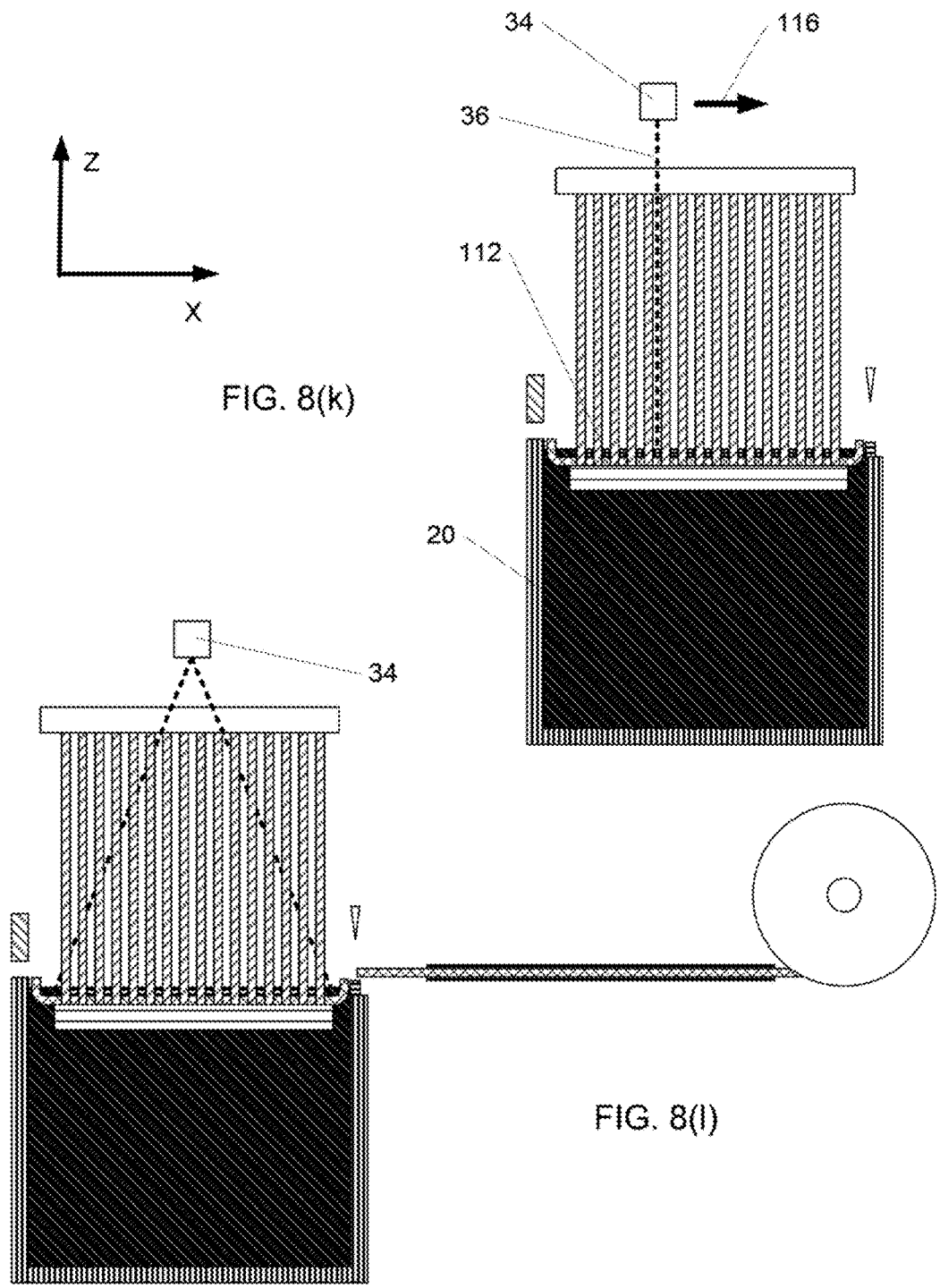

In FIG. 8(i) platform 12 has moved in the direction shown by arrow 109 by the thickness of one layer, in preparation for a new layer. In some embodiment variations, platform 12 may dip further than one layer thickness into resin 20 and then rise to its final position, to better recoat the layer with resin. Also, a set of fiber delivery tubes 110 are delivering Y fibers 112 in between Z fibers 10. In FIG. 8(j), after clamping of Y fibers 112 and withdrawal of tubes 110, Y fibers have been cut similarly to FIG. 8(d) and now fall in the direction of arrow 114 onto the previous layer, contacting resin 20 and X fibers 100. In FIG. 8(k), imaging system 34 selectively exposes resin 20 through top 8 parallel to the Y axis as indicated by beam 36 so as to cure it at least partially in the vicinity of Z fibers 10 and Y fibers 112, while indexing along the X axis in the direction of arrow 116. If additional curing is needed (e.g., due to shadowing by Z fibers 10), imaging system 34 can also scan parallel to the X axis as shown in FIG. 8(l) and index along the Y axis (not shown) to selectively expose the layer. The remaining steps in the process of making a part are not shown, but involve continuing to lower platform 12 and add fibers such as cut X fibers 100 and cut Y fibers 112, and exposure using imaging system 34; they are similar to those of FIG. 5(j-m). In some embodiments, individual, pre-cut fibers may be used instead of continuous fiber such as fiber 82 in FIG. 8.

Figure 9:
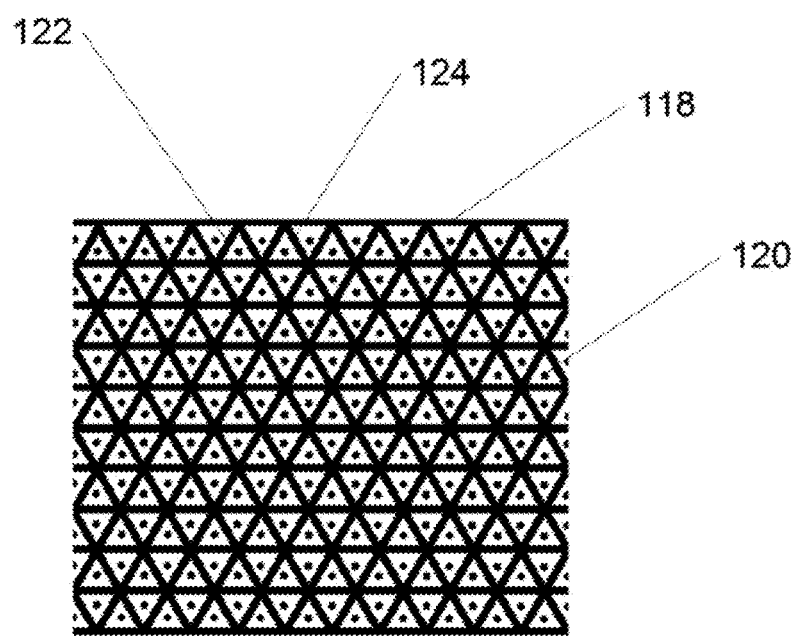
FIG. 9 depicts an arrangement of fibers used in some embodiments.

The apparatus of FIGS. 5 and 8, as well as apparatus to be described below, can be made to accommodate the insertion of more than two fibers perpendicular to the Z fibers. For example, FIG. 9 is a plan view of a fiber arrangement comprising X fibers 118 and Z fibers 120, but in which Y fibers are replaced by two diagonal fibers. One diagonal fiber 122 is at an angle such as 60 degrees relative to X fibers 118, while the other diagonal fiber 124 is at an angle such as 120 degrees relative to X fibers 118. Such an arrangement can provide increases shear resistance and strength in the plane of fibers 118, 122, and 124.

FIGS. 10(a)-(b) depict cross-sectional elevation views of an apparatus similar to that shown in FIG. 8, but in which top 8 need not be transparent since the curing radiation need not pass through it. FIG. 10(a) depicts a partially printed part 126; not shown for clarity are X and Y fibers already inserted. In FIG. 10(b), platform 12 has been lowered to prepare for a new layer, and one or more scanners 128 (two are shown) have been inserted between Z fibers 10, spreading them apart. To accommodate the spreading, top 8 may be lowered slightly and then raised once scanners 128 are withdrawn. Scanners 128 may comprise a laser and scanning means such as a galvanometer-driven scanning mirror, or may comprise one or more laser beams 36 that scans the resin while scanners 128 are translated along their long axis, or other optical imaging system. As shown in the side elevation view of FIG. 10(c), scanners 128 can have tapered or rounded ends 130 allowing for easier insertion between Z fibers 10. Before curing resin 20, Y fibers 132 can be inserted by a guide tube (not shown), or in some embodiment variations, by scanners 128, which can contain a supply of fibers or serve to distribute them from an adjacent magazine. In the former case, the tube can insert the fiber before scanners 128 are inserted, or scanners 128 can first spread the fibers and then the tube (or in some embodiment variations the fiber by itself) can be inserted. The number of scanners 128 and the number of inserted fibers and tubes (if used) may not be the same. For example, all fibers for a given layer may be inserted at approximately the same time, and then several scanners at a time used to expose the resin.

Once inserted, Y fibers 132 fall so they rest above the last-fabricated layer of part 126 and fibers 132 make contact with resin 20 and may be enveloped by it. Scanners 128 then scan beams 36 in direction shown by arrow 134 (or the opposite direction, or both) so as to expose resin 20. Assuming that scanners 128 cannot easily expose resin in adjacent corridors between Z fibers 10, scanners 128 can be withdrawn, index to one side (e.g., along X) and then be re-inserted between Z fibers 10 in a different location, until all regions of the layer have been exposed.

To create the subsequent layer (and all layers comprising X fibers), X fibers can be similarly inserted and one or more scanners 128 inserted. In some embodiments, scanners 128 may be inserted with their longitudinal axes perpendicular to inserted fibers, instead of or in addition to (for additional curing) to inserting them parallel to the fibers as already described.

FIG. 11 depicts in elevation views an approach to fabricating preforms such as that of FIG. 3 in which top 8 and platform 12 are made of individual upper plates 136 and lower plates 138. Z fibers 10 can be routed between plates 136 and 138 in a zig-zag fashion as shown in FIG. 11(a). Only one Z fiber is visible wrapping around each plate in FIGS. 11(a)-(b); however, a multiplicity of Z fibers 10 are in fact provided, along the Y axis. When plates are brought closer together along the X axis and separately along the Z axis to tension Z fibers 10, and held in that configuration (by an external mechanism, or mutual attachment) as in FIG. 11(b), the result is a preform similar to that of FIG. 3 (the figure only shows a portion of the preform, with a small number of plates).

Plates 136 may be transparent to the radiation used to solidify the matrix material, or be perforated. However, in some embodiments, access of the radiation to the solidifiable material (e.g., resin) can be enhanced as shown in FIG. 11(c). In the figure, lower plates 138 are immersed in resin 20 within a vat (not shown) and a portion 140 of a fabricated part has already been fabricated. Resin 20 is above portion 140, in preparation for making a new layer. Prior to exposing resin 20 within a corridor between Z fibers 10 parallel to the Y axis, upper plates 136 are pulled apart on both sides of the corridor (e.g., they may be held together with compliant elements) as shown by arrows 142, providing improved access to beam 36 generated by imaging system 34; if beam 36 is converging from a larger diameter (e.g., at an output lens) to a focus at the surface of resin 20, the separation of Z fibers 10 enabled as shown in FIG. 11(c) can be particularly useful. Separation of Z fibers 10 can also be helpful in inserting X and Y fibers, for example, allowing for a larger insertion tube, and reducing friction to allow them to descend more easily. Once exposure is completed within a given corridor, plates 136 can be manipulated so as to create a corridor in another region. In some embodiments, a corridor is formed near one edge of the area to be exposed, and is then gradually indexed over to cover the entire area to be exposed, e.g., with plates 136 and Z fibers 10 moving in a wave-like manner as exposure progresses from edge to edge.

Figure 12A:
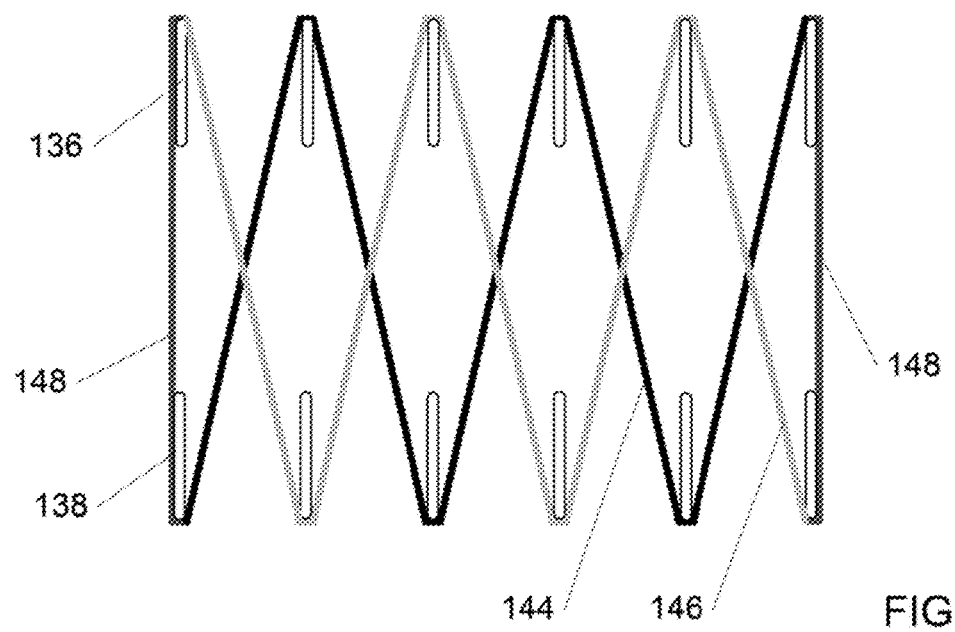
FIGS. 12(a)-(b) show an alternative preform.
Figure 12B:
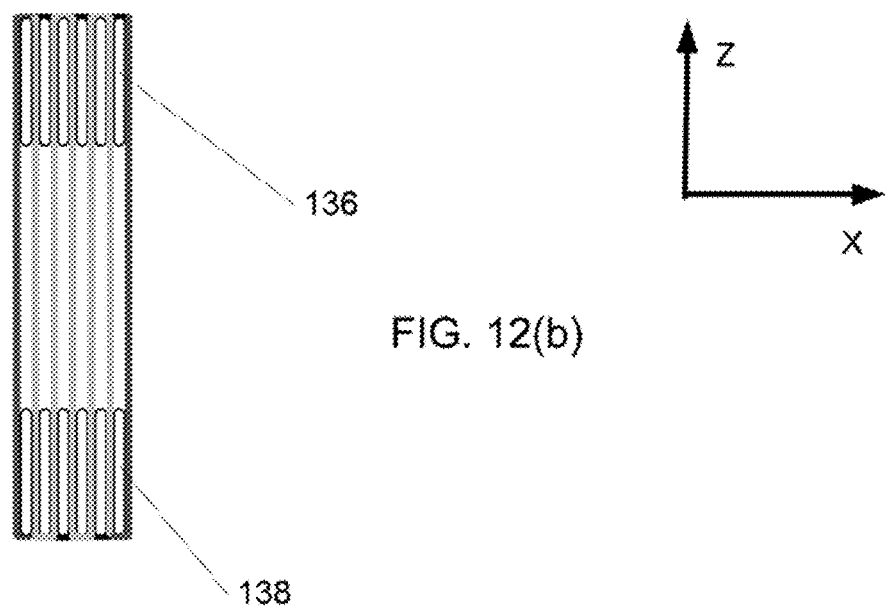

FIG. 12 depicts elevation views of a preform similar to that of FIG. 11, but in which Z fibers are routed in two different directions to form a zig-zag pattern. Even Z fibers 144 and odd Z fibers 146, as well as end Z fibers 148 are then tensioned slightly as plates 136 and 138 are brought together along the X axis and separated along the Z axis.

FIG. 13(a) is a cross sectional elevation view of an apparatus for fabricating a composite part using an index-matching liquid, while FIGS. 13(b-p) are a set of cross sectional elevation views depicting a partial sequence for fabricating a composite part according to some embodiments. In FIG. 13(a), a chamber 150 is provided filled with an index-matching liquid (IML) 152 whose refractive index (at wavelength(s) used to solidify a photocurable resin) closely matches that of Z fibers 10. IML 152 can comprise a variety of substances, such as a concentrated sucrose or salt solution, methyl salicylate, silicone oil, a variety of organic solvents, and refractive index matching liquids (e.g., those commercialized by Cargille Laboratories Inc., Cedar Grove, N.J.), and may be maintained at a uniform, well-controlled temperature within the chamber other than room temperature (e.g., heated), to precisely control refractive index. Z fibers 10 may be made from glass (e.g., E glass, S-2 glass, Pyrex), or from a transparent polymer, for example. Chamber 150 may be taller than that shown in the FIG. 13 if required. Z fibers 10 are shown suspended from top 154 and immersed in the IML. Top 154 can be moved along the Z axis (vertically in the figure) by actuator 156. At the bottom of chamber 150 is an optically transparent window 158 and beneath this, an imaging system 160. One or more side ports 162 provide access to the interior of chamber 150 for the insertion of X and Y fibers; such ports may be connected to a vat containing IML 152 at the same level as in chamber 150, so there is no escape of ILM 152 through port 162, etc.

In FIG. 13(b), resin 20 has been supplied by one of more dispensers 164. Resin 20 has a lower density/specific gravity than IML 152 and therefore rises to the surface of IML 152 upon release from dispensers 164 as shown by arrows 165, forming a layer of resin 166. In some embodiment variations, a volume of resin 20 adequate to produce many layers (or the entire part) may simply float on IML 152 and dispensers 164 are not required, or may be located above resin 20. Some time may be required to allow resin 20 to distribute itself evenly through Z fibers 10, particularly if they are densely packed. If top 154 is immersed in resin, it may be perforated in some embodiment variations to provide additional pathways that assist penetration of resin among Z fibers 10. In some embodiment variations, top 154 is raised much further before curing of a layer begins (i.e., the first layer is formed much further from top 154), thus allowing resin to more easily flow into the spaces around Z fibers 10.

In FIG. 13(c), which can be simultaneous with or temporally overlap introduction of resin 20, Y fibers 167 have been inserted through port 162 as shown by arrow 168; in some embodiment variations, Y fibers 167 may already be within chamber 150. Y fibers 167 may be separate or joined together (e.g., as a sheet). In FIG. 13(d), Y fibers 167 are moved upwards (or if less dense than IML 152, may move on their own) towards the dispensed resin as shown by arrows 170. To more easily fit between Z fibers 10, the lower ends of the latter may be separated mechanically, by fluid motion, magnetic fields, etc. In some embodiments, X (and/or Y) fibers (e.g., as continuous sheets) are already interspersed between Z fibers 10 and simply need to move into position.

Y fibers 167 (and X fibers) need not be of same refractive index as Z fibers 10, and need not be transparent. Thus, such fibers may be made from carbon, aramid, nylon, etc., some of which may be stronger or stiffer than the Z fibers. If the result of this is that strength or stiffness of the part is undesirably anisotropic, fewer and/or thinner Y (and/or X) fibers may be used than Z fibers 10, to compensate.

Figure 13E:
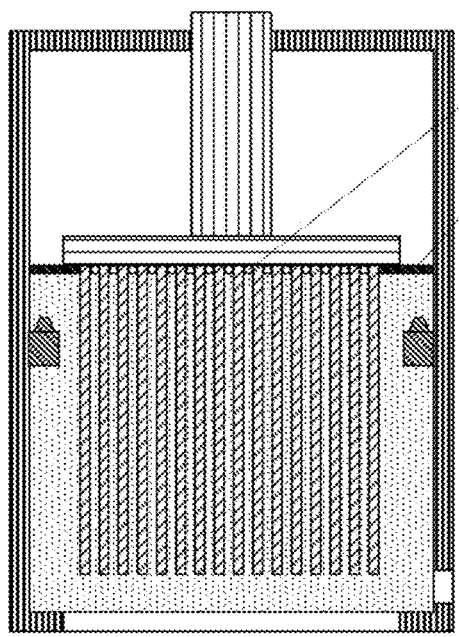
FIGS. 13(a)-(p) depict an alternative apparatus and steps in a method for producing a composite part using an index-matching liquid used in some embodiments.
Figure 13F:
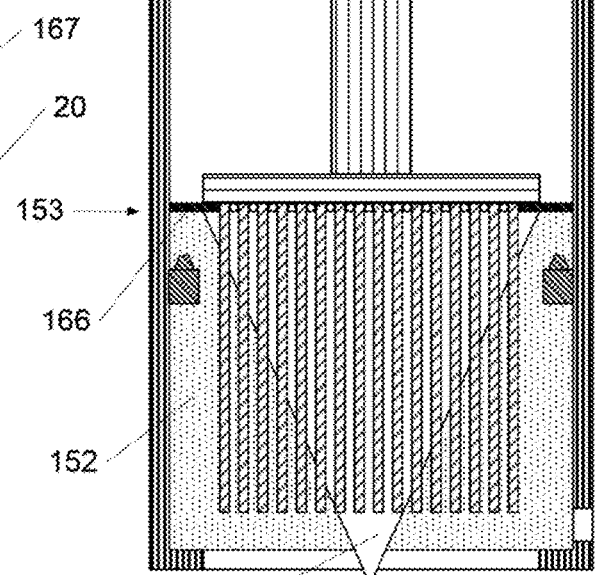

In FIG. 13(e), Y fibers 167 have reached a position in which they are surrounded at least partly by resin 20. In FIG. 13(f), imaging system 160 has been switched on, projecting image 172 (which may be a 2-D image projected simultaneously, or formed gradually through scanning) onto resin layer 166 of the desired part cross-section. Since the refractive index of Z fibers 10 is matched by IML 152, the projection is substantially undisturbed by the presence of Z fibers 10. Disturbances, however, can be compensated for by suitable optics, such as adaptive optical system known to the art, holographic and refractive optical elements, etc. In some embodiment variations, compensation may be adequate to compensate for large differences in refractive index, such that a wider variety of liquids may be used as an IML, and in the limiting case, no IML may be required. In some embodiment variations, the resin can be cured by a telecentric projection system or laser beams which are directed parallel to and within corridors of Z fibers 10, also reducing the requirements for close matching of refractive index, or obviating the need for IML 152. It is preferable that the interface 153 between IML 152 and resin 20 be flat and stable (e.g., no waves) during exposure; disturbances to this interface associated with vertical movement of Z fibers 20, for example, can also be damped out quickly by the presence of the fibers.

Figure 13G:
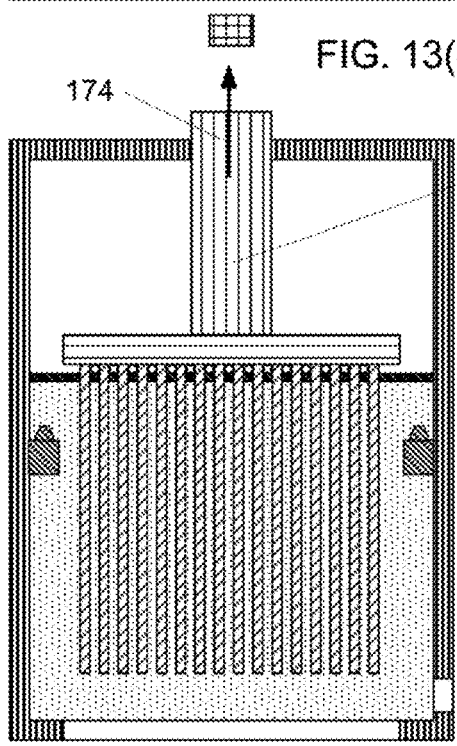
Figure 13H:
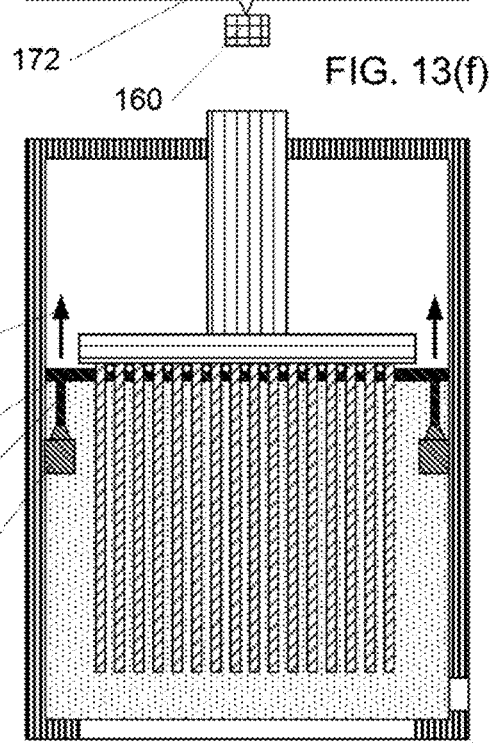

In FIG. 13(g), the resin has been cured (in some views of FIG. 13 such as FIG. 13(g), cured resin may not be shown explicitly) and actuator 156 has raised top 154 in the direction shown by arrow 174 (i.e., along the Z axis), along with the cured layer and Z fibers 10. During this step, uncured resin 20 and possibly IML 152 will fall (not shown). Then, in FIG. 13(h), dispenser(s) 164 have provided more resin 20, as shown by arrows 165, for the next layer 167. Alternatively, the resin for layer 167 can be supplied from a volume of resin 20 floating on IML 152, which flows into the space created when top 154 rises. When top 154 rises, portions of Z fibers 10 which had previously been surrounded by IML 152 become surrounded by resin 20. Since resin 20 is preferably not miscible with IML 152, is less dense, and may be considerably more viscous, any residue of IML 152 resin on Z fibers 10 tends to shed and return to the volume of IML 152 below. In some embodiment variations, Z fibers 10 may be coated or otherwise treated to assist with this process and minimize the potential for dragging out IML 152 into resin 20. For example, if IML 152 is an aqueous solution and resin 20 is hydrophobic, the coating may be somewhat hydrophobic as well, facilitating wetting of the fibers by resin and less wetting of Z fibers 10 by IML 152. One option is a polyalkyleneimine-based lubricant [Fry, 2006] which adheres well to the fiber but is hydrophobic. Treating fibers with a sizing such as a silane coupling agent is another option. In some embodiments, electrokinetic flow may be used to minimize drag-out. A potential difference can be established between, for example, top 154 and the bottom of chamber 150, helping to transport IML 152 along fibers as they emerge from ILM into resin.

It should be noted that some degree of wetting of Z fibers 10 by IML 152 may be required to avoid pockets of air that could interfere with projected image 172. Agitation, sonic or ultrasonic energy, shaking and other forms of vibration, pressure, and/or vacuum may be applied to IML 152 and/or Z fibers 10 to dislodge such pockets if needed. Also, agitation, sonic or ultrasonic energy, shaking and other forms of vibration, pressure, and/or vacuum may be applied to top 154 and/or Z fibers 10 to assist with penetration of resin around Z fibers 10 and eliminate trapped air pockets, or pockets of IML 152 which may be dragged out.

In FIG. 13(i), X fibers 176 are inserted in the direction shown by arrow 178, either through port 162 or another, similar port (e.g., at 90 degrees from port 162); in some embodiment variations, X fibers 176 may already be within chamber 150. X fibers 176 may be separate or joined together (e.g., as a sheet). Introduction can be simultaneous with or temporally overlap introduction of resin 20 in FIG. 13(h). Then, in FIG. 13(j), X fibers 176 are moved upwards (or if less dense than IML 152, may move on their own) towards the dispensed resin as shown by arrows 180.

In FIG. 13(k), X fibers 176 have reached a position in which they are surrounded at least partly by resin 20. In FIG. 13(l), imaging system 160 has been switched on, projecting image 182 onto resin layer 166 of the desired part cross-section, and selectively curing resin layer 167.

Figure 13M:
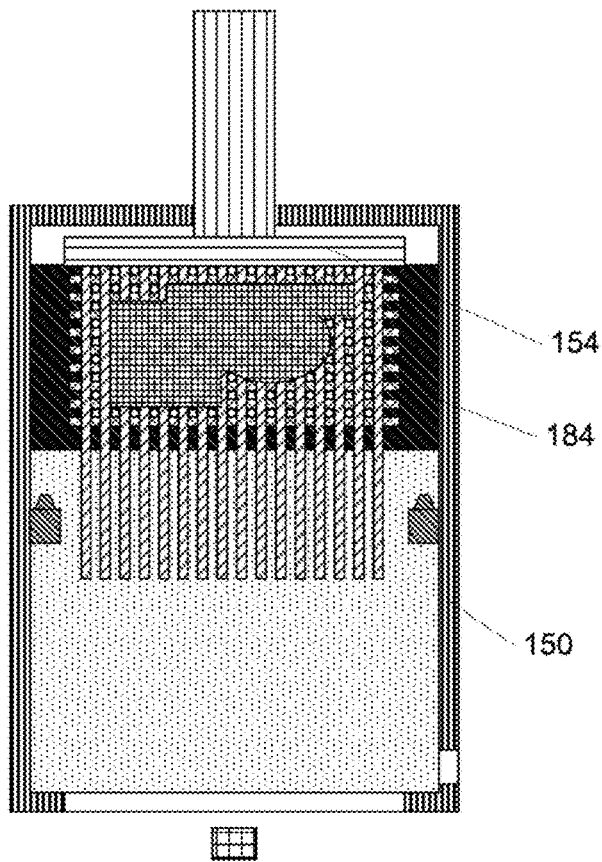
Figure 13N:
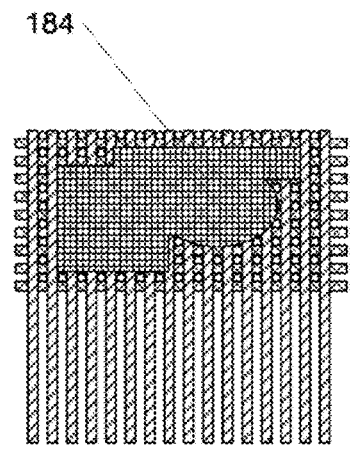
Figure 13O:
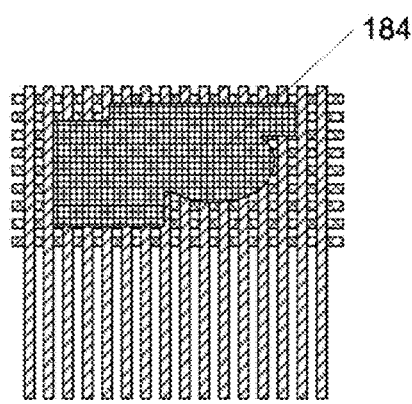
Figure 13P:
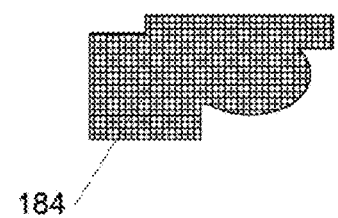

In FIG. 13(m), a number of layers have been fabricated through a process of inserting fibers and selectively curing the resin, resulting in part 184. For clarity, fibers within part 184 are not shown. Part 184 is attached, primarily through fibers 10, to top 154. Part 184, top 154, and all fibers are then withdrawn from chamber 150, which may contain as much resin 20 as shown in the figure, or less (e.g., if only what is needed for each layer is added gradually). In FIG. 13(n), excess resin 20 has been removed from part 184, while in FIG. 13(o) all fibers not at least partially embedded have been removed as well. Finally, in FIG. 13(p), the unembedded portions of fibers are removed, leaving finished composite part 184.

Figure 14:
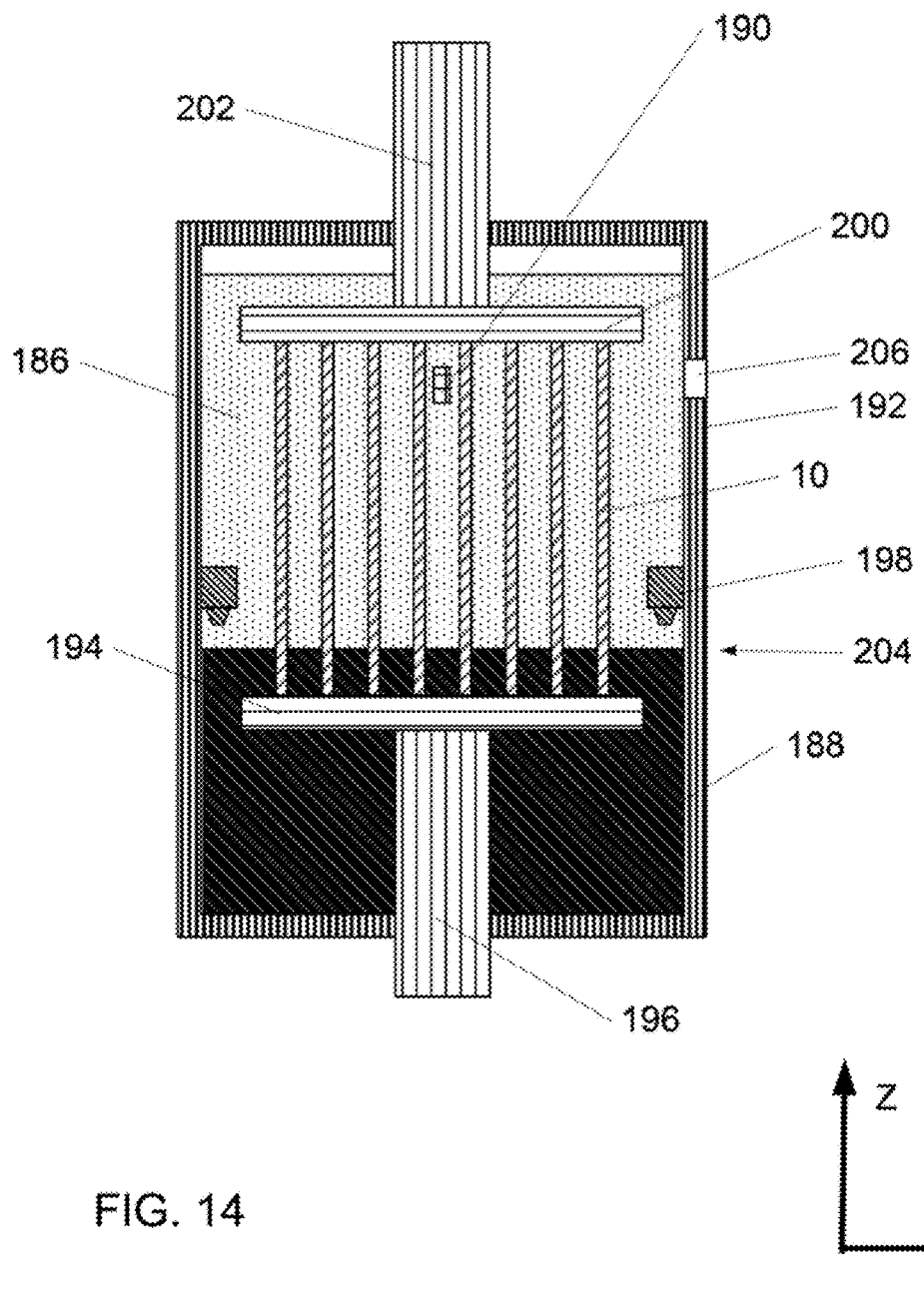
FIG. 14 shows an apparatus with an immersed imaging system.

FIG. 14 is a cross sectional elevation view of an apparatus for fabricating a composite part using an IML. The apparatus has some similarities with that of FIG. 13, but in this case, IML 186 is less dense than resin 188 and therefore floats on top of it. Moreover, rather than project the image using an external imaging system, an immersed imaging system 190 is provided, which can project patterned radiation onto resin 188 at its interface with IML 186. Use of an immersed imaging system 190 is similarly possible in the apparatus of FIG. 13, and the apparatus of FIG. 13 can also be inverted if the density of IML 152 is greater than that of resin 20. Chamber 192 is provided to contain both IML 185 and resin 188. Z fibers 10 are affixed to platform 194.

In some embodiment variations, platform 194 is moved within resin 188 along Z by actuator 196, which forms a seal against chamber 188, while in other embodiment variations, one or more resin dispensers 198 is provided to add resin and platform 194 can be fixed within chamber 188. In these latter variations, as the level of resin 188 rises, the level of IML 186 also rises unless is it removed, and provision can be made for this. In some embodiment variations, a top 200 moved in Z by actuator 202 is also provided, with Z fibers 10 affixed to top 200. In some embodiment variations, at least one of platform 194 and top 200 are moved so that the distance between then is reduced, creating slack in Z fibers 10, which allows imaging system 190 to be more easily inserted. Alternatively, platform 200 can be buoyantly supported within IML 186 such that it is free to be pulled down slightly to create slack as imaging system 190 is inserted between Z fibers 10.

Imaging system 190 can expose resin 188 at resin/IML interface 204 much as in FIG. 10(b), and imaging system 190 can be moved from corridor to corridor as needed. In some embodiment variations, multiple imaging systems 190 can be used simultaneously, and in some embodiment variations, imaging system(s) 190 can be oriented also along the X axis, not just along the Y axis as shown. X and/or Y fibers can be inserted through one or more ports 206 which in some embodiment variations can communicate with a vat of ILM 186.

Figure 15A:
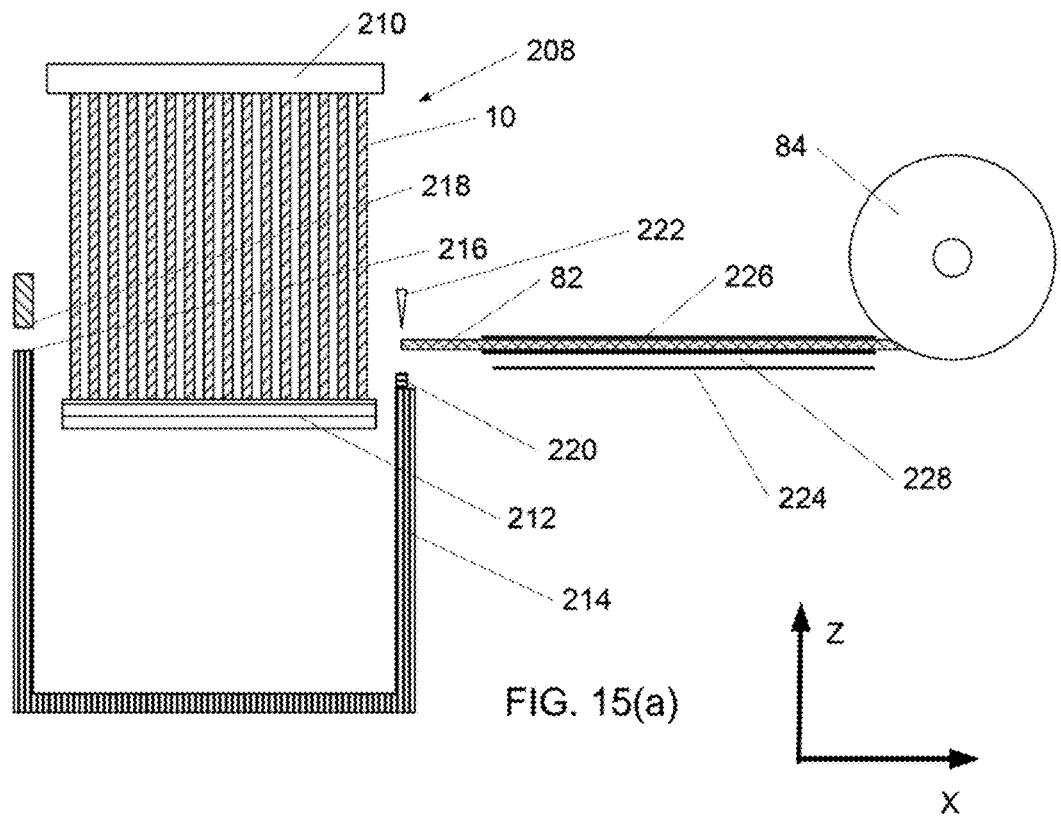
FIGS. 15(a)-(g) depict an apparatus and steps in a method for producing a composite part using inserted fibers used in some embodiments.

FIG. 15(a) is a cross sectional elevation view of an apparatus for fabricating a composite part, while FIGS. 15(b-g) are a set of cross sectional elevation views depicting a partial sequence for fabricating a composite part according to some embodiments. In FIG. 15(a), preform 208 is provided, comprising top 210, Z fibers 10, and platform 212. Vat 214 is provided below preform 208, primarily to catch any excess matrix material, but also to provide upper surface 216 below clamp 218, and support anvil 220 below cutter 222, all arranged similarly to the apparatus of FIG. 8, including a similar arrangement for Y fibers not shown in the figures.

Outside vat 214 is at least one (one shown, many assumed in this example) moving fiber and resin delivery double tube 224 through which at least one (one shown, many assumed in this example) continuous X fiber 82 is passed, supplied by spool(s) 84. Double tubes 224 have upper lumens 226 to receive fiber and lower lumens 228 to selectively deliver matrix material. Lower lumens 226 may be closed at its end if provided with at least one hole along its lower surface. Fibers 82 protrude from the end of upper lumens 226 as shown.

Figure 15B:
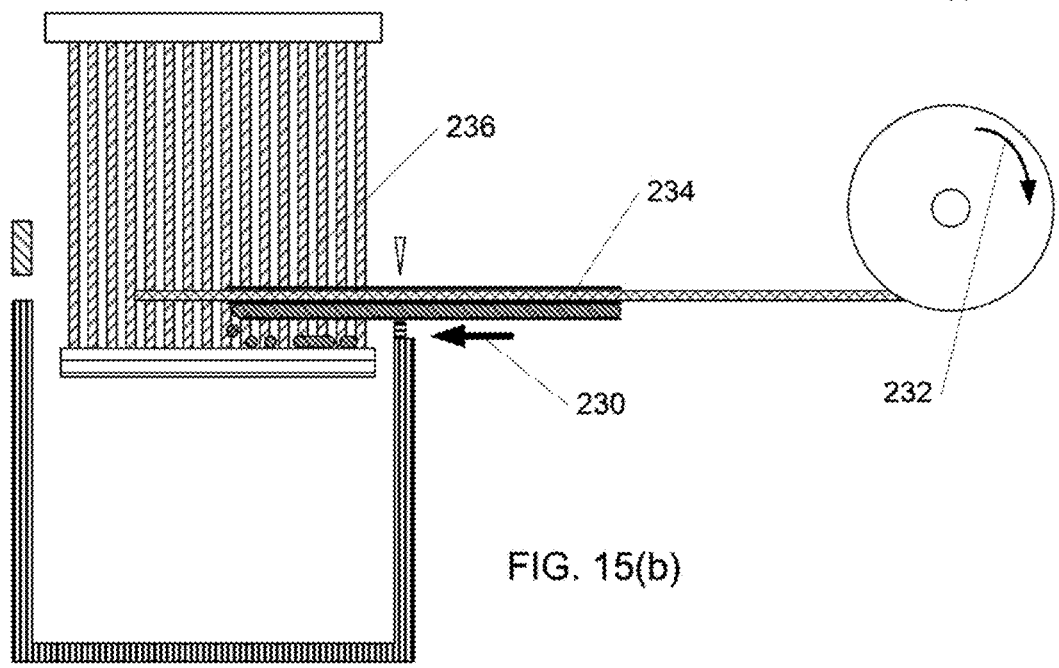

In FIG. 15(b), tubes 224 and fibers 82 are moving along the X axis in the direction shown by arrow 230, such that tubes and fibers pass between columns of Z fibers 10 (the front row of Z fibers is not shown for clarity). In some embodiment variations, fibers 82 may be temporarily coupled to tubes 224 (e.g., by pinching tubes 224) so that the motion of tubes 224 pulls fibers 82 along, while in other embodiment variations, fibers 82 may be advanced on their own, e.g., at the same speed as tubes 224. As fibers 82 advance, spools 84 rotate as shown by arrow 232. As tubes 224 advance (or in some embodiment variations as tubes 224 retract), matrix material 234 is delivered intermittently and selectively through lumens 228, forming drops or continuous extrudates 236 which deposit onto Z fibers 10 and X and/or Y fibers of the previous layer (if any), to form a composite layer representing a cross section of the desired part. Matrix material 234 may be a thermoplastic material, in which case lumens 228 may be heated, or comprise an insulating tube such as the INSULON® thermal barrier (Concept Group, Inc., West Berlin, N.J.) to maintain material 234 in a flowable state. Drops/extrudates 236 then cools and solidify when delivered. Alternatively, material 234 may be a curable material such as a photocured resin (the latter will be assumed in the following discussion).

Figure 15C:
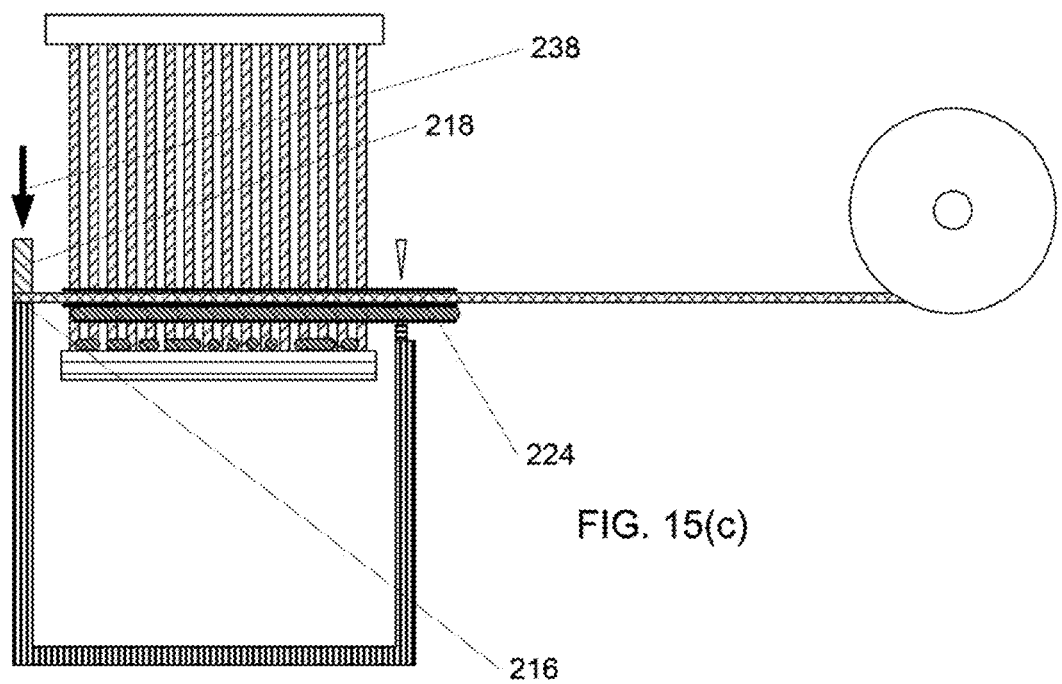
Figure 15D:
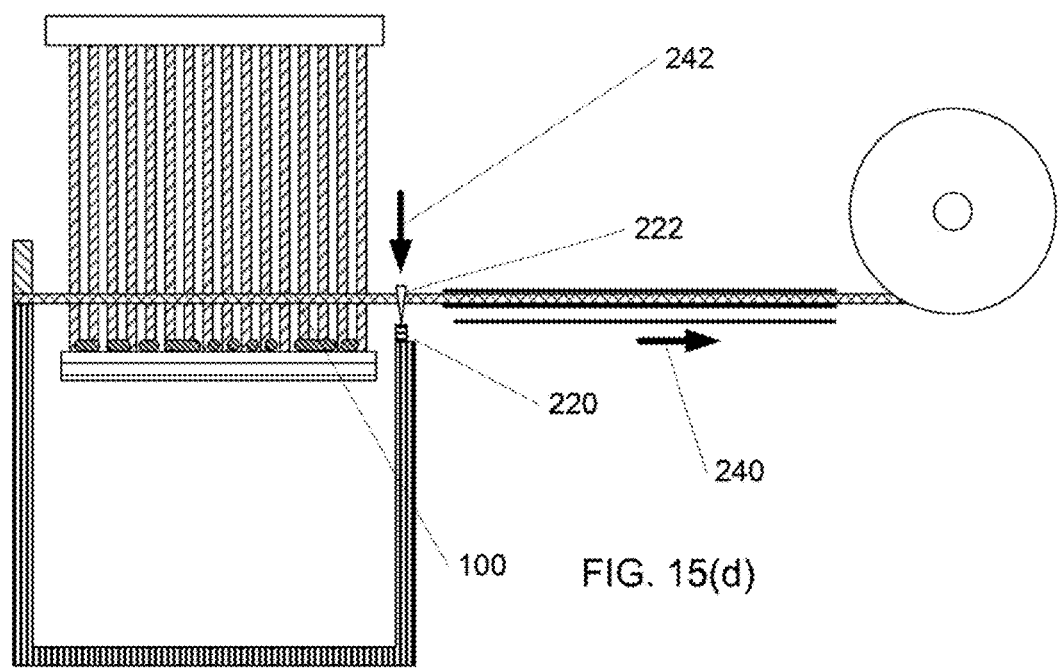

In FIG. 15(c), tubes 224 and fibers 82 have reached a position in which the free ends of fibers 82 are between clamp 218 and surface 216, and clamp 218 has moved as shown by arrow 238 to clamp fibers 82 against surface 216. In FIG. 15(d), tubes 224 have returned to their initial position as shown by arrow 240 and subsequently, cutter 222 has moved as shown by arrow 242 against anvil 220, cutting each of fibers 82 in two and yielding cut X fibers 100.

Figure 15E:
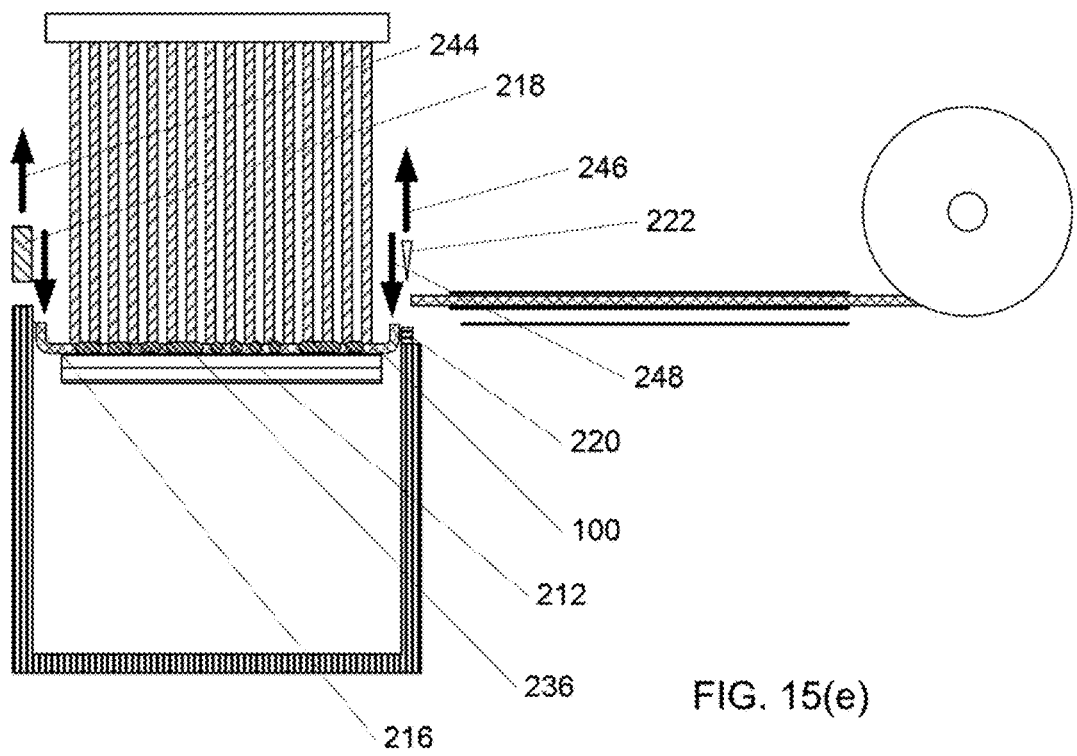
Figure 15F:
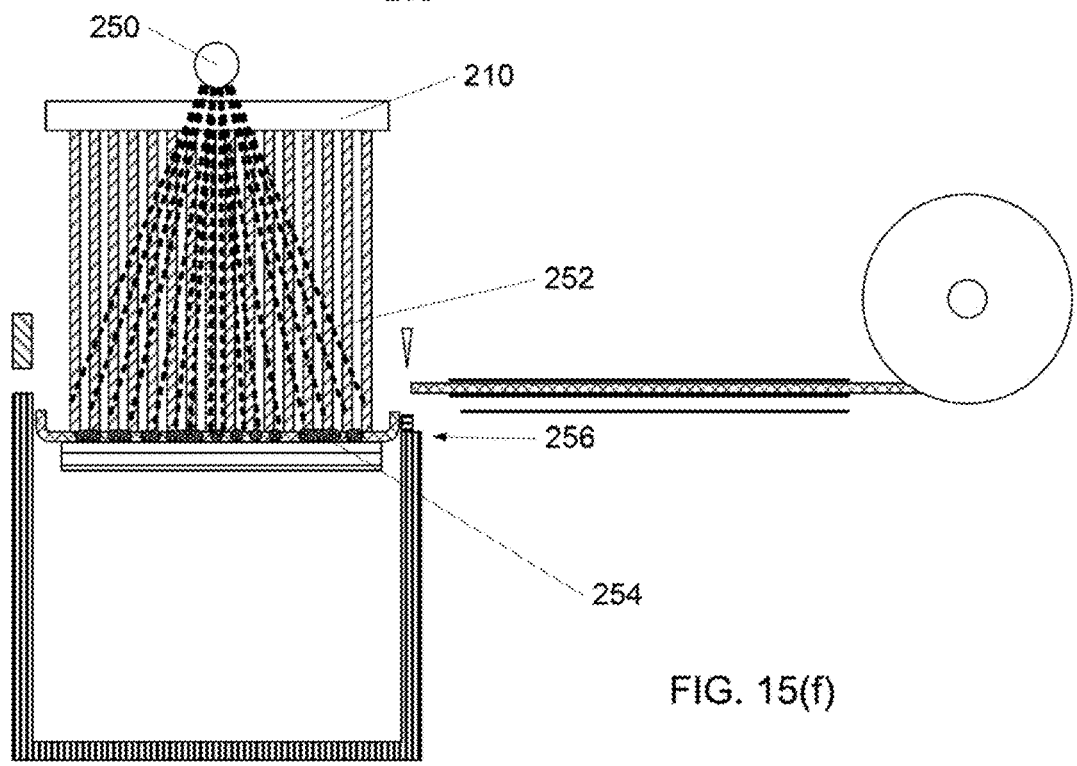

In FIGS. 15(e)-(f), clamp 218 has moved away from surface 216 as shown by arrow 244, releasing X fibers 100, while cutter 222 has moved away from anvil 220 as shown by arrow 246. As fibers 100 are released they descend towards platform 212 as shown by arrows 248. In the process, the ends of X fibers 100 beyond platform 12 may bend upwards as shown. In some embodiment variations, X fibers 100 may not descend but remain in place well above platform 12. This can be achieved, for example, by depositing curable material 234 onto Z fibers 10 so they form a tacky residue which can capture X fibers 100, not letting them fall toward platform 212. X fibers 100 make contact with drops/extrudates 236. In FIG. 15(f), curing system 250 (not shown in many sub-figures of FIG. 15, for clarity) exposes drops/extrudates 236 through transparent top 210 (or from the sides in some embodiment variations) as indicated by beams 252, curing and thus solidifying drops/extrudates 236 to form solidified matrix material 254 which together with X fibers 100 and portions of Z fibers 10, comprises a composite layer 256 of fibers and matrix material 234.

Figure 15G:
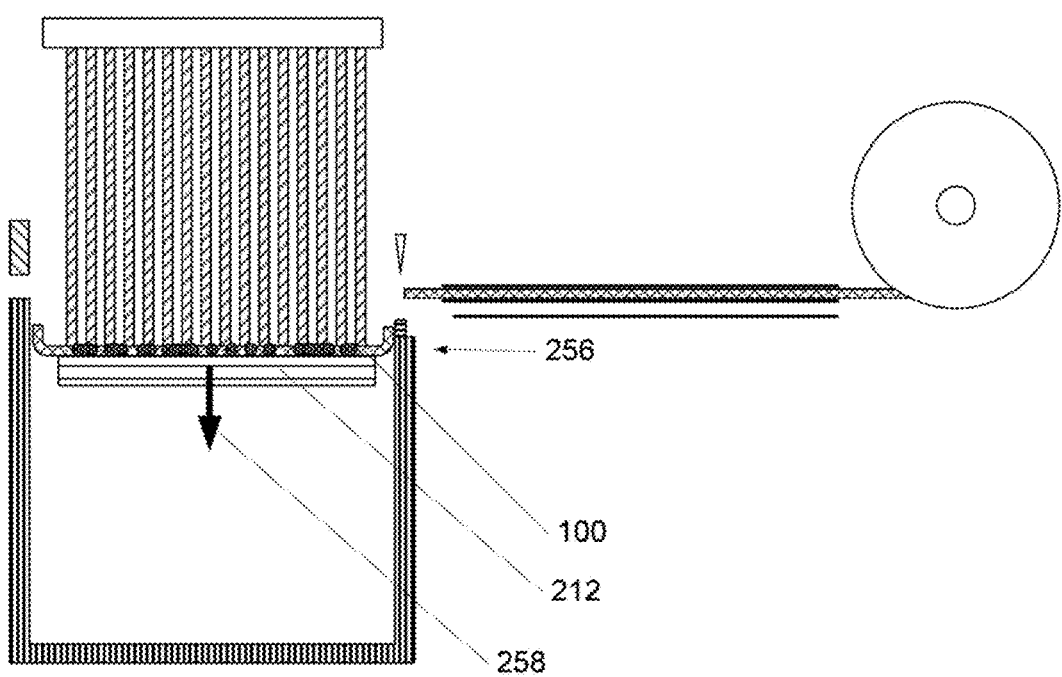

In FIG. 15(g) platform 212 and layer 256 have moved in the direction shown by arrow 258 by the thickness of one layer, in preparation for a new layer (e.g., in which Y fibers are inserted). The remaining steps in the process of making a part are not shown, but involve continuing to lower platform 212 and add fibers such as cut X fibers 100 and Y fibers 112, and curing deposited matrix material 234 using curing system 250; these steps are similar to those of FIG. 5(j-m). In some embodiment variations, the arrangement shown in FIG. 15 can be inverted in the sense that drops/extrudates can be deposited on the topmost X and Y fibers first, securing them in place while more layers are added beneath them.

FIG. 16(a) is a cross sectional elevation view of an apparatus for fabricating a composite part, while FIG. 16(b) is a cross sectional elevation view depicting a step in a sequence for fabricating a composite part according to some embodiments. In FIG. 16(a) a set of Z fibers 10 is suspended from a top 260 and is provided with an optional platform 262 (e.g., to keep Z fibers 10 under tension). A Vat 264 may be provided to catch droplets, and may also serve to clamp and cut fibers in some embodiment variations. A partially printed part 266 is shown with X fibers 267 embedded within it partially; Y fibers already embedded in part 266 are not shown for clarity.

In FIG. 16(b) Y fibers 268 have been inserted between Z fibers 10, and printheads 270 (at least one) has also been inserted between Z fibers 10. As shown in FIG. 16(c), the tips 272 of printheads 270 may be rounded or pointed to facilitate insertion between Z fibers 10, and the distance between top 260 and platform 262 can be reduced to provide slack for insertion. Printheads 270 can produce from its orifices a significant number of simultaneous drops 274 of selectively deposited matrix material (e.g., either a molten thermoplastic or a solidifiable resin) which move in the direction shown by arrow 276. In some embodiment variations enough printhead orifices are provided so that all required locations can be printed without movement of printheads 270 along its long axis, while in other embodiment variations, printheads with fewer, or even one orifice may be used, which print as they moves along their long axes. Referring back to FIG. 16(b), drops 274 impinging on Y fibers 268 and Z fibers 10 can thus form a composite layer which is patterned according to a cross section of the desired part, based on data governing the release of drops 274 from printhead 270. In some embodiment variations, printheads 270 may deposit drops 274 upwards, and part 266 may be built from the top downwards. Subsequent to depositing drops as in FIG. 16(b), printheads may withdraw and re-enter Z fibers 10 in other locations. To complete a layer in the case of a solidifiable resin such as a photocured material, and according to some embodiment variations before the printheads move to new locations, exposure to curing radiation can be provided. The source of such radiation may be above top 260, to the sides of Z fibers 10, or even incorporated into printheads 270.

Figures 17A, 17B, 17C, 17D:
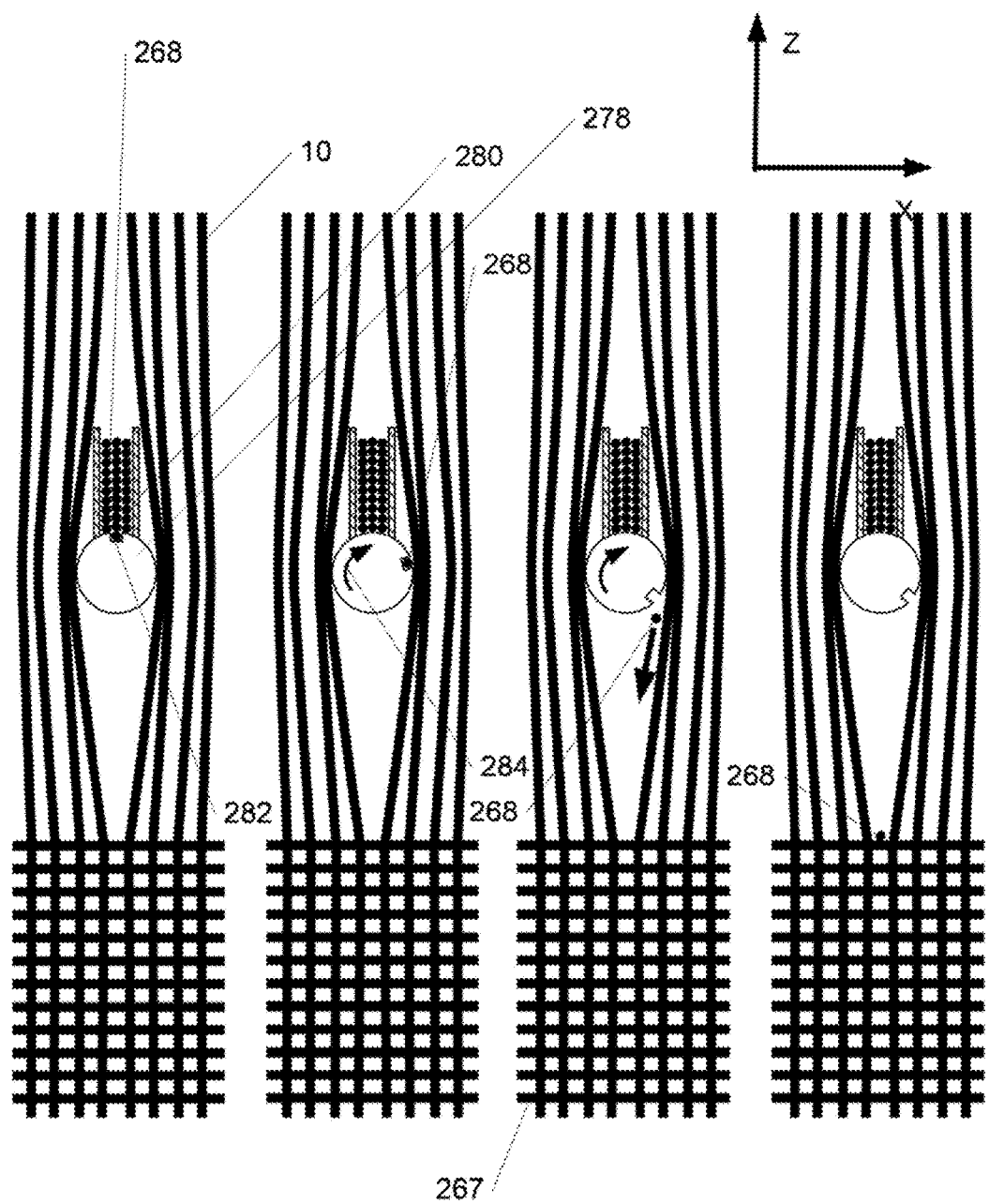
FIGS. 17(a)-(d) depict apparatus for dispensing fibers.

FIG. 17 depicts a cross-sectional elevation view of a dispensing system for cut fibers used in some embodiments. In FIG. 17(a), the system, comprising cylinder 278 and fiber magazine 280, is inserted between Z fibers 10. It is assumed that several layers of a part have been built and previously-deposited X fibers 267 are shown, while previously-deposited Y fibers and matrix material are omitted for clarity. Magazine 280 contains at least one cut Y fiber 268. Cylinder 278 includes groove 282 which accepts a single Y fiber 268. In FIG. 17(b), cylinder 278 has rotated as shown by arrow 284, carrying a Y fiber 268 in groove 282. In FIG. 17(c), cylinder 278 has rotated further, now releasing Y fiber 268 so it descends, guided by Z fibers 10, toward the uppermost X fiber 267, settling between neighboring Z fibers 10 as shown in FIG. 17(d). To dispense multiple fibers, cylinder 278 can rotate continuously in one direction or oscillate.

Figure 18A:
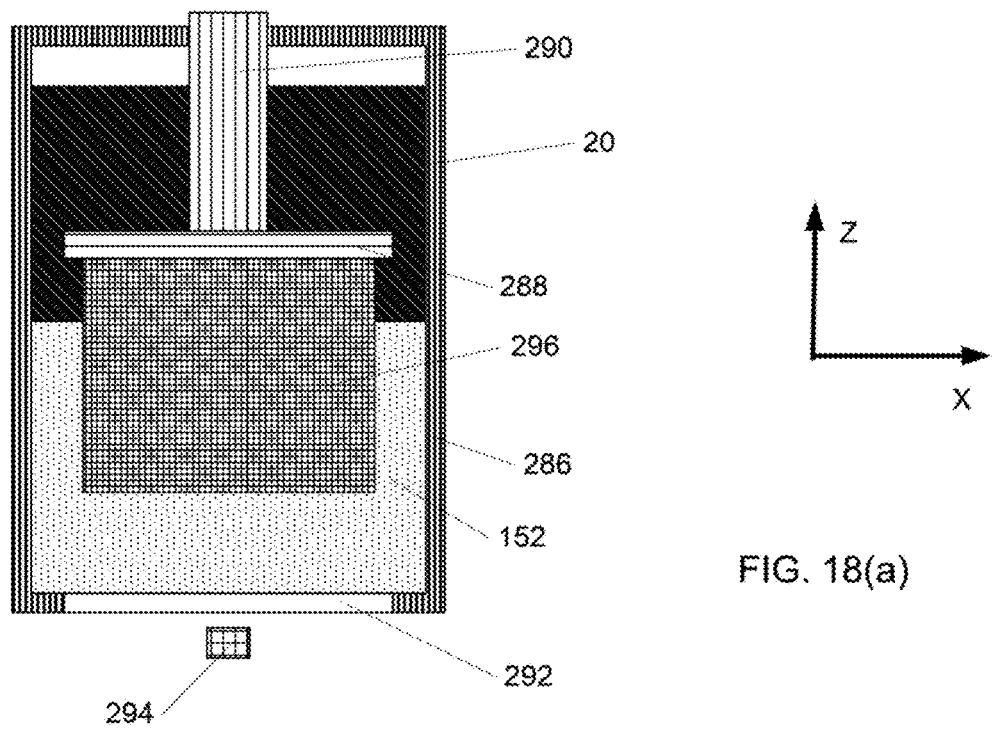
FIGS. 18(a)-(h) depict an alternative apparatus and steps in a method for producing a composite part using an index-matching liquid used in some embodiments.

FIG. 18(a) is a cross sectional elevation view of an apparatus for fabricating a composite part, while FIGS. 18(b-h) are a set of cross sectional elevation views depicting a sequence for fabricating a composite part according to some embodiments.

In FIG. 18(a), a chamber 286 is provided which contains relatively high density/specific gravity IML 152 with a relatively low density/specific gravity photocurable resin 20 floating on top of it, forming interface 287. An open tank may be used instead in some embodiment variations. Platform 288 is suspended from actuator 290, which can move platform 288 along the Z axis. At the bottom of chamber 286 is window 292, which allows radiation from imaging system 294 to pass through into the chamber. Affixed to the underside of platform 288 is fiber block 296, which includes transparent fibers oriented randomly in X, Y, and Z, or else arranged parallel to the X, Y, and Z axes, forming an isotropic network in either case. Block 296 can be produced as a 3-D interleaved structure with interpenetrating fibers such as that of FIG. 1 or 2, or as a 3-D woven, braided, or knitted structure, or as a nonwoven material (e.g., hydroentangled or needle punched), or as a wool (e.g., a glass wool as is used for chemical filtration), etc. Soft materials can be constrained within a porous box. If the fabrication method does not allow for large blocks to be made in a single process, the block can be formed from a stack of slabs or other shaped produced by any of the above methods. IML 152 is closely matched to the refractive index of the fibers in block 296 (including any fibers used to bind together slabs), rendering the block substantially transparent when it is immersed in IML 152.

Figure 18B:
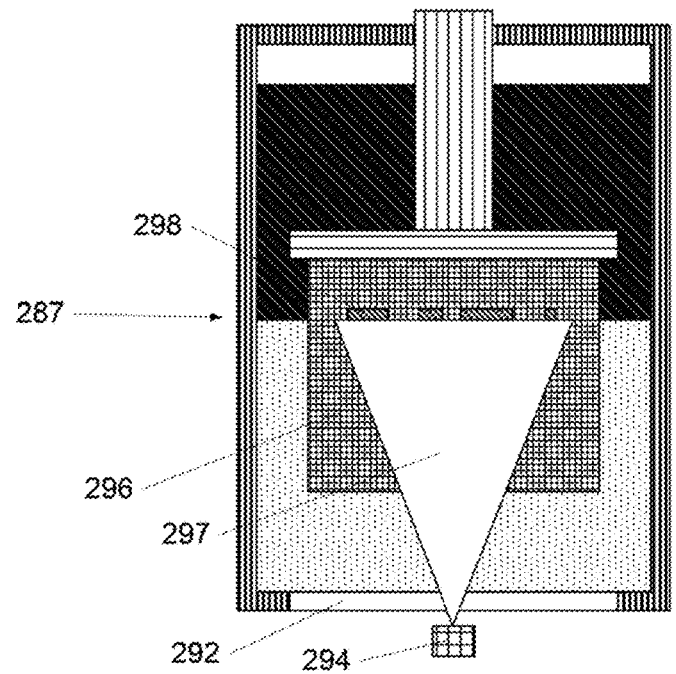
Figure 18C:
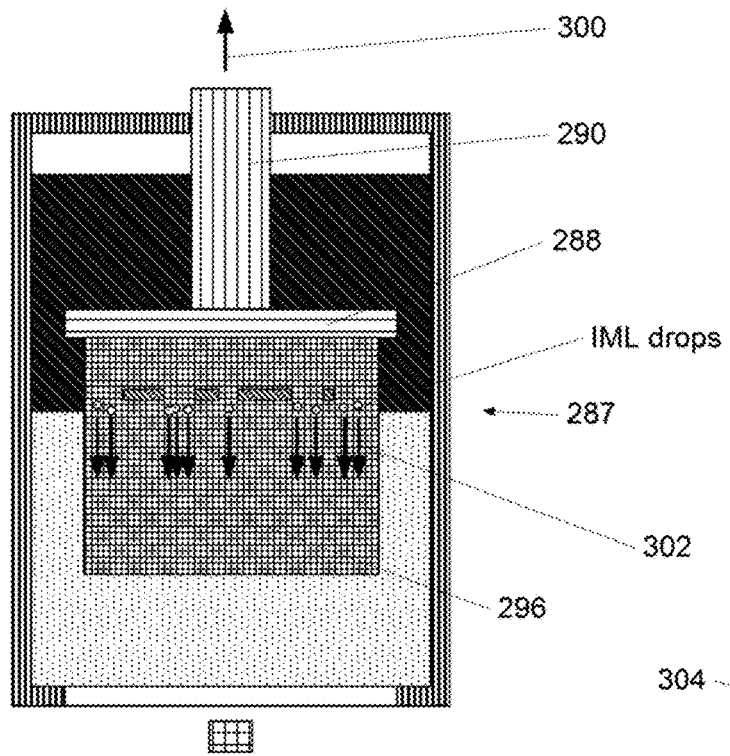

In FIG. 18(b), imaging system 294 creates projected image 297 of a cross section through window 292, which exposes resin 20 at interface 287, curing resin 20 in a pattern of cured resin 298 according to the desired part cross section. Resin 20 cures so as to encapsulate fibers within the block, forming a composite layer. In FIG. 18(c), platform 288 and block 296 rise in the direction of arrow 300 due to motion of actuator 290. As block 296 rises, drops 302 of IML 152 clinging to fibers in block 296—being of higher density than resin 20—detach from fibers and sink in the direction shown by arrow 302, merging into IML 152 at interface 287. Agitation, sonic or ultrasonic energy, shaking and other forms of vibration, may be applied to resin 152 and/or block 296 to dislodge drops 302 if needed.

Figure 18D:
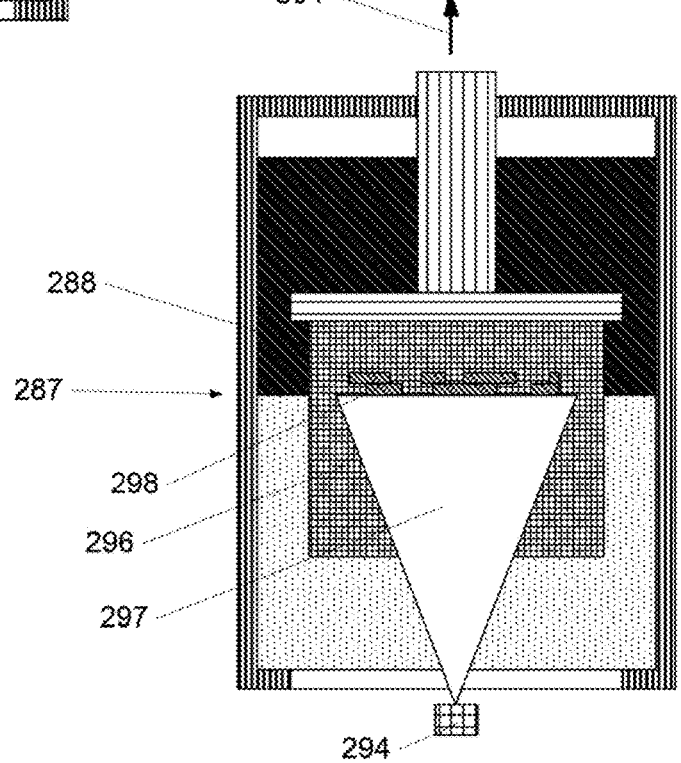

In FIG. 18(d), platform 288 has risen again as shown by arrow 304, and imaging system 294 creates projected image 297 of a second cross section through window 292, again exposing resin 20 at interface 287, which is now lower with respect to block 296 than before. Thus, a second layer of composite material is generated, having a pattern of cured resin 298.

Figure 18E:
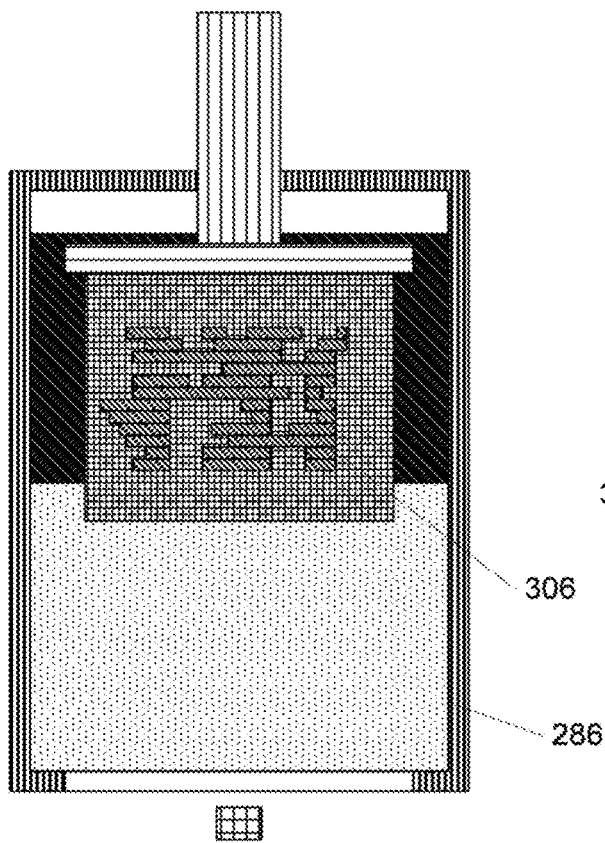
Figure 18F:
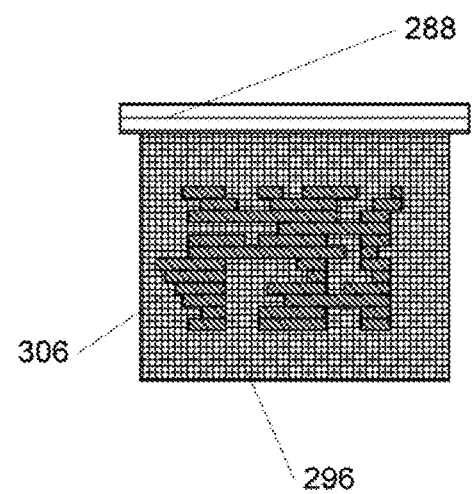
Figure 18G:
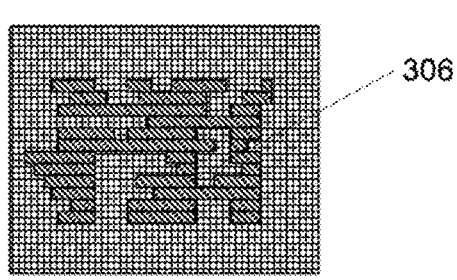
Figure 18H:
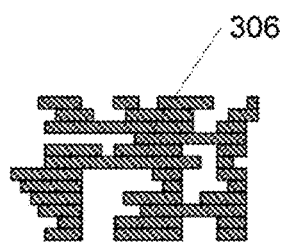

In FIG. 18(e) all layers have been formed by repeating the steps shown in FIGS. 18(b)-(c) for each layer required, yielding completed part 306. In FIG. 18(f), platform 288, block 296, and part 306 have been removed from chamber 286 and uncured resin has been drained off. In FIG. 18(g), platform 288 has been detached and any remaining uncured resin has been removed (ultrasonic agitation and or rinsing with a solvent such as isopropanol may be used). In FIG. 18(h), portions of block 296 have been removed by chemical dissolution, waterjet, sand or bead blasting, tumbling, manual or automated bending and fracturing of fibers, etc., yielding final composite part 306.

Figure 19A:
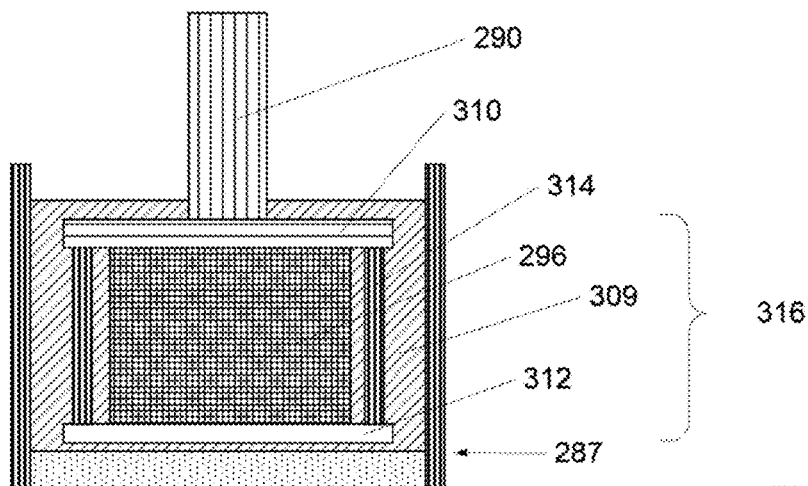

FIG. 19(a) is a cross sectional elevation view of an apparatus for fabricating a composite part, while FIGS. 19(b-k) are a set of cross sectional elevation views depicting a sequence for fabricating a composite part according to some embodiments.

The apparatus and method depicted in FIG. 19 is similar to that of FIG. 18 in that it involves an IML matching the refractive index of a fiber block and on which a photocurable resin is floating. However, as will be described, the block moves downwards in this case as the part is formed, and the IML also matches the refractive index of cured resin. The potential advantages of this approach include a) the ability to completely infiltrate the block with resin before beginning the fabrication process; b) the part is reasonably clean after it is completed, since most excess resin has already been stripped off; and c) since the resin and fibers match in refractive index, the composite part is transparent.

Figure 19B:
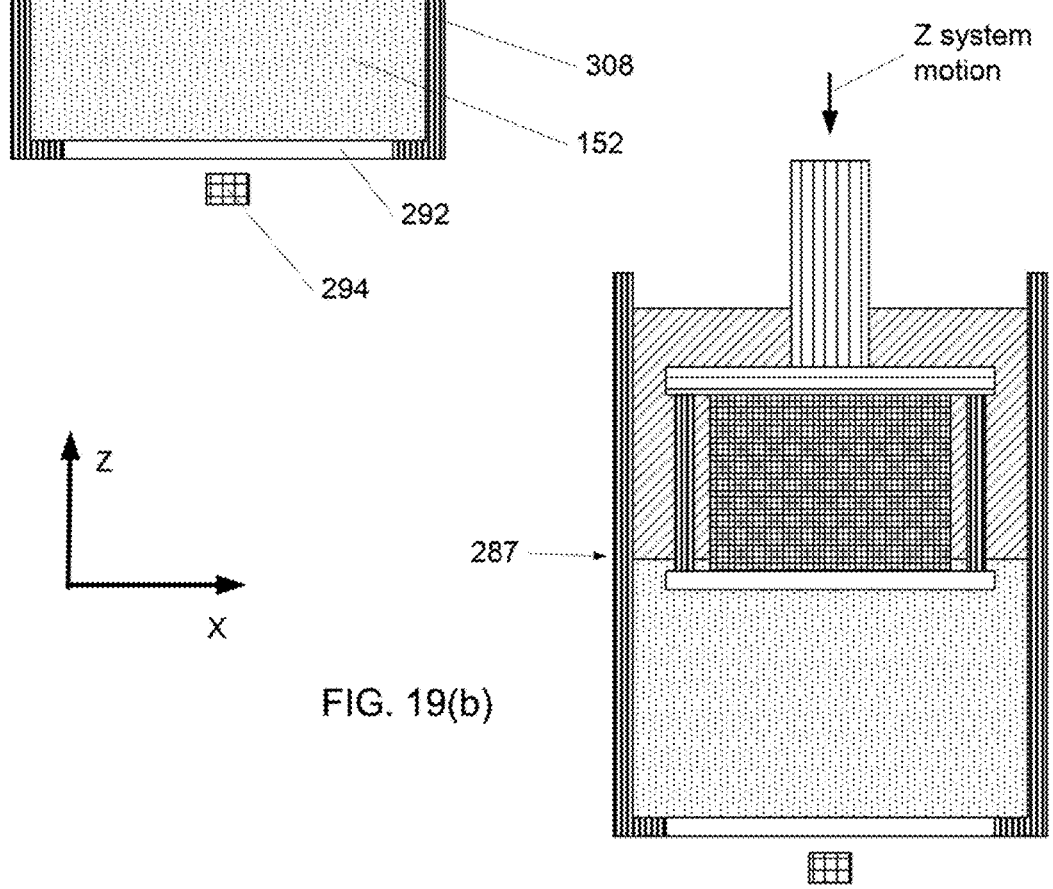

In FIG. 19(b), vat 308 is provided which contains relatively high density/specific gravity IML 152 with a relatively low density/specific gravity photocurable resin 309 floating on top of it, forming interface 287. In some embodiment variations, this arrangement can be inverted. Also, a closed chamber may be used instead of vat 308 in some embodiment variations. Top 310 is suspended from actuator 290, which can move top 310 along the Z axis. At the bottom of tank 308 is window 292, which allows radiation from imaging system 294 to pass through into the tank. Affixed to the underside of top 310 is fiber block 296, which includes transparent fibers oriented randomly in X, Y, and Z, or else arranged parallel to the X, Y, and Z axes, forming an isotropic network in either case. Block 296 can be produced by a number of methods already described above.

Resin 309 is selected or formulated so that when cured, its refractive index closely matches that of the fibers block 296, thus enabling a transparent composite [Krug et al., 2013]. IML 152 is closely matched to the refractive index of the fibers in block 296 (including any fibers used to bind together slabs) and therefore also to resin 309 when cured, rendering both block 1296 and cured resin substantially transparent when immersed in IML 152. Preferably IML 152 also matches the refractive index of uncured resin 309, in case any drops of resin 309 are unable to escape the fiber block when it descends during fabrication.

Since IML 152 is higher in density/specific gravity than resin 309 and potentially, cured resin, to minimize the effect of buoyant forces on cured resin (and potentially block 296, which may distort the part during fabrication, bottom plate 312, transparent to the curing radiation, is also provided, to which block 296 is also attached. Top 310 and bottom 312 are joined by rigid rods (or equivalent structure) 314 so they move as a unit. Top 312, plate 312, rods 314, and block 296 constitute a movable "Z system" 316 moved by actuator 290. If plate 312 is driven directly along the Z axis, top 310 may in some embodiment variations be omitted.

Figure 19C:
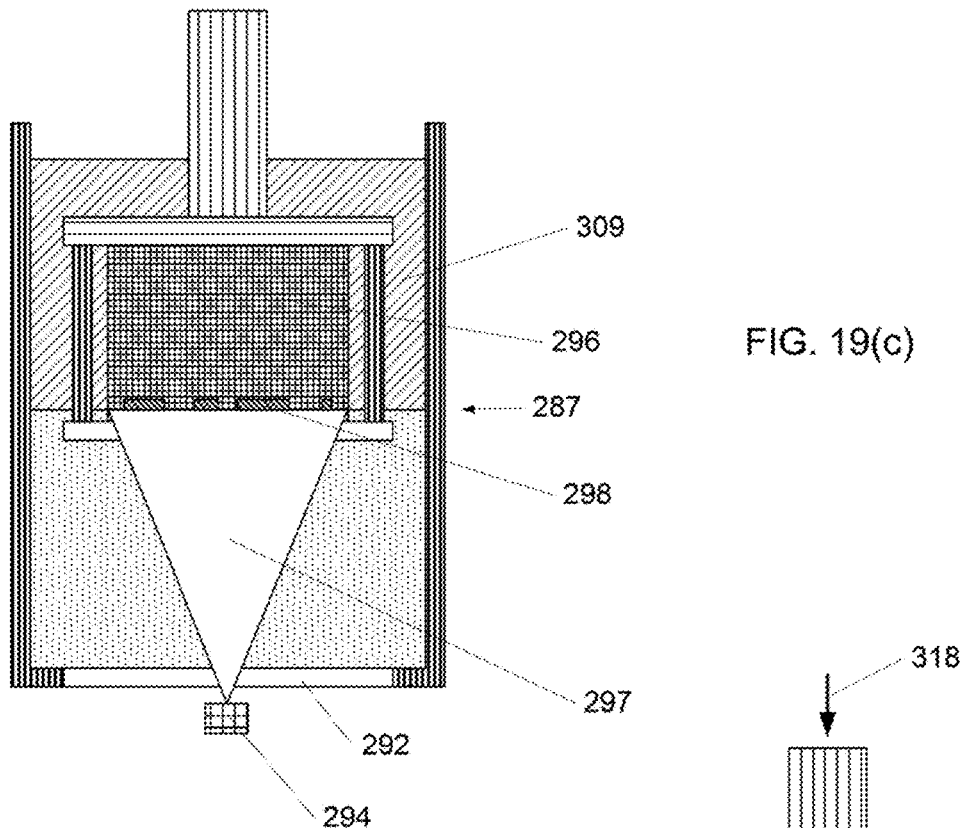

In FIG. 19(b), Z system 316 has been lowered into IML 152 such that the bottom of block at interface 287, or a portion of block 296 is below interface 287 as shown. Prior to this, if desired, block 296 can be fully saturated with resin 309, either inside or outside the apparatus, e.g., using vacuum, pressure, agitation, vibration, etc. if necessary to enhance infiltration; most such techniques are known to the art of fiber reinforced composites. In FIG. 19(c), imaging system 294 creates projected image 297 of a cross section through window 292, which exposes resin 309 at interface 287, curing resin 309 in a pattern of cured resin 298 according to the desired part cross section. Resin 309 cures so as to encapsulate fibers within block 296, forming a composite layer.

Figure 19D:
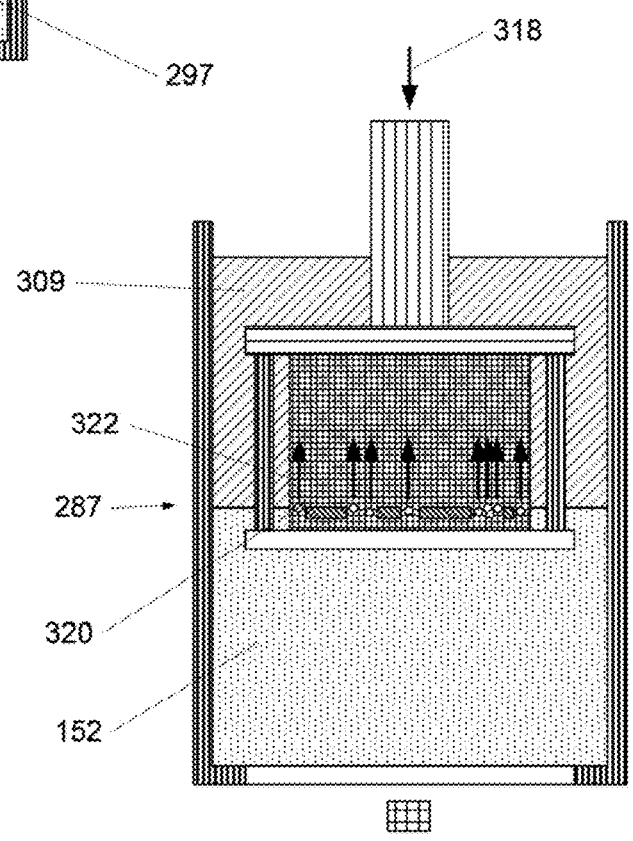

In FIG. 19(d), Z system 316 descends in the direction of arrow 318 due to motion of actuator 290. As block 296 descends, drops 320 of resin 309 clinging to fibers in block 296—being of lower density than IML 152—detach from fibers and rise in the direction shown by arrows 322, merging into resin 309 at interface 287. Agitation, sonic or ultrasonic energy, shaking and other forms of vibration, may be applied to Z system 316 and/or IML 152 can be used to dislodge resin drops 320 if needed.

After the motion is completed, cured resin 298 is below interface 297, i.e., within IML 152, and since its refractive index matches that of IML 152, is effectively transparent. Thus, as shown in FIG. 19(e), imaging system 294 can then project image 297 of a cross section corresponding to the second layer through window 292 and through cured resin 298, exposing resin 309 at interface 287 and curing it to form a pattern of cured resin 324. This is followed by lowering Z system 316 using actuator 290 as shown by arrow 326 in FIG. 19(f). As block 296 descends, drops 320 of resin 309 clinging to fibers in block 296 again detach from fibers and rise in the direction shown by arrows 322, merging into resin 309 at interface 287.

In FIG. 19(g), all layers have been formed by repeating the steps shown in FIGS. 19(b)-(c) for each layer required, yielding completed part 328. Part 328 is relatively free of resin, due to ending up immersed in IMG 152. In some embodiment variations, IMG 152 may be provided with additives which help remove excess resin 309 from the surfaces of part 328. In FIG. 19(h), resin 309 has been drained from tank 308 so that part 328 does not need to be extracted through resin 309, which would re-coat its surfaces and enter porosity in block 296. In FIG. 19(i), top 310, plate 312, block 296, rods 314, and part 328 have been removed from vat 308 and IMG 152 has been drained off.

In FIG. 19(j), top 310 and plate 312 have been detached from block 296 and any remaining IMG 152 has been removed. In FIG. 19(k), portions of block 296 have been removed by chemical dissolution, waterjet, sand or bead blasting, tumbling, manual or automated bending and fracturing of fibers, etc., yielding final composite part 328.

FIG. 20(a)-(d) are simplified elevation cross sectional views of a process sequence in which fibers are manipulated as a composite part is fabricated layer-by-layer, allowing the orientation of fibers to vary with each layer. In the figures, fibers are shown manipulated mechanically; however, manipulation by other methods such as by electric and magnetic fields may be done in some embodiments. Also in the figures, manipulation of Z fibers alone is shown. However, in some embodiments, fibers along other axes (e.g., X and Y) may also be incorporated into the process.

In some embodiment variations, the apparatus may be similar to that of FIG. 13, comprising a tank 330 containing IML 152. A window 297 transparent to the curing radiation is provided at the bottom of tank 330, and below window 297 is imaging system 294. Tank 330 may be filled with a volume of photocurable resin 20 of lower density than IML 152 and thus floating on it. Within tank 330 is platform 154 moved by actuator 156. Attached to platform 154 at their top ends are Z fibers 10 which may also be attached to manipulator plate 332 at their bottom ends, or elsewhere along their lengths. IML 52 closely matches the refractive index of both Z fibers 10 and plate 332, making both effectively invisible to radiation from imaging system 294.

Figure 20A:
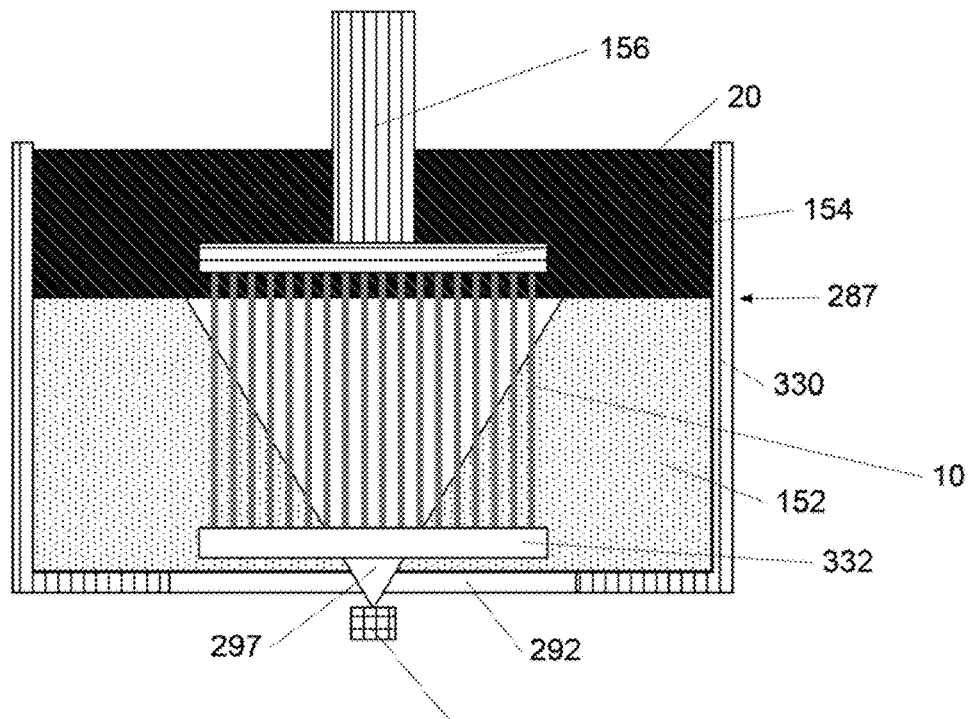
FIGS. 20(a)-(d) show a method for manipulating fiber orientation used in some embodiments.

Initially, platform 154 may be positioned as in FIG. 20(a) so that a layer of resin 20 equal or greater to the thickness of the first layer is between the bottom of platform 154 and IML/resin interface 287. Imaging system 294 produces projection 297 representing a cross section of the desired part; projection 297 passes through window 292 and reaches interface 287, exposing resin 20 and curing it to the depth of a single layer. Platform 154 then rises one layer thickness (not shown), moved by actuator 156.

Figure 20B:
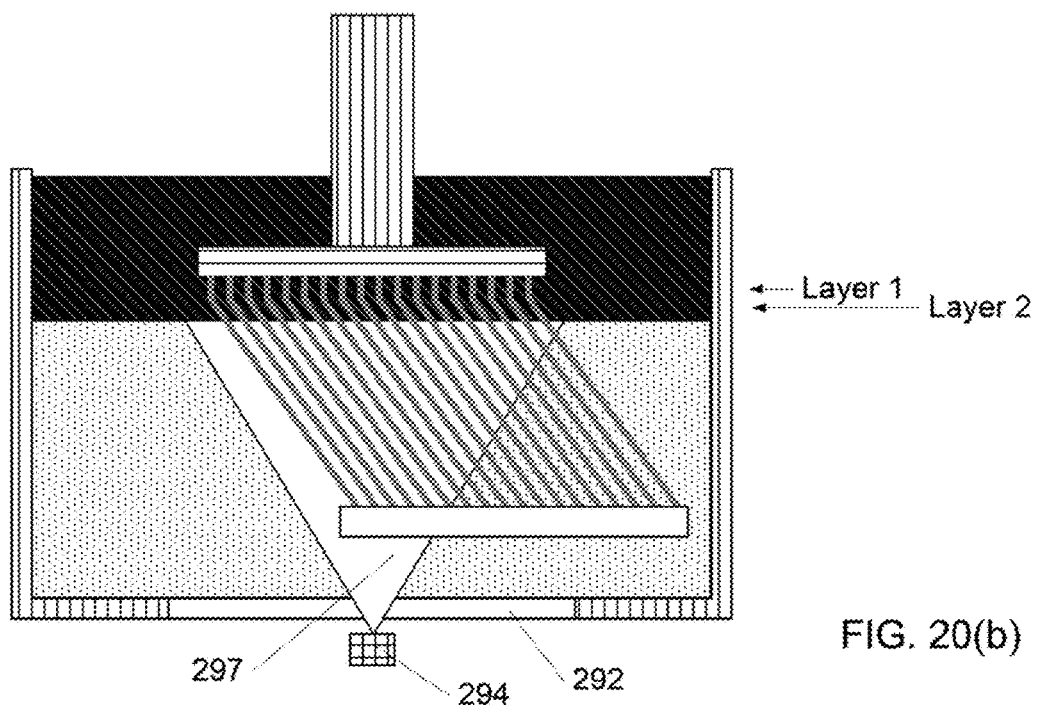

In FIG. 20(b), manipulator 332 has been moved to the right and held in place while imaging system 294 is again activated, this time projecting a pattern corresponding to layer 2. Moving manipulator 332 causes Z fibers 10 to be oriented diagonally, sloping to the right. Once resin 20 for layer 2 has been cured, the fibers are trapped in the resin of layer 2 with the orientation they had during exposure. This can be seen in FIG. 20(c). In some embodiment variations, rather than moving manipulator left and right, forward and backward, it may also be rotated, creating a twist in Z fibers 10. Such twists can be useful in producing parts which are cylindrical and benefit from fibers running circumferentially or approximately so, for example.

Figure 20C:
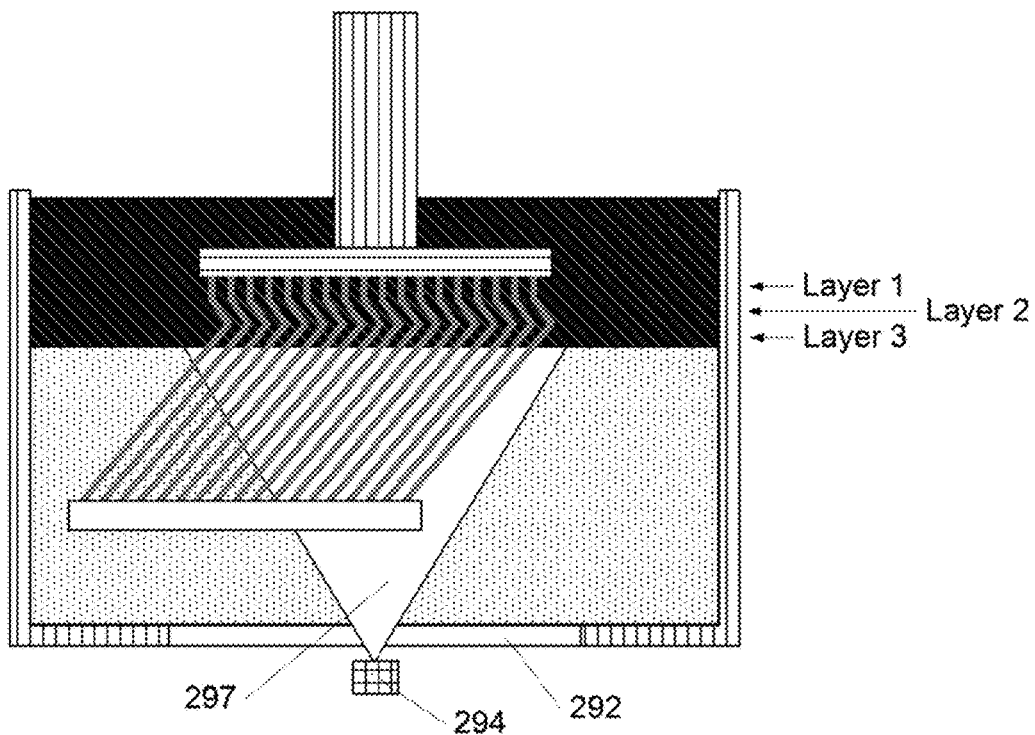
Figure 20D:
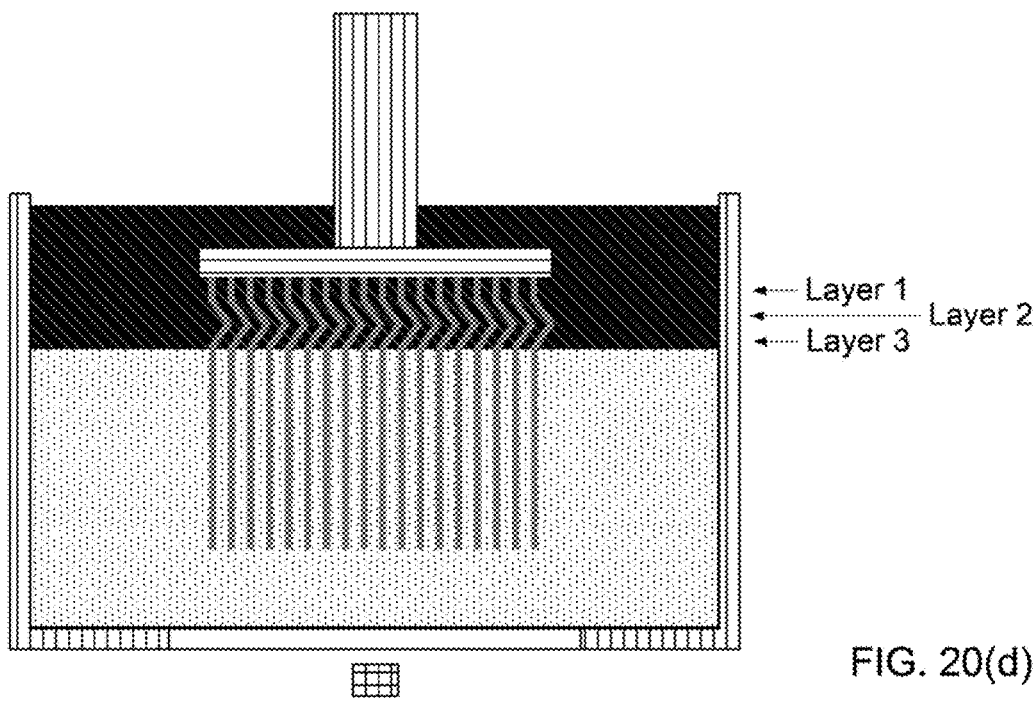

In FIG. 20(c), manipulator 332 has been moved to the left and held in place while imaging system 294 is again activated, this time projecting a pattern corresponding to layer 3. Moving manipulator 332 causes Z fibers 10 to be oriented diagonally, sloping to the left. Once resin 20 for layer 3 has been cured, the fibers are trapped in the resin of layer 3 with the orientation they had during exposure. This can be seen in FIG. 20(d). The process of adding more layers can continue after FIG. 20(d).

Figure 21:
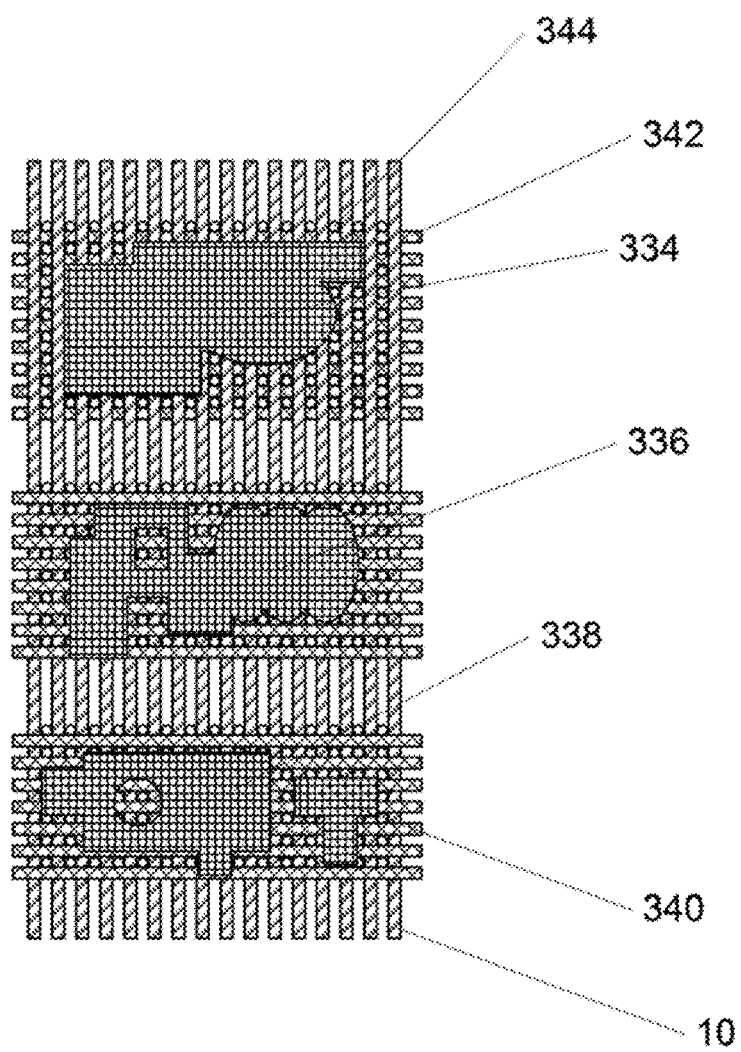
FIG. 21 depicts multiple parts built around a common set of fibers.

FIG. 21 depicts in cross sectional elevation view a method of producing multiple parts in sequence, in a continuous operation, strung along a common group of Z fibers 10. Top part 334 may be produced first, followed by middle part 336, followed by lower parts 338 and 340 (both of which are produced together). X fibers 342 and Y fibers 344 are also visible. Z fibers 10 may be cut between parts/part groups after processing.

FIG. 22 depicts an apparatus and a process for producing fiber-reinforced composites using AM, based on two-wavelength or two photon polymerization. An interlaced preform 346 of optically clear X and Y fibers capable of transmitting light from one end to another, along with Z fibers which need not be clear, is provided as shown in FIG. 22(a). Optical transmission may be provided by a cladding on X and Y fibers, or by simple immersion in liquid. Preform 346 is immersed in a photocurable resin requiring two different wavelengths (lambda 1 and lambda 2) and/or two photons to cure; such techniques are known to the art. Two projectors 348 and 350 are configured on perpendicular sides 351 and 353 of preform 346 so as to illuminate their respective sides with projected images 352 and 354, respectively. X fibers 356 and Y fibers 358 are leaky, either along their entire lengths, or preferably, at their near-intersections with one another (and/or with Z fibers).

To fabricate a part, projectors 348 and 350 simultaneously project images onto sides 351 and 353. The projected images at different steps of the fabrication process are shown in sequential FIGS. 22(b)-(i), for a portion of the process. Curing of the resin takes place not in layers, but in vertical columns parallel to the Z fibers, and these columns are sequentially cured. For example, in FIG. 22(b), projector 348 projects an image which is dark everywhere except for a bright vertical strip at the left edge, while projector 350 projects an image which is dark everywhere except for a vertical strip at the right edge which is modulated vertically according to the required geometry. The light incident on surfaces 351 and 353 is carried along Y fibers 358 and X fibers 356, respectively, and into the resin. Since the resin can only cure in locations which receive light from both images 348 and 360, then for the first exposure shown in FIG. 22(b), resin associated with column 360 at the rear edge of the preform, and forming a portion of left rear surface 362, is cured at certain Z heights corresponding to the pattern of illumination shown in FIG. 22(b) for projector 350. In some embodiment variations, projectors 348 and 350 can both be modulated. In FIGS. 22(c)-(e), the image for projector 348 has remained the same, thus enabling curing of columns on surface 362 according to the pattern on projector 350. In FIG. 22(c), for example, the image is entirely dark except for a modulated column which has advanced in the direction of negative Y, thus allowing curing of column 364 on surface 362. In FIGS. 22(f)-(i), the image of projector 348 has changed to enable the set of columns in a plane parallel to surface 362, but displaced inwards on preform 346 along positive X. In the figures, projector 350 projects an image which is mostly dark but in which a modulated line gradually moves along positive Y, thus providing a bidirectional "scan".

If cured resin has significantly different optical properties than uncured, it may be advantageous to print in "layers" (each parallel to either the Y/Z or the X/Z plane), starting with the layer furthest from the projector(s), so that cured material doesn't interfere with light propagation through the X and Y fibers.

In some embodiment variations, rather than projectors, scanning lasers may be used, or mechanically moving light bars (e.g., equipped with LEDs or lasers); imaging techniques using linear light sources known to the art are generally applicable. Since light diminishes in intensity as it propagates along the fiber, higher intensity images may be used in some embodiment variations to cure columns which are further from the projector(s). In some embodiment variations, light leakage may be enhanced at intersections by dipping preform 346 in a liquid which collects at intersections and etches a cladding over the X and Y fibers, after which immersion in a diluting bath removes the liquid.

In some embodiments, fibers which are at least partially transparent or translucent to the light used (and preferably having an index of refraction similar to the resin) to cure the resin may be used, such as glass fibers and visible or ultraviolet light. This can avoid resin in certain regions from being shadowed by the fiber. In some embodiments, if the fibers do not have the desired optical properties (e.g., carbon fiber), the resin may be thermally cured by heating the fiber (e.g., with an infrared source such as a $CO_2$ laser) in lieu of or as well as the exposed resin, such that the locally heated fiber will transmit heat to the surrounding resin even in areas which are shadowed from direct illumination. In some embodiments, to minimize the effects of shadowing and/or refraction by fibers, resins which cure at a small distance away from the source of energy used to cure them may be employed.

In some embodiments, in lieu of a resin that is cured by exposure to radiation, a thermoplastic powder may be used. Such a process is similar in some ways to SLS, however because of the Z fibers, normal methods of spreading powder to form a layer such as moving blades or rollers cannot be used. Rather, powder can be introduced and vibration used to distribute it into a substantially uniform and compacted layer. In some embodiments, powder may be floated on a support liquid, including a liquid which matches the refractive index of the Z fibers.

In some embodiments, in lieu of a vat filled with curable resin that is selectively cured by light, a process that is similar in some ways to Polyjet may be used, in which an inkjet printhead deposits droplets of resin through the "forest" of Z fibers so that they settle on the surface of the layer being formed and are then cured by exposure to light. Or, alternatively, the droplets impact the Z fibers and glide down the fibers by means of gravity until reaching the layer where they are cured. To accommodate overhanging and other geometries needing supports, a different (e.g., more easily removable) resin may be used beneath such geometries, or the curing illumination can be turned off until the gliding droplet has reached the correct Z axis position.

In some embodiments, rather than or in addition to reinforcing fibers, electrically conductive fibers such as metal wire may be used (e.g., in composites that must dissipate static charge or for use in aircraft and other applications requiring lightning protection). 3-D circuits may also be produced using methods described herein: electrically-conductive fibers can be arranged to run along X, Y, and Z and in most places be isolated, but in areas in which a junction between wires is desired, the wires may be placed into contact, or a conductive junction material added.

In some embodiments, rather than create solid parts, parts may be created in the form of strong hollow shells in which the interior contains nothing but fibers, but no resin. In this case, at least one hole may need to be provided to allow resin from the internal volume to drain. In some embodiment variations, the unencapsulated fibers inside the internal volume may be removed after the part is built by methods already discussed in Par. 29.

In some embodiments, the configuration shown in FIG. 5(f) may be inverted such that the imaging system is below the preform and projects radiation upwards. In such configurations, the fibers—which are introduced at the bottom of the preform and then raised and held in place until secured by cured resin—may be pre-impregnated with resin so that the resin does not drip, or the resin may be introduced to fibers which retain it via capillary forces. For example, resin may be sprayed or electrostatically deposited onto the fibers, or fibers may be dipped in resin.

In some embodiments, in lieu of introducing X and Y fibers individually or in parallel groups, fibers with both orientations may be laid as a single mat. Such mats may be stacked at the top of the preform, and the imaging system located below them, so as not to be blocked by them, or may be introduced as needed for each layer. For example, in the case of the inverted configuration discussed in the preceding paragraph, the mats can be pre-impregnated with resin.

In some embodiments, if the Z fibers are sufficiently stiff and self-supporting, the top of the preform may be eliminated, such that the fibers are only attached to the platform. In such a case, the fibers do not bend inwards toward the corridors, allowing the resin to be cured by the imaging system. In some embodiments in which the Z fibers are not fully capable of being self-supporting, in lieu of using a top from which all the fibers hang, they may be temporarily straightened (e.g., by placing them in a slight tension) by one of several methods. In some embodiment variations, the tops of the fibers may comprise a ferromagnetic or hard magnetic material, and be attracted to a moving element (e.g., a permanent magnet) whose motion is coordinated with the moving imaging system (e.g., the two move in tandem from row to row of Z fibers), or the moving element and imaging system may be integrated into a single apparatus. Similarly, in some embodiment variations, vacuum or pressurized air may be used to tug upwards on the fiber long enough to allow the imaging system to expose the resin as required. Z fibers might in some embodiment variations be forced out of the corridors by inserting a wedge or other shape that is transparent to the radiation used for curing in between each row of fibers; this wedge can then be indexed from row to row as the entire layer is imaged. The wedge should have a shape (e.g., a rhombus shape with parallel bottom and top) that minimally refracts the incident light.

In some embodiments the preform may be manufactured in part through extrusion: the top or platform may be perforated with many holes, and the fibers formed by forcing suitable material through the holes.

In some embodiments, there may be two mechanisms that move along an axis, with the leading mechanism inserting fibers one at a time, while the trailing mechanism cures the resin. The spacing between the mechanisms can be designed to allow enough time for the fiber to drop to the layer being fabricated before curing commences.

In some embodiments, if there's a region of the build volume which needs no X or Y fibers, then instead of adding these to the preform, they can be eliminated.

In some embodiments, fibers in a single part can differ in composition, shape, diameter, and/or pitch (i.e., spacing). For example, X fibers can be different in composition than Y fibers, and the Z fiber spacing may be different along X and Y, and may even vary in a particular pattern. Fibers may also be omitted in certain regions or orientations. In general, graded properties in parts may be produced by such variation in fiber placement.

In some embodiments, Z fibers may be rapidly moved (e.g., vibrated) during exposure so that their effect on the radiation used for solidification is reduced. This method may be used even if an index-matching liquid is used.

In some embodiments, radiation may be introduced in corridors between Z fibers using optical fibers, e.g., a flat bundle of fibers.

In some embodiments, preforms and fiber blocks such as described above may be produced by AM. For example, a fiber block in which fibers form a tetrahedral truss structure may be so fabricated.

In some embodiments, the index of IML may be inappropriate or vary over time. To calibrate or recalibrate the system (e.g., by heating or cooling the IML), a camera (preferably very sensitive) may be located at the bottom of the vat or chamber holding the IML, e.g., adjacent to the imaging system. A calibration image (e.g., an X/Y grid) can then be projected briefly, at low intensity, and/or possibly using a wavelength that doesn't cure the resin, and the image recorded by the camera can be used to identify distortions in the image which indicate an index mismatch.

The ILM in some embodiments can be a non-photocurable resin that matches the fiber index of refraction. An advantage of this approach is that if ILM is dragged into the composite or otherwise contaminates it, it may not cause a problem, especially if it can be cured thermally to provide additional strength to the part.

Parts made using methods described above may be cured or otherwise solidified only partially, with full solidification achieved after the part is completely fabricated layer-by-layer. Also, parts which are initially porous can be infiltrated after fabrication with a resin or other material, with the infiltrating material cured, improving part properties.

Fibers of different shapes, diameters, materials, and pitches may be intermingled for a given orientation (e.g., Z) or in different orientations (e.g., X versus Y).

In some embodiments, elastomeric matrix materials may be used. In particular embodiments of those, active/adaptive composites may be produced—including those able to actuate in multiple directions—as well as energy-harvesting devices and sensors. In such embodiments, at least a portion of the fibers may comprise a shape changing or responsive material such as a shape memory alloy, a shape memory polymer, electrostrictive or magnetostrictive materials, carbon nanotube yarns, electroactive polymers, piezoelectric materials, etc.

In some embodiments, especially those for defense applications involving structures which tolerate blasts or projectile impacts, fibers which absorb energy may be incorporated, either in the preform or as the fabrication process progresses. Such fibers can be made from an energy absorbing material and/or can be geometrically more complex than a typical cylindrical fiber (e.g., they may be crinkled or corrugated so they can lengthen without breaking). In some embodiments, fibers which are weaker may be incorporated along one or more axes such that breakage of those fibers can be used to absorb energy or distribute it to minimize local damage to the part.

Preforms such as those of FIG. 3 may not necessarily have all fibers in all locations, or have all fibers the same length, if not required by the part.

A preform such as that of FIG. 3 can be generated by providing a porous top plate and feeding Z fibers into it from one or more spools. Such a preform can be "regenerated" after use by further feeding of the Z fibers.

Pressure or vacuum can be applied to chambers as described above in some embodiments to help remove voids between fibers and matrix material.

In some embodiments, the first one or more layers of a part may be fully cured across the entire anticipated build area or a larger area, to anchor the Z fibers to the platform or other surface.

General

The terms "fiber" may refer to individual fibers (e.g., typically 5-20 µm diameter) or to groups of fibers such as yarns, tows, and rovings. If fibers are a combination of smaller fibers, they may be joined together by mechanical means or the use of an additional material such as a resin or adhesive, or may be separate but adjacent to one another (the latter may facilitate removal of excess fiber during post-processing of the part). Fibers need not be cylindrical in shape and may have other shapes, such as flat ribbon-like shapes, for example. The term "part" may refer to discrete parts, assemblies, devices, or other structures.

It is contemplated that any embodiment discussed in this specification can be implemented with respect to any method, kit, reagent, or composition of the disclosure, and vice versa. Furthermore, compositions of the disclosure can be used to achieve methods of the disclosure.

It will be understood that particular embodiments described herein are shown by way of illustration and not as limitations of the disclosure. The principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

All publications and patent applications mentioned in the specification are indicative of the level of skill of those skilled in the art to which this disclosure pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context. In certain embodiments, the present disclosure may also include methods and compositions in which the transition phrase "consisting essentially of" or "consisting of" may also be used.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

REFERENCES

D. Fry (2006), U.S. Pat. No. 7,026,435.
C. Hull (1986). U.S. Pat. No. 4,575,330 (1986).
D. Krug et al. (2013), "Transparent fiber glass reinforced composites", Composites Science and Technology 77. pp. 95-100.
G. Mark (2014 #1), US patent application 2014/036146.
G. Mark (2014 #2), US patent application 2014/0297437.

The invention claimed is:

1. A method for additive manufacturing of a composite article comprising:
    forming a three-dimensional mesh comprising a plurality of fibers by:
        alternately inserting a first subset of the plurality of fibers along the X-axis between a third subset of the plurality of fibers along the Z-axis followed by inserting a second subset of the plurality of fibers along the Y-axis between the third subset of the plurality of fibers along the Z-axis to form a layer, fibers in each subset separated by gaps which form voids between the plurality of fibers;
        introducing a flowable, solidifiable material into the layer; and
        solidifying the material;
    wherein the material at least partially surrounds the fibers and wherein portions of the material are solidified to form a solid matrix embedding the fibers.

2. A method of claim 1 wherein the material comprises a liquid photopolymer resin.

3. The method of claim 1 wherein the material comprises a powdered thermoplastic resin capable of sintering or melting, and the solidifying comprises sintering or melting the resin.

4. The method of claim 1, wherein each fiber has a uniform diameter, wherein diameters of fibers in each subset are equal, wherein the fibers in each subset are spaced at a pitch equal to twice a diameter of the fibers.

5. The method of claim 1, wherein forming the three-dimensional mesh comprises:
    forming a pre-form of the third subset of the plurality of fibers along the Z-axis, the pre-form comprising a top portion and a bottom portion between which the third subset of the plurality of fibers along the Z-axis is laid; and
    alternately inserting, in layers along the Z-axis, the first subset of the plurality of fibers along the X-axis and the second subset of the plurality of fibers along the Y-axis into the gaps between the third subset of the plurality of fibers along the Z-axis.

6. The method of claim 5, wherein introducing the material into the voids comprises:
    filling a vat with the material; and
    lowering the pre-form and the alternately inserted layers of the first subset and the second subset into the vat.

7. A method for additive manufacturing of a layered composite article, the method comprising:
    providing a flowable, solidifiable material;
    providing a plurality of fibers;
    forming a three-dimensional mesh with the plurality of fibers by:
        inserting a first subset of the plurality of fibers along the X-axis between a second subset of the plurality of fibers along the Z-axis, followed by inserting a third subset of the plurality of fibers along the Y-axis between the second subset of the plurality of fibers along the Z-axis, and repeating inserting the first subset and the second subset in a repeating, layer-by-layer manner;
        after forming each layer, causing the material to surround at least a portion of some of the fibers in the layer;
        delivering energy to selectively solidify at least a portion of the material to form a composite layer comprising the solidified material and at least partially embedded fibers in the layer;
    repeating the selective solidifying to form a plurality of composite layers;
    removing, from each layer, unsolidified material; and
    removing, from each layer, unembedded portions of fibers,
    wherein the plurality of layers comprises a composite article.

8. The method of claim 7, wherein the material comprises a photocured or thermally-cured liquid resin and the energy comprises ultraviolet, visible, or infrared light.

9. The method of claim 7, wherein the material comprises a powdered thermoplastic polymer and the solidifying comprises sintering or melting the material.

10. The method of claim 7, wherein at least some of the plurality of fibers is supported by at least one plate substantially transparent to the energy.

11. The method of claim 7, further comprising inserting between the fibers additional interpenetrating fibers.

12. The method of claim 11, wherein the inserting comprises supporting at least some of the additional fibers using support means.

13. The method of claim 12, wherein the solidifying comprises use of at least one light beam and the at least one light beam is directed between and substantially parallel to the fibers.

14. The method of claim 13, wherein the light beam passes through a telecentric projection system.

15. The method of claim 7, further comprising providing adjacent to the material a liquid with an index of refraction substantially similar to that of the fibers at the wavelengths of the energy and wherein the solidifying comprises exposing the solidifiable material to at least one light beam passing through the fibers and through the liquid.

16. The method of claim 7, further comprising providing adjacent to the material a liquid with an index of refraction substantially similar to that of the fibers at the wavelengths of the energy and wherein the solidifying comprises exposing the solidifiable material to a cross-sectional image projected through the fibers and through the liquid.

* * * * *